United States Patent
Yoshino

(10) Patent No.: US 8,131,083 B2
(45) Date of Patent: Mar. 6, 2012

(54) IMAGE PROCESSING APPARATUS, IMAGE FORMING APPARATUS, IMAGE PROCESSING SYSTEM, AND IMAGE PROCESSING METHOD HAVING STORAGE SECTION, DIVIDED INTO A PLURALITY OF REGIONS, FOR STORING IDENTIFICATION INFORMATION FOR IDENTIFYING REFERENCE IMAGE

(75) Inventor: Hiroki Yoshino, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1003 days.

(21) Appl. No.: 12/098,958

(22) Filed: Apr. 7, 2008

(65) Prior Publication Data

US 2008/0247677 A1  Oct. 9, 2008

(30) Foreign Application Priority Data

Apr. 9, 2007 (JP) ................. 2007-102158
Jul. 31, 2007 (JP) ................. 2007-199976

(51) Int. Cl.
*G06K 9/46* (2006.01)
*G06K 9/03* (2006.01)
*G09G 5/00* (2006.01)
*G06F 7/00* (2006.01)
*G06F 17/30* (2006.01)

(52) U.S. Cl. ........ 382/190; 382/311; 707/601; 707/711; 707/728; 707/772; 345/156

(58) Field of Classification Search ............. 382/190; 707/601, 711, 728, 772; 345/156
See application file for complete search history.

(56) References Cited

U.S. PATENT DOCUMENTS 5,465,353 A 11/1995 Hull et al.
6,937,363 B1 8/2005 Yamaguchi
(Continued)

FOREIGN PATENT DOCUMENTS

JP   2001-7965 A   1/2001
(Continued)

*Primary Examiner* — Kathleen Y Dulaney
(74) *Attorney, Agent, or Firm* — Birch, Stewart, Kolasch & Birch, LLP

(57) ABSTRACT

A reference image and features of the reference image are stored in a hash table in such a manner that the reference image and the features are related to each other. A storage region of the hash table is divided into a plurality of divided regions, and each divided region is related to a storage condition under which a reference image is stored in the divided region. When a reference image is stored in the hash table, a storage region where the reference image is to be stored is selected out of the plurality of divided regions in accordance with the storage condition. This allows shortening a time for updating a reference image, and reducing a workload on means for updating the reference image.

16 Claims, 44 Drawing Sheets

U.S. PATENT DOCUMENTS

| | | |
|---|---|---|
| 2003/0123078 A1* | 7/2003 | Kazami .................. 358/1.14 |
| 2003/0151767 A1 | 8/2003 | Habuta et al. |
| 2003/0212659 A1* | 11/2003 | Ban ........................... 707/1 |
| 2004/0156068 A1 | 8/2004 | Yoshida et al. |
| 2004/0190061 A1 | 9/2004 | Yamaguchi |
| 2004/0218837 A1* | 11/2004 | Shiyama .................. 382/305 |

FOREIGN PATENT DOCUMENTS

| | | |
|---|---|---|
| JP | 2003-234985 A | 8/2003 |
| JP | 2003-330942 A | 11/2003 |
| JP | 2004-246419 A | 9/2004 |
| WO | WO-2006/092957 A1 | 9/2006 |

* cited by examiner

FIG. 5

| -3 | -2 | -1 | 1  | -1 | -2 | -3 |
|----|----|----|----|----|----|----|
| -2 | -2 | 1  | 4  | 1  | -2 | -2 |
| -1 | 1  | 8  | 15 | 8  | 1  | -1 |
| 1  | 5  | 16 | 25 | 16 | 5  | 1  |
| -1 | 1  | 8  | 15 | 8  | 1  | -1 |
| -2 | -2 | 1  | 4  | 1  | -2 | -2 |
| -3 | -2 | -1 | 1  | -1 | -2 | -3 |

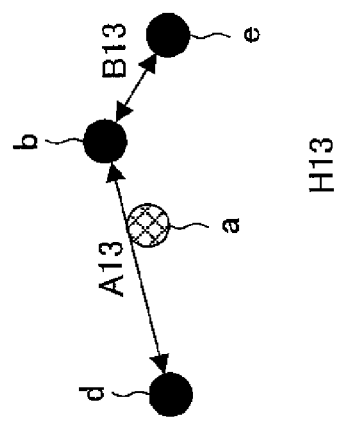
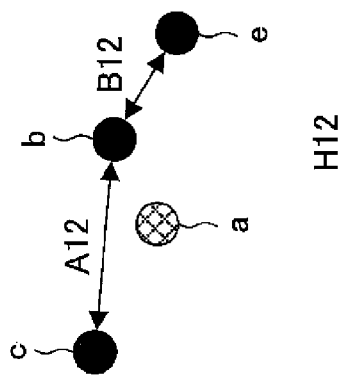
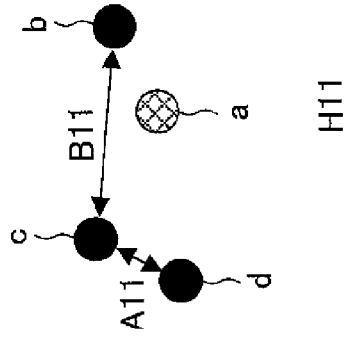

FIG. 11 (a)

| HASH VALUE | INDEX INDICATIVE OF DOCUMENT |
|---|---|
| H1 | ID1 |
| H2 | ID1 |
| H3 | ID1、ID2 |
| H4 | ID1 |
| H5 | ID1 |
| H6 | ID1、ID2 |
| ⋮ | ⋮ |

FIG. 11 (b)

| HASH VALUE | INDEX INDICATIVE OF DOCUMENT |
|---|---|
| H1 | ID1、ID1 |
| H2 | ID1 |
| H3 | ID1、ID2 |
| H4 | ID1 |
| H6 | ID1、ID2 |
| ⋮ | ⋮ |

FIG. 17 (a)

```
NUMBER OF IMAGES TO BE STORED AS
   REFERENCE IMAGES IS SMALL.
 DELETE THE OLDEST REFERENCE IMAGES?

[ YES ]        [ NO ]
```

FIG. 17 (b)

```
NUMBER OF IMAGES TO BE STORED AS
   REFERENCE IMAGES IS SMALL.
REFERENCE IMAGES IN THE FOLLOWING
RANGE CAN BE DELETED.
PLEASE SELECT REFERENCE IMAGES TO BE
DELETED.
   [ REFERENCE IMAGES: FROM ID0 TO
     ID2047 ]
   [ REFERENCE IMAGES: FROM ID2048 TO
     ID4095 ]
```

FIG. 17 (c)

```
NUMBER OF IMAGES TO BE STORED AS
   REFERENCE IMAGES IS SMALL.
PLEASE INPUT RANGE OF REFERENCE
IMAGES TO BE DELETED.

REFERENCE
IMAGES:
FROM ID [   ]  TO ID [   ]
```

FIG. 17 (d)

```
NUMBER OF IMAGES TO BE STORED AS
   REFERENCE IMAGES IS SMALL.
REFERENCE IMAGES UNDER THE FOLLOWING
CONDITION CAN BE DELETED.
PLEASE SELECT STORAGE PERIOD TO BE
DELETED.
   [ STORAGE PERIOD: FROM APRIL, 2005
     TO JUNE, 2005 ]
   [ STORAGE PERIOD: FROM JULY 2005
     TO SEPTEMBER, 2005 ]
```

FIG. 17 (e)

```
NUMBER OF IMAGES TO BE STORED AS
   REFERENCE IMAGES IS SMALL.
PLEASE INPUT STORAGE PERIOD TO BE
DELETED.

FROM [   ] (MONTH), [   ] (YEAR)

TO   [   ] (MONTH), [   ] (YEAR)
```

FIG. 17 (f)

```
NUMBER OF IMAGES TO BE STORED AS
   REFERENCE IMAGES IS SMALL.
   DELETE UNPROTECTED REFERENCE
              IMAGES?

[ YES ]        [ NO ]
```

FIG. 17 (g)

```
NUMBER OF IMAGES TO BE STORED AS
   REFERENCE IMAGES IS SMALL.
REFERENCE IMAGES OF THE FOLLOWING
     CATEGORY CAN BE DELETED.
PLEASE SELECT CATEGORY TO BE DELETED.
       [ PRIORITY 3 ]
       [ PRIORITY 4 ]
```

FIG. 20

103 → 
| REFERENCE IMAGES DATED FROM JANUARY 1, 2006 TO MARCH 31, 2006 | H1_1  H2_1 |
| REFERENCE IMAGES DATED FROM APRIL 1, 2006 TO JUNE 30, 2006 | H1_2  H2_2 |
| REFERENCE IMAGES DATED FROM JULY 1, 2006 TO SEPTEMBER 30, 2006 | H1_3  H2_3 |
| REFERENCE IMAGES DATED FROM OCTOBER 1, 2006 TO DECEMBER 31, 2006 | H1_4  H2_4 |

| | | |
|---|---|---|
| FIRST REGION STORAGE PERIOD: FROM JANUARY TO MARCH | FIRST SUBREGION PRIORITY 1 | H1_1_1 H1_1_2 |
| | SECOND SUBREGION PRIORITY 2 | H1_2_1 H1_2_2 |
| | THIRD SUBREGION PRIORITY 3 | H1_3_1 H1_3_2 |
| | FOURTH SUBREGION PRIORITY 4 | H1_4_1 H1_4_2 |
| SECOND REGION STORAGE PERIOD: FROM APRIL TO JUNE | FIRST SUBREGION PRIORITY 1 | H2_1_1 H2_1_2 |
| | SECOND SUBREGION PRIORITY 2 | H2_2_1 H2_2_2 |
| | THIRD SUBREGION PRIORITY 3 | H2_3_1 H2_3_2 |
| | FOURTH SUBREGION PRIORITY 4 | H2_4_1 H2_4_2 |
| THIRD REGION STORAGE PERIOD: FROM JULY TO SEPTEMBER | FIRST SUBREGION PRIORITY 1 | H3_1_1 H3_1_2 |
| | SECOND SUBREGION PRIORITY 2 | H3_2_1 H3_2_2 |
| | THIRD SUBREGION PRIORITY 3 | H3_3_1 H3_3_2 |
| | FOURTH SUBREGION PRIORITY 4 | H3_4_1 H3_4_2 |
| FOURTH REGION STORAGE PERIOD: FROM OCTOBER TO DECEMBER | FIRST SUBREGION PRIORITY 1 | H4_1_1 H4_1_2 |
| | SECOND SUBREGION PRIORITY 2 | H4_2_1 H4_2_2 |
| | THIRD SUBREGION PRIORITY 3 | H4_3_1 H4_3_2 |
| | FOURTH SUBREGION PRIORITY 4 | H4_4_1 H4_4_2 |

FIG. 31

| | H1 | | | | | | H2 | | | | | | H3 | | | | | | H4 | | | | |
|---|---|---|---|---|---|---|---|---|---|---|---|---|---|---|---|---|---|---|---|---|---|---|---|---|
| | ID66 | ID65 | ID47 | ID23 | ID5 | ID2 | ID1 | ID0 | ID129 | ID99 | ID87 | ID77 | ID63 | ID25 | ID11 | ID3 | ID131 | ID101 | ID89 | ID77 | ID69 | ID27 | ID7 | ID0 |
| 0 | ID2006 | ID2004 | ID2002 | ID2001 | ID1500 | ID1000 | ID94 | ID82 | | | | | | | | | | | | | | | | |
| 1 | | | | | | | | | | | | | | | ID6144 | ID7136 | | | | | | | | |
| 6 | ID6800 | ID6816 | ID6816 | ID6784 | ID6528 | ID6464 | ID6400 | ID6144 | | | | | | | | | | | | | | | | |
| 7 | (UNUSED) | ID7808 | ID7552 | ID7488 | ID7232 | ID7200 | ID7168 | ID7136 | | | | | | | ID3 | ID201 | | | | | | | | |
| 8 | | | | | | | | | ID129 | ID99 | ID87 | ID77 | ID63 | ID25 | | | | | | | | | | |
| 9 | ID2215 | ID2189 | ID2154 | ID1887 | ID986 | ID444 | ID291 | ID201 | | | | | | | | | | | | | | | | |
| 15 | ID6811 | ID6849 | ID6815 | ID6785 | ID6527 | ID6465 | ID6399 | ID6145 | | | | | | | | | | | | | | | | |
| 16 | ID7848 | ID7816 | ID7560 | ID7496 | ID7240 | ID7208 | ID7174 | ID7144 | | | | | | | | | | | | | | | | |
| 17 | | | | | | | | | ID131 | ID101 | ID89 | ID77 | ID69 | ID27 | ID7 | ID179 | | | | | | | | |
| 18 | ID2653 | ID2153 | ID1912 | ID519 | ID298 | ID284 | ID270 | ID179 | | | | | | | | | | | | | | | | |
| 22 | ID6807 | ID6855 | ID6820 | ID6784 | ID6528 | ID6464 | ID6400 | ID6159 | | | | | | | | | | | | | | | | |
| 23 | ID8190 | ID7901 | ID7490 | ID7320 | ID7244 | ID7220 | ID7189 | ID7156 | | | | | | | | | | | | | | | | |
| 24 | | | | | | | | | ID678 | ID548 | ID397 | ID189 | ID165 | ID39 | ID18 | ID3 | ID699 | | | | | | | |
| 25 | ID2235 | ID2135 | ID2110 | ID2050 | ID2049 | ID1888 | ID1024 | ID699 | | | | | | | | | | | | | | | | |
| 30 | ID6801 | ID6849 | ID6817 | ID6785 | ID6529 | ID6465 | ID6401 | ID6160 | | | | | | | | | | | | | | | | |
| 31 | ID8191 | ID7905 | ID7492 | ID7348 | ID7233 | ID7210 | ID7180 | ID7148 | | | | | | | | | | | | | | | | |

103

| HASH VALUE | INDEX INDICATIVE OF DOCUMENT |
|---|---|
| H1 | ID1、ID2、ID4、ID5 |
| H2 | ID2、ID3、ID4 |
| H3 | ID2、ID5、ID6 |
| ⋮ | ⋮ |

| HASH VALUE | INDEX INDICATIVE OF DOCUMENT |
|---|---|
| H1' | ID1'、ID4'、ID5' |
| H2' | ID2'、ID3' |
| H3' | ID5'、ID6' |
| ⋮ | ⋮ |

FIG. 39
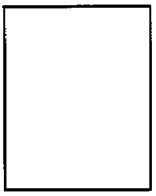
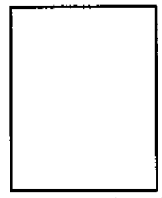
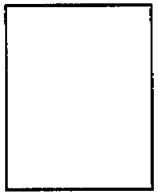
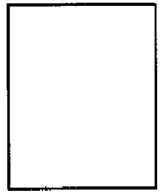
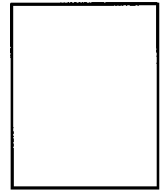
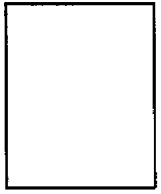

FIG. 41

| NUMBER OF EXTRACTED IMAGES: 15 | | | | BACK |
|---|---|---|---|---|

| STORAGE DATE | TIME | USER ID | .... | DELETION SELECTION |
|---|---|---|---|---|
| NOVEMBER 1, 2006 | 10:05 | aaa | .... | DELETE |
| NOVEMBER 5, 2006 | 16:30 | bbb | .... | DELETE |
| DECEMBER 6, 2006 | 09:15 | ddd | .... | DELETE |
| DECEMBER 6, 2006 | 13:10 | aaa | .... | DELETE |
| DECEMBER 8, 2006 | 10:00 | ccc | .... | DELETE |
| ⋮ | ⋮ | ⋮ | ⋮ | ⋮ |
| DECEMBER 9, 2006 | 08:35 | eee | .... | DELETE |
| DECEMBER 9, 2006 | 08:37 | fff | .... | DELETE |
| DECEMBER 10, 2006 | 09:30 | ccc | .... | DELETE |
| DECEMBER 12, 2006 | 15:35 | bbb | .... | DELETE |
| DECEMBER 13, 2006 | 21:25 | aaa | .... | DELETE |

| TO FORMER STATE | | | | ALL SELECTED |
|---|---|---|---|---|

FIG. 42

| NUMBER OF EXTRACTED IMAGES: 70 | | | | 1/5 PAGE | |
|---|---|---|---|---|---|
| STORAGE DATE | TIME | USER ID | .... | DELETION SELECTION | |
| NOVEMBER 1, 2006 | 10:05 | aaa | .... | DELETE | |
| NOVEMBER 5, 2006 | 16:30 | bbb | .... | DELETE | |
| DECEMBER 6, 2006 | 09:15 | ddd | .... | DELETE | |
| DECEMBER 6, 2006 | 13:10 | aaa | .... | DELETE | |
| DECEMBER 8, 2006 | 10:00 | ccc | .... | DELETE | |
| ⋮ | ⋮ | ⋮ | ⋮ | ⋮ | |
| DECEMBER 9, 2006 | 08:35 | eee | .... | DELETE | |
| DECEMBER 9, 2006 | 08:37 | fff | .... | DELETE | |
| DECEMBER 10, 2006 | 09:30 | ccc | .... | DELETE | |
| DECEMBER 12, 2006 | 15:35 | bbb | .... | DELETE | |
| DECEMBER 13, 2006 | 21:25 | aaa | .... | DELETE | |
| TO FORMER STATE | | | | NEXT PAGE | |

IMAGE PROCESSING APPARATUS, IMAGE FORMING APPARATUS, IMAGE PROCESSING SYSTEM, AND IMAGE PROCESSING METHOD HAVING STORAGE SECTION, DIVIDED INTO A PLURALITY OF REGIONS, FOR STORING IDENTIFICATION INFORMATION FOR IDENTIFYING REFERENCE IMAGE

This non-provisional application claims priority under 35 U.S.C. §119(a) on Patent Application No. 2007-102158 filed in Japan on Apr. 9, 2007 and Patent Application No. 2007-199976 filed in Japan on Jul. 31, 2007, the entire contents of which are hereby incorporated by reference.

BACKGROUND OF THE INVENTION

1. Field of the Invention

The present invention relates to an image processing apparatus, an image forming apparatus, an image processing system, and an image processing method, each of which causes identification information for identifying a reference image to be stored in a storage section in such a manner that the identification information is related to features of the reference image.

2. Description of the Related Art

There have been proposed various techniques for comparing input image data obtained by a scanner reading a document image with a preliminarily stored image so as to determine a similarity between the document image and the preliminarily stored image.

For example, Patent Document 1 (Japanese Unexamined Patent Publication No. 1995-282088 (Tokukaihei 7-282088; published on Oct. 27, 1995)) discloses a technique in which a descriptor is generated from features of an input document so that the descriptor is invariable to distortion caused by digitalization of the input document or to a difference between the input document and a matching document in a document database, the descriptor and a document including features from which the descriptor is extracted in the document database are stored in the descriptor database in such a manner that the descriptor and the document are related to each other, and matching between the input document and a document in the document database is performed using the descriptor database.

In the technique, when the descriptor database is scanned, votes for individual documents in the document database are accumulated, and a document with the largest number of votes obtained or a document whose number of votes obtained is over a certain threshold value is considered as a matching document.

However, the technique of Patent Document 1 is problematic in that, when a document stored in the descriptor database is deleted, a deleting process requires much time and puts an excessive workload on means for the deleting process, causing a decrease in system performance.

The following explains this problem in more detail. FIG. 31 is an explanatory drawing illustrating an example of a database in which features (descriptors) H1, H2, H3, H4, . . . and indices of reference images (preliminarily stored documents) are stored in such a manner that the features and the indices are related to each other.

As illustrated in FIG. 31, indices of reference images having been stored earlier are sequentially stored in a storage region where indices corresponding to features are stored. In general, plural feature quantities are extracted from one reference image. Therefore, one index is stored in such a manner that the index is related to plural features. Further, since common features may be extracted from different reference images, plural indices are related to one feature. Consequently, when a user wants to delete a specific index, the user must search the whole database so as to know what address and what position the specific address is stored in. For that reason, in a case where the number of indices for reference images stored in the database reaches the upper limit of the number of images storable in the database and deletion of an old index is requested to allow a new index to be stored, it is necessary to search a whole database to specify what address and what position the index to be deleted is stored in.

After specifying what address and what position the index to be deleted is stored in, it is necessary to perform, before deletion, a mask process on an address that is not to be deleted (such as formation of a mask signal indicating whether an address is to be deleted or not) so as to prevent wrong deletion. For example, in a case where deletion of ID0 to ID2047 is required in FIG. 31, it is necessary to perform the mask process on a region other than regions where ID0 to ID2047 are stored (colored regions in FIG. 31) before deleting ID0 to ID2047.

Consequently, deletion of indices for reference images stored in the database requires much time and puts on an excessive workload on means for controlling the deletion process. Further, since a system with a larger number of storable indices requires a database with a larger capacity, the system requires longer time for updating the database, causing a great decrease in system performance.

SUMMARY OF THE INVENTION

The present invention was made in view of the foregoing problems. An object of the present invention is to provide an image processing apparatus and an image processing system each of which causes identification information for identifying a reference image to be stored in a storage section in such a manner that the identification information is related to features of the reference image, the image processing apparatus and the image processing system being capable of shortening a time for updating the reference image and reducing a workload on means for updating the reference image.

In order to solve the foregoing problems, the image processing apparatus of the present invention is an image processing apparatus, including a storage control section for causing identification information for identifying a reference image to be stored in a storage section in such a manner that the identification information is related to features of the reference image, the storage control section dividing a storage region of the storage section into a plurality of divided regions, the storage control section causing each of the plurality of divided regions to be related to a storage condition under which the identification information for the reference image is to be stored in said each of the plurality of divided regions, and when causing the identification information to be stored in the storage section, the storage control section selecting a storage region where the identification information is to be stored, out of the plurality of divided regions in accordance with the storage condition.

With the arrangement, the storage control section divides the storage region of the storage section into a plurality of divided regions, and causes each of the plurality of divided regions to be related to a storage condition under which the identification information for the reference image is to be stored in said each of the plurality of divided regions. When causing the identification information to be stored in the storage section, the storage control section selects a storage region where the identification information is to be stored, out of the plurality of divided regions in accordance with the storage condition. Consequently, identification information of a reference image corresponding to a storage condition related to each divided region is stored in the divided region. As a result, when a part of reference images stored in the storage section is updated (deleted or overwritten), it is possible to easily and promptly specify a divided region where the updating process is to be performed, in accordance with a storage condition of a reference image to be updated. Further, it is unnecessary to perform a mask process etc. on information that is not to be updated, and it is possible to update together reference images stored in the divided region where the updating process is to be performed. Therefore, it is possible to shorten a time for updating reference images, and to reduce a workload in updating the reference images.

The image forming apparatus of the present invention includes the image processing apparatus and an image output section for forming an image corresponding to input image data on a recording material.

With the image forming apparatus, it is possible to shorten a time for updating reference images, and to reduce a workload in updating the reference images.

In order to solve the foregoing problems, the image processing system of the present invention is an image processing system, including an image processing apparatus; and a server communicably connected with the image processing apparatus, one or both of the image processing apparatus and the server including a storage section and a storage control section, or the image processing apparatus including one of the storage section and the storage control section and the server including the other of the storage section and the storage control section, identification information for identifying a reference image and features of the reference image being stored in the storage section, the storage control section being for causing the identification information and the features to be stored in the storage section in such a manner that the identification information and the features are related to each other, the storage control section dividing a storage region of the storage section into a plurality of divided regions, and causing each of the plurality of divided regions to be related to a storage condition under which identification information of a reference image is stored in said each of the plurality of divided regions, and when the identification information is stored in the storage section, the storage control section selecting a storage region where the identification information is to be stored out of the plurality of divided regions in accordance with the storage condition.

With the arrangement, the storage control section divides the storage region of the storage section into a plurality of divided regions, and causes each of the plurality of divided regions to be related to a storage condition under which the identification information for the reference image is to be stored in said each of the plurality of divided regions. When causing the identification information to be stored in the storage section, the storage control section selects a storage region where the identification information is to be stored, out of the plurality of divided regions in accordance with the storage condition. Consequently, identification information of a reference image corresponding to a storage condition related to each divided region is stored in the divided region. As a result, when a part of reference images stored in the storage section is updated (deleted or overwritten), it is possible to easily and promptly specify a divided region where the updating process is to be performed, in accordance with a storage condition of a reference image to be updated. Further, it is unnecessary to perform a mask process etc. on information that is not to be updated, and it is possible to update together reference images stored in the divided region where the updating process is to be performed. Therefore, it is possible to shorten a time for updating reference images, and to reduce a workload in updating the reference images.

In order to solve the foregoing problems, the image processing method of the present invention is an image processing method for causing identification information for identifying a reference image and features of the reference image to be stored in a storage section in such a manner that the identification information and the features are related to each other, the method including the steps of: dividing a storage region of the storage section into a plurality of divided regions; causing each of the plurality of divided regions to be related to a storage condition under which identification information of a reference image is stored in said each of the plurality of divided regions; and selecting a storage region where the identification information is to be stored out of the plurality of divided regions in accordance with the storage condition, when the identification information is stored in the storage region.

With the method, the storage region of the storage section is divided into a plurality of divided regions, and each of the plurality of divided regions is caused to be related to a storage condition under which the identification information for the reference image is to be stored in said each of the plurality of divided regions. When the identification information is caused to be stored in the storage section, a storage region where the identification information is to be stored is selected, out of the plurality of divided regions in accordance with the storage condition. Consequently, identification information of a reference image corresponding to a storage condition related to each divided region is stored in the divided region. As a result, when a part of reference images stored in the storage section is updated (deleted or overwritten), it is possible to easily and promptly specify a divided region where the updating process is to be performed, in accordance with a storage condition of a reference image to be updated. Further, it is unnecessary to perform a mask process etc. on information that is not to be updated, and it is possible to update together reference images stored in the divided region where the updating process is to be performed. Therefore, it is possible to shorten a time for updating reference images, and to reduce a workload in updating the reference images.

For a fuller understanding of the nature and advantages of the invention, reference should be made to the ensuing detailed description taken in conjunction with the accompanying drawings.

BRIEF DESCRIPTION OF THE DRAWINGS

FIG. 5 is an explanatory drawing illustrating an example of filter coefficients for a mixing filter included in an MTF process section of an image processing apparatus in accordance with one embodiment of the present invention.

FIGS. 9(a) to 9(c) are explanatory drawings each illustrating an example of a combination of a target feature point and a peripheral feature point that are extracted at a time when the features calculation section in the image processing apparatus in accordance with one embodiment of the present invention calculates features.

FIGS. 11(a) and 11(b) are explanatory drawings each illustrating an example of a hash value regarding a feature point stored in a hash table and an index indicative of input image data.

FIGS. 17(a) to 17(g) are explanatory drawings each illustrating an example of a window displayed by a display section of the image processing apparatus in accordance with one embodiment of the present invention.

FIG. 20 is an explanatory drawing illustrating an example of a condition for a reference image stored in each divided region in a hash table of the image processing apparatus in accordance with one embodiment of the present invention.

FIG. 26 is an explanatory drawing illustrating an example of a condition for a reference image stored in each divided region in a hash table of the image processing apparatus in accordance with one embodiment of the present invention.

FIG. 31 is an explanatory drawing illustrating a method for storing a reference image in a hash table in a conventional image processing apparatus.

FIG. 39 is an explanatory drawing illustrating another example of displaying a thumbnail image of a reference image whose similarity to input image data is not less than a predetermined value in the image processing apparatus in accordance with one embodiment of the present invention.

FIG. 41 is an explanatory drawing illustrating still another example of displaying a thumbnail image of a reference image whose similarity to input image data is not less than a predetermined value in the image processing apparatus in accordance with one embodiment of the present invention.

FIG. 42 is an explanatory drawing illustrating still another example of displaying a thumbnail image of a reference image whose similarity to input image data is not less than a predetermined value in the image processing apparatus in accordance with one embodiment of the present invention.

DETAILED DESCRIPTION OF THE INVENTION

Embodiment 1

An embodiment of the present invention is explained below. Explained in this embodiment is a case where the present invention is applied to a digital color multi-function printer (MFP).

(1-1. Arrangement of Digital Color Multi-Function Printer 1)

Figure 2:
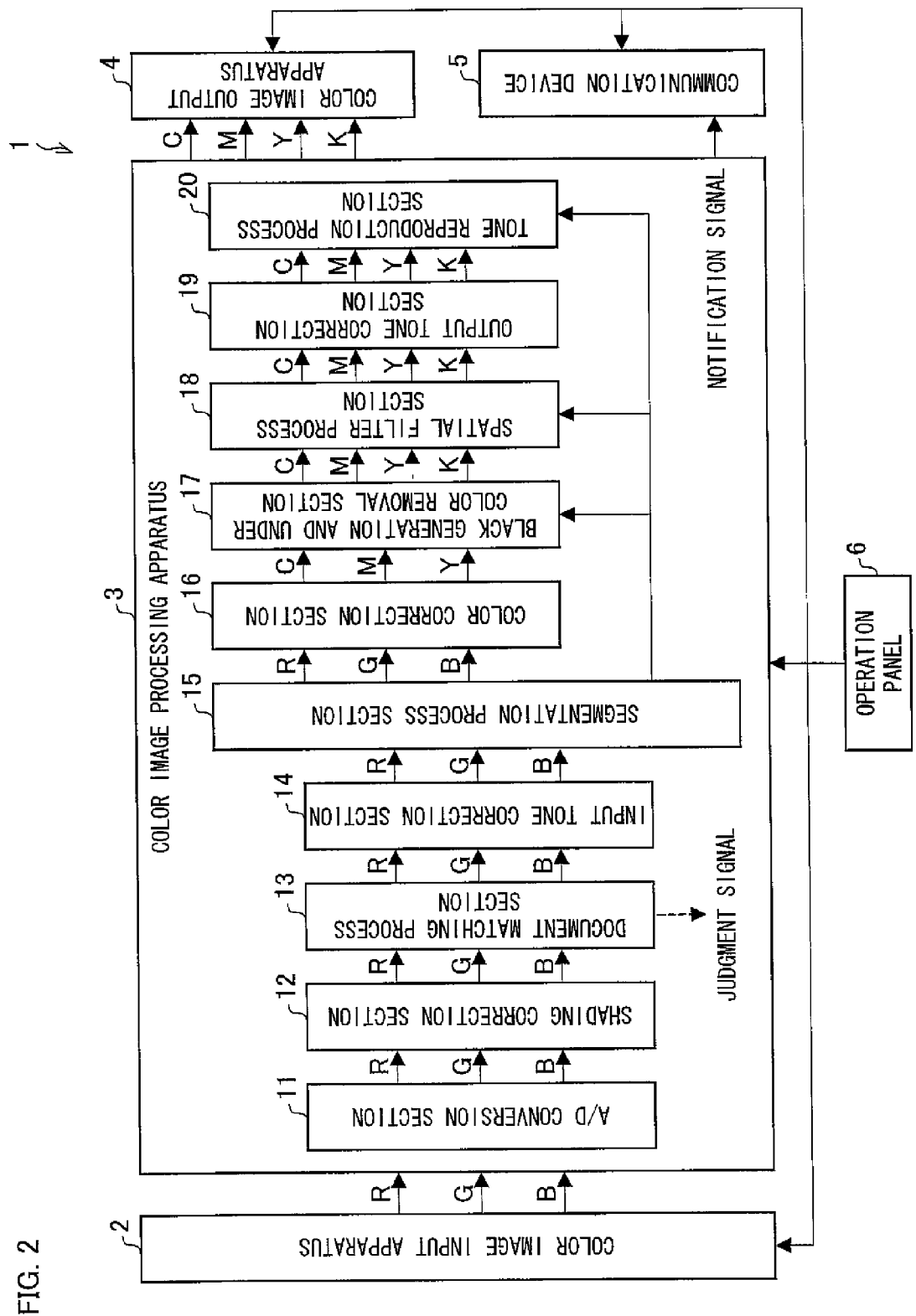
FIG. 2 is a block diagram schematically illustrating an image processing apparatus in accordance with one embodiment of the present invention.

FIG. 2 is a block diagram schematically illustrating an arrangement of a digital color multi-function printer (image processing apparatus, image forming apparatus, image reading apparatus) 1 according to the present embodiment. The digital color multi-function printer 1 has a copying function, a printing function, a facsimile-transmission function, a scanning function, a scan-to-E-mail function, and the like.

As illustrated in FIG. 2, the digital color multi-function printer 1 includes a color image input apparatus 2, a color image processing apparatus 3, a color image output apparatus 4, a communication device 5, and an operation panel 6.

The color image input apparatus (image reading apparatus) 2 is, for example, composed of a scanner (not shown) including a CCD (Charge Coupled Device) for converting optical information into an electric signal. The color image input apparatus 2 reads an optical image reflected from an original document as RGB (R: Red, G: Green, B: Blue) analog signals and supplies the RGB analog signals to the color image processing apparatus 3.

The color image processing apparatus 3 includes an A/D converter 11, a shading correction section 12, a document matching process section 13, an input tone correction section 14, a segmentation process section 15, a color correction section 16, a black generation and under color removal section 17, a spatial filter process section 18, an output tone correction section 19, and a tone reproduction process section 20. The analog signals read by the color image input apparatus 2 are transmitted to the A/D converter 11, the shading correction section 12, the document matching process section 13, the input tone correction section 14, the segmentation process section 15, the color correction section 16, the black generation and under color removal section 17, the spatial filter process section 18, the output tone correction section 19, and the tone reproduction process section 20 in this order in the color image processing apparatus 3. Ultimately, the analog signals are outputted to the color image output apparatus 4 as CMYK digital color signals.

The A/D (Analog/Digital) converter 11 converts the RGB analog signals into RGB digital signals.

The shading correction section 12 removes various distortions produced in an illumination system, an image focusing system, and an image sensing system of the color image input apparatus 2 from the RGB digital signals transmitted from the A/D converter 11. Moreover, the shading correction section 12 adjusts color balance of the RGB digital signals and converts each signal into a signal (e.g. a density signal) which can be processed easily by an image processing system used in the color image processing apparatus 3.

The document matching process section 13 gives determination on a similarity between input image data and a reference image (determines whether there is any similarity or not). Further, the document matching process section 13 outputs the inputted RGB signals to the subsequent input tone correction section 14 without any modification. Note that, the document matching process section 13 will be detailed later.

The input tone correction section 14 removes background color (density component of the background: background density) from the RGB signals whose various distortions have been removed by the shading correction section 12, and adjusts image quality such as contrast.

The segmentation process section 15 separates each pixel of an input image into either one of a text region, a halftone dot region, or a photograph (continuous tone) region, according to the RGB signals. On the basis of a result of the separation, the segmentation process section 15 outputs a segmentation class signal, indicating which region a pixel of the input image belongs to, to the color correction section 16, the black generation and under color removal section 17, the spatial filter process section 18, and the tone reproduction process section 20. The segmentation process section 15 also outputs the input signal as received from the input tone correction section 14 to the subsequent color correction section 16 without any modification.

The color correction section 16 removes color impurity on the basis of spectral characteristics of CMY (C: Cyan, M:

Magenta, and Y: Yellow) color materials including an unnecessarily absorption component, in order to realize a faithful color reproduction.

The black generation and under color removal section 17 performs (i) black generation processing for generating a black (K) signal from three color (CMY) signals after the color correction processing and (ii) generation processing of new CMY signals by removing the K signal obtained by the black generation processing from the original CMY signals. As a result, the three CMY signals are converted into four CMYK signals.

With the use of a digital filter, the spatial filter process section 18 performs a spatial filter processing on the basis of a segmentation class signal, with respect to the image data which is received in the form of the CMYK signals from the black generation and under color removal section 17. In the spatial filter processing, the spatial filter process section 18 corrects a spatial frequency characteristic, so as to reduce blur or granularity deterioration in an output image. The tone reproduction process section 20, as with the spatial filter process section 18, performs a predetermined process with respect to the image data in the form of the CMYK signals, on the basis of the segmentation class signal.

For example, in the region separated into a text region by the segmentation process section 15, the spatial filter process section 18 strongly emphasizes a high frequency component in an edge enhancement process of the spatial filter processing, in order to improve reproducibility of a black text or a color text especially. Concurrently, the tone reproduction process section 20 selects either binary processing or multi-level dithering on a high-resolution screen suitable for reproducing the high frequency component.

In the region separated into a halftone dot region by the segmentation process section 15, the spatial filter process section 18 performs a low pass filter processing for removing an input halftone dot component. The output tone correction section 19 performs the output tone correction processing in which a signal such as a density (pixel value) signal is converted into a halftone dot area rate that is characteristics of the color image output apparatus 4. Subsequently, the tone reproduction process section 20 performs the tone reproduction processing (halftone generation) so that, ultimately, an image is segmented into pixels and each tone of the pixels can be reproduced. In the region separated into a photograph region by the segmentation process section 15, the binary processing or the multi-level dithering is performed on a screen suitable for tone reproduction.

The image data which has been subjected to each of the processing mentioned above is temporarily stored in a storage device (not shown). The image data is read from the storage device at a predetermined timing and supplied to the color image output apparatus 4.

The color image output apparatus 4 outputs the image data supplied from the color image processing apparatus 3 to a printing medium such as paper. The color image output apparatus 4 is not particularly limited and may be a color image output apparatus which uses an electrophotographic method or an ink-jet method.

The communication device 5 is composed of a modem or a network card for example. The communication device 5 communicates with other device connected to a network (e.g., a personal computer, a server device, other digital multi-function printer, a facsimile device, and the like) via a network card, a LAN cable, and the like.

Note that, in case of transmitting image data, the communication device 5 carries out a transmission procedure to secure a state where transmission can be performed, and then reads out, from a memory, the image data compressed (encoded) in a predetermined format (image data scanned by a scanner) and carries out necessary processing such as change of the encoding format so as to sequentially transmit the image data via a communication line.

Further, in case of receiving image data, the communication device 5 carries out a communication procedure and receives the transmitted image data so as to input the image data to the color image processing apparatus 3. The received image data is subjected to a predetermined process such as a decoding process, a rotation process, a resolution change process, output tone correction, and a tone reproduction process by the color image processing apparatus 3, and the image data thus processed is outputted by the color image output apparatus 4. Note that, the present invention may be arranged so that the received image data is stored in a storage device (not shown) and the stored image data is read out by the color image processing apparatus 3 as necessary so as to be subjected to the aforementioned processing.

The operation panel 6 includes, for example, a display section (not shown) such as a liquid crystal display and setting buttons (not shown). The operation panel 6 causes the display section to display information corresponding to an instruction of a main control section (not shown) of the digital color multi-function printer 1 and transmits information, inputted by the user with use of the setting buttons, to the main control section. The user can input, via the operation panel 6, a process request (e.g., a processing mode (copy, printing, transmission, editing and the like), the number of images to be processed (the number of images to be copied, the number of images to be printed), a transmission destination of input image data, update of a reference image, and the like) with respect to the image data. The main control section is composed of a CPU (Central Processing Unit) and the like for example. In accordance with a program or various data stored in a ROM (not shown) or the like and information which is entered via the operation panel 6, the main control section controls each operation of each section of the digital color multi-function printer 1.

(1-2 Document Matching Process Section 13)

Next explained is the document matching process section 13 in detail. The document matching process section 13 according to the present embodiment extracts plural feature points from the input image data, determines a set of local feature points relative to each of the extracted feature points, selects a partial set of feature points out of the determined set of local feature points, calculates invariants each of which is relative to geometric transformation as a value characterizing the selected partial set in accordance with plural combinations of feature points in the partial set, calculates a hash value by combining the calculated invariants, and votes for a reference image corresponding to the hash value, thereby retrieving a reference image similar to the input image data and carrying out a similarity determination process (whether there is any similarity or not) with respect to the reference image.

Figure 3:
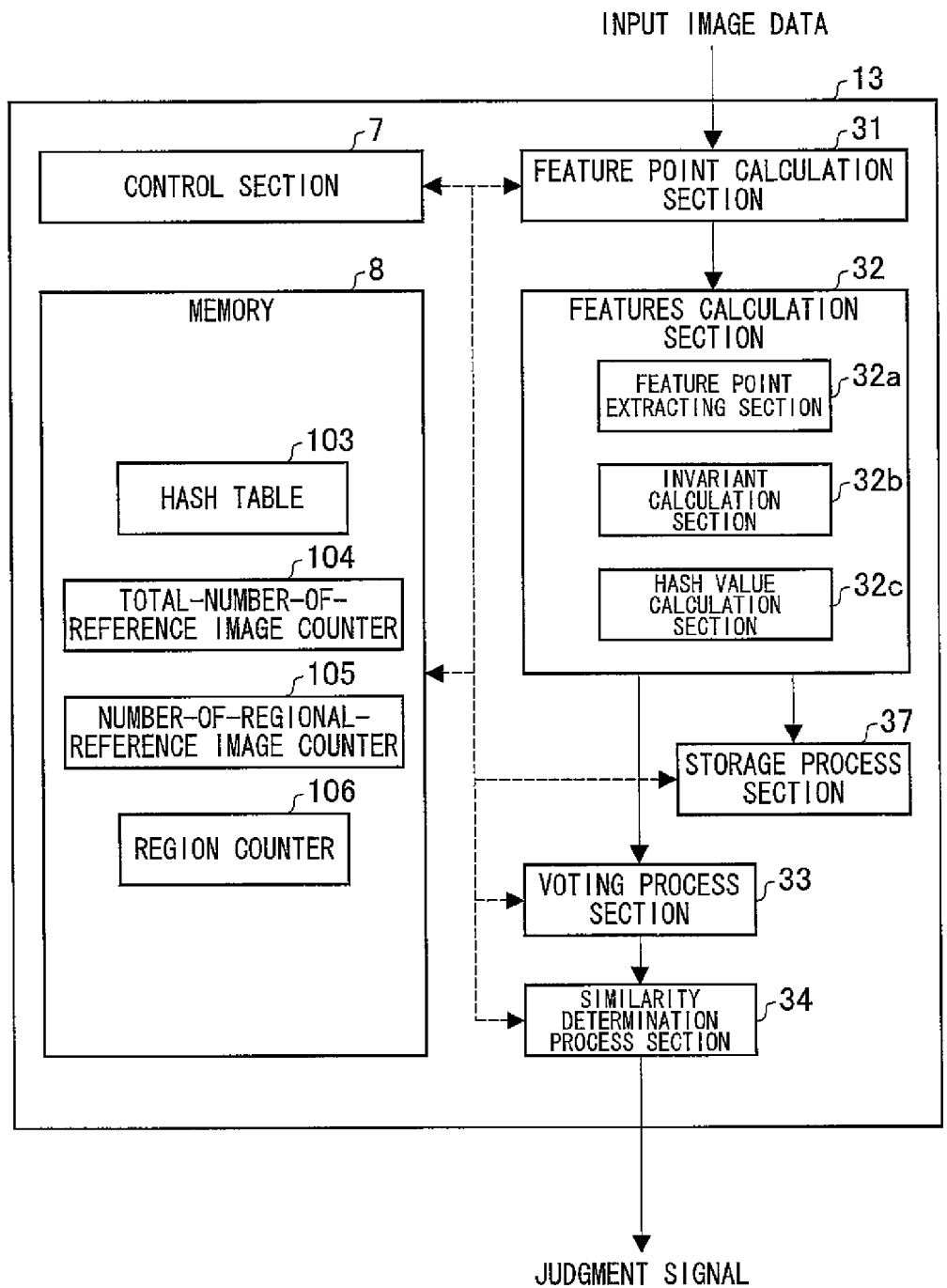
FIG. 3 is a block diagram schematically illustrating a structure of a document matching process section included in an image processing apparatus in accordance with an embodiment of the present invention.

FIG. 3 is a block diagram schematically illustrating an arrangement of the document matching process section 13. As illustrated in FIG. 3, the document matching process section 13 includes a feature point calculation section 31, a features (feature vectors) calculation section 32, a voting process section 33, a similarity determination process section 34, a storage process section 37, a control section 7, and a memory section 8.

The control section 7 controls operations of the sections of the document matching process section 13. Note that, the control section 7 may be provided in the main control section for controlling operations of the sections of the digital color multi-function printer 1 or may be provided separately from the main control section so as to cooperate with the main control section in controlling operations of the document matching process section 13.

Further, the control section 7 performs a control for dividing a storage region of a hash table 103 provided in the memory 8 into a plurality of divided regions and storing features of a reference image that is calculated by the features calculation section 32 in a divided region corresponding to a preset condition. Further, in a case where the number of reference images stored in the hash table 103 reaches a predetermined number, in a case where a user instructs deletion or overwriting of a reference image, or in a case where a predetermined condition for deletion or overwriting of a reference image is satisfied, the control section 7 performs a control for deleting a part of data stored in the hash table 103 or overwriting a part of data stored in the hash table 103 by new data. These processes will be detailed later.

The memory 8 is a memory in which various data used for processes of each section of the document matching process section 13, results of the processes, and the like are stored. The memory 8 includes the hash table 103, a total-number-of-reference image counter 104, a number-of-regional-reference image counter 105, a region counter 106, and the like.

The hash table 103 is a table (storage section) in which an index for a reference image (identification information for identifying a reference image) and a feature quality of the reference image are stored in such a manner that the index and the feature quality are related to each other. The total-number-of-reference image counter 104 stores a count number obtained by counting the number of reference images stored in the hash table 103. The number-of-regional-reference image counter 105 stores a count value obtained by counting the number of reference images stored in divided regions (mentioned later), with respect to each divided region. The region counter 106 stores a value indicative of a divided region that is set at present as a divided region where a reference image is stored. The hash table 103 and the counters will be detailed later.

The memory 8 or a part of the memory 8 (e.g. hash table 103) may be stored in a folder to which only a specific user authorized to carry out browsing and editing (e.g. person in charge of security (administrator) in corporation or shop) is accessible. In this case, authentication information for the specific user (e.g. user name, password) is stored in the folder, and an authentication process is carried out using the authentication information in response to an access request, thereby determining whether to permit access or not. A method of such authentication is not limited and may be one of conventional and publicly known methods.

The feature point calculation section 31 extracts a connected component of a text or a ruled line and performs calculation with a centroid of the connected component used as a feature point. However, the arrangement of the feature point calculation section 31 is not limited to this, and the feature point may be calculated in accordance with various conventionally known methods for example.

Figure 4:
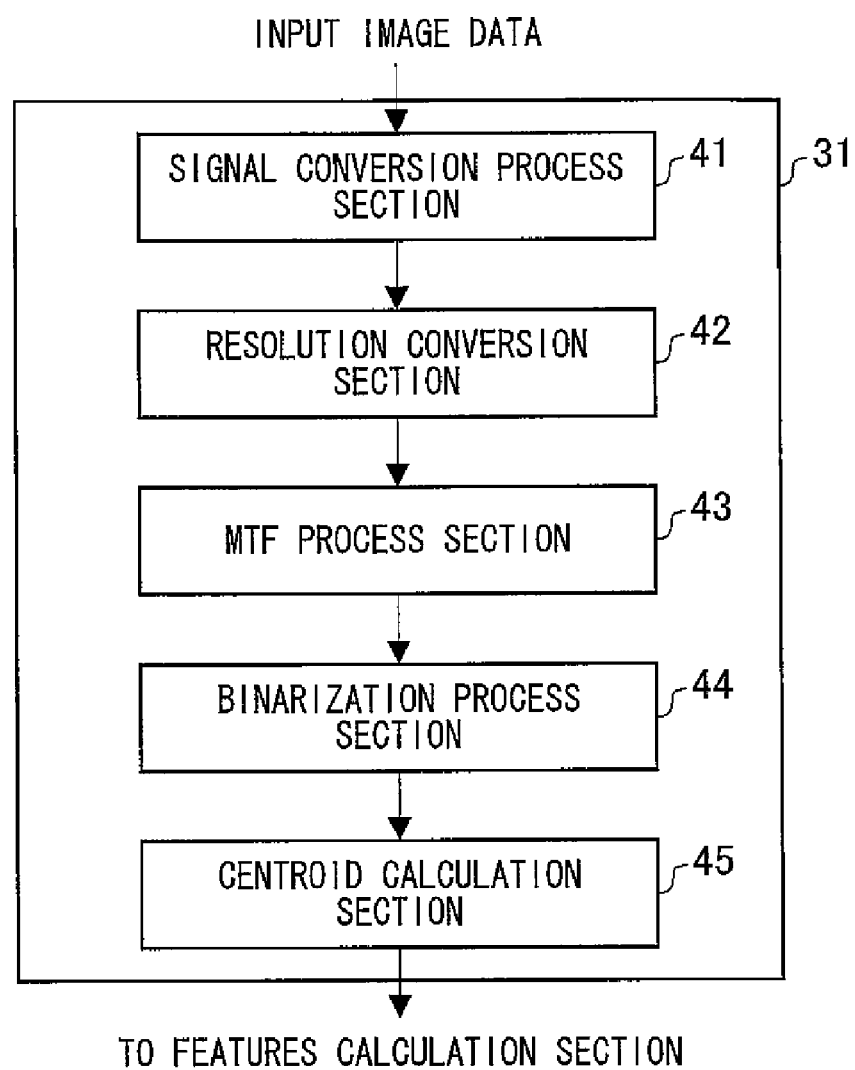
FIG. 4 is a block diagram schematically illustrating a structure of a feature point calculation section included in an image processing apparatus in accordance with one embodiment of the present invention.

FIG. 4 is a block diagram schematically illustrating an arrangement of the feature point calculation section 31. As illustrated in FIG. 4, the feature point calculation section 31 includes a signal conversion process section 41, a resolution conversion section 42, an MTF process section 43, a binarization process section 44, and a centroid calculation section 45.

In case where image data (RGB signals) inputted from the shading correction section 12 is a color image, the signal conversion process section 41 achromatizes the image data and converts the achromatized image data into a lightness signal or a luminance signal.

For example, the signal conversion process section 41 converts the RGB signals into a luminance signal Y in accordance with the following expression (1).

$$Y_i = 0.30 R_i + 0.59 G_i + 0.11 B_i \quad (1)$$

"Y" refers to a luminance signal of each pixel, and each of R, G, and B is a color component of the RGB signals, and "i" subsequently added to "Y", "R", "G", and "B" represents a value given to each pixel (i is an integer not less than 1).

Alternatively, the RGB signals may be converted into CIE1976L*a*b* signal (CIE: Commission International de l'Eclairage, L*: lightness, a*, b*: chromaticity).

The resolution conversion section 42 scales up/down the input image data. For example, in case where the input image data is optically scaled up/down by the image input device 2, the resolution conversion section 42 scales up/down the input image data again so as to have a predetermined resolution. Further, in order to reduce processes carried out by the subsequent process sections, the resolution conversion section 42 may carry out resolution conversion for making the resolution lower than a resolution in being scanned by the image input device 2 at an equal scale factor (for example, image data scanned at 600 dpi (dot per inch) is converted into data of 300 dpi or a similar operation is carried out).

The MTF (modulation transfer function) process section 43 is used to cover (adjust) unevenness of spatial frequency characteristics among a plurality of the color image input apparatuses 2. In the image signal outputted from the CCD, MTF deterioration occurs due to an optical component such as a lens or a mirror, an aperture in a light receiving surface of the CCD, transfer efficiency or afterimage, storage effect or scanning unevenness caused by physical scanning, and a similar cause. The MFT deterioration causes the scanned image to blur. The MTF process section 43 carries out an appropriate filtering process (emphasizing process) so as to recover the blur caused by the MTF deterioration. Further, the MTF process section 43 is used also to suppress an unnecessary high frequency component in extracting feature points by the subsequent centroid calculation section 45. That is, a mixing filter (not shown) is used to carry out an emphasizing process and a smoothing process. Note that, FIG. 5 illustrates an example of a filter coefficient of the mixing filter.

The binarization process section 44 compares achromatized image data (luminance value (luminance signal) or lightness value (lightness signal)) with a preset threshold value so as to binarize the image data.

Figure 6:
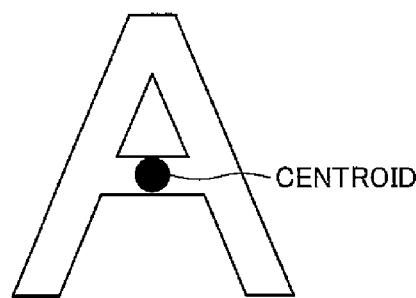
FIG. 6 is an explanatory drawing illustrating: an example of a connected component extracted from input image data by the feature point calculation section in the image processing apparatus in accordance with one embodiment of the present invention; and an example of a centroid of the connected component.
Figure 7:
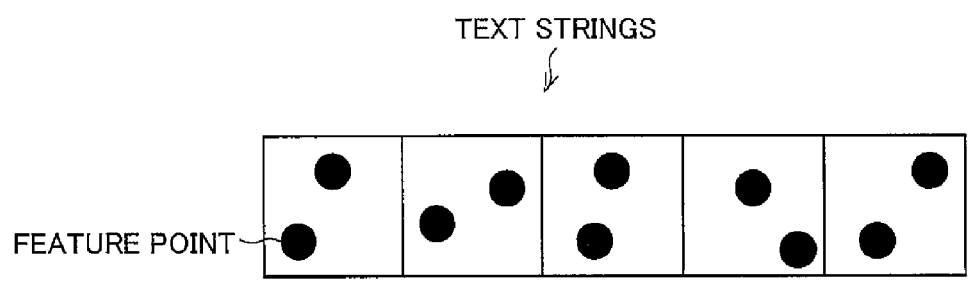
FIG. 7 is an explanatory drawing illustrating an example of centroids (feature points) of connected components extracted from a text string in input image data by the feature point calculation section in the image processing apparatus in accordance with one embodiment of the present invention.

The centroid calculation section 45 carries out labeling (labeling process) with respect to each pixel in accordance with the image data binarized by the binarization process section 44 (for example, the binarized data is represented by "1" or "0"). Further, a connected component between pixels having the same label is specified and a centroid of the specified connected component is extracted as a feature point. Further, the extracted feature point is outputted to the features calculation section 32. FIG. 6 is an explanatory drawing illustrating the connected component extracted from the input image data and a centroid of the connected component as an example. In this figure, the connected component corresponding to a character "A" and the centroid thereof are illustrated. Further, FIG. 7 is an explanatory drawing illustrating an example of centroids (feature points) of plural connected components extracted from a text string included in the input image data. Note that, the feature point can be expressed by coordinate values (x coordinate, y coordinate) of a binary image.

The features calculation section 32 includes a feature point extraction section 32a, an invariant calculation section 32b, and a hash value calculation section 32c. A feature point calculated by the feature point calculation section 31 is used to calculate features (hash value and/or invariant) which is invariable relative to geometric transformation such as rotation, parallel shift, scaling up, scaling down, and the like of a document image.

Figure 8:
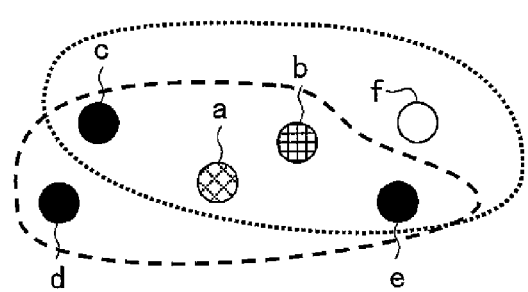
FIG. 8 is an explanatory drawing illustrating examples of a target feature point and a peripheral feature point that are extracted at a time when the features calculation section in the image processing apparatus in accordance with one embodiment of the present invention calculates features.

As illustrated in FIG. 8, the feature point extraction section 32a regards only one feature point as a target feature point and sequentially extracts peripheral feature points around the target feature point in such order that a feature point nearer to the target feature point is more preferentially extracted so as to extract a predetermined number of feature points (four feature points herein). In FIG. 8, four feature points b, c, d, and e are extracted as peripheral feature points in case where a feature point a is regarded as a target feature point, and four feature points a, c, e, and f are extracted as peripheral feature points in case where a feature point b is regarded as a target feature point.

Further, the feature point extraction section 32a extracts a combination of three points which can be selected from the four peripheral feature points extracted in the foregoing manner. For example, as illustrated in FIGS. 9(a) to 9(c), in case where a feature point a in FIG. 8 is regarded as a target feature point, a combination of three feature points b, c, d, and e, that is, a combination of peripheral feature points b, c, and d, a combination of peripheral feature points b, c, and e, and a combination of peripheral feature points b, d, and e are extracted.

Next, the invariant calculation section 32b calculates an invariant (one of characteristic quantities) Hij of the extracted combination relative to geometrical transformation. Herein, "i" represents the number of target feature point(s) (i is an integer not less than 1), and "j" represents the number of combinations of three peripheral feature points (j is an integer not less than 1). In the present embodiment, a ratio of lengths of two lines connecting the peripheral characteristics is set as the invariant Hij. Note that, the lengths of the lines are calculated in accordance with coordinates of the peripheral characteristics. For example, in FIG. 9(a), when a length of a line connecting the feature point c and the feature point d is A11 and a length of a line connecting the feature point c and the feature point b is B11, the invariant H11 is such that H11=A11/B11. Further, in FIG. 9(b), when a length of a line connecting the feature point c and the feature point b is A12 and a length of a line connecting the feature point b and the feature point e is B12, the invariant H12 is such that H12=A12/B12. Further, in FIG. 9(c), when a length of a line connecting the feature point d and the feature point b is A13 and a length of a line connecting the feature point b and the feature point e is B13, the invariant H13 is such that H13=A13/B13. In this manner, the invariants H11, H12, and H13 are calculated in the examples illustrated in FIGS. 9(a) to 9(c).

Next, the hash value calculation section 32c calculates a remainder of $(Hi1 \times 10^2 + Hi2 \times 10^1 + Hi3 \times 10^0)/D$ as a hash value (one of characteristic quantities) Hi and stores the calculated Hi into the memory 8. Note that, D is a constant number which is set beforehand according to a range which is to be set as a remainder value range.

Note that, how to calculate the invariant Hij is not particularly limited. For example, a value calculated in accordance with a compound ratio of five points in the vicinity of the target feature point, or a value calculated in accordance with a compound ratio of five points extracted from n points in the vicinity of the target feature point (n is such an integer that n≧5), or a value calculated in accordance with an arrangement of m points extracted from n points in the vicinity of the target feature point (m is such an integer that m<n and m≧5) and a compound ratio of five points extracted from the m points may be set as the invariant Hij relative to the target feature point. Note that, the compound ratio is a value calculated from four points in a straight line or from five points on a plane and is known as an invariant relative to projective transformation which is a kind of geometric transformation.

Further, an expression for calculating the hash value Hi is not limited to the foregoing expression (2), and other hash function (for example, any one of hash functions mentioned in Patent Document 4) may be used.

Further, when extraction of peripheral feature points around a target feature point and calculation of the hash value Hi are completed, each section of the features calculation section 32 focuses on another feature point to change the target feature point and performs extraction of peripheral feature points and calculation of a hash value. In this manner, each section of the features calculation section 32 calculates hash values corresponding to all the feature points.

Figure 10:
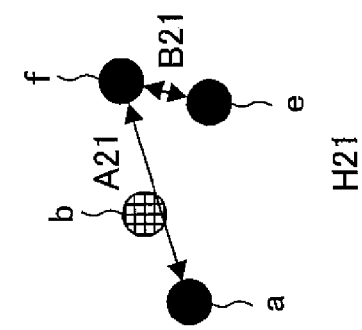
FIGS. 10(a) to 10(c) are explanatory drawings each illustrating an example of a combination of a target feature point and a peripheral feature point that are extracted at a time when the features calculation section in the image processing apparatus in accordance with one embodiment of the present invention calculates features.
Figure 10:
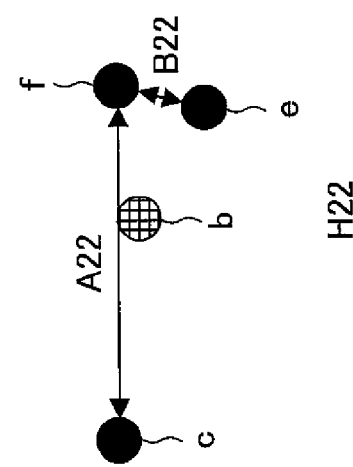
Figure 10:
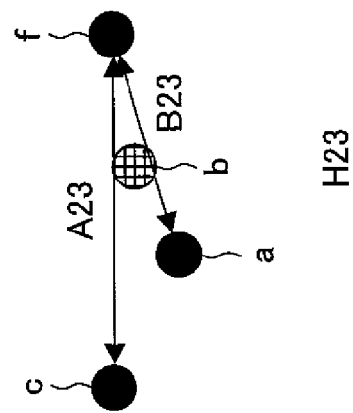

In FIG. 8, when extraction of peripheral feature points around a feature point a regarded as a target feature point and calculation of a hash value are completed, peripheral feature points around a feature point b regarded as a target feature point are extracted and a hash value is calculated. In FIG. 8, four feature points a, c, e, and f are extracted as peripheral feature points in case where the feature point b is regarded as a target feature point. Further, as illustrated in FIGS. 10(a) to 10(c), a combination of three points (peripheral feature points a, e, and f, peripheral feature points c, e, and f, peripheral feature points a, c, and f) selected from the peripheral feature points a, c, e, and f is extracted and a hash value corresponding to the combination is calculated, and the calculated hash value is stored in the memory 8. Further, this process is repeated so as to correspond to the number of the feature points, thereby calculating hash values corresponding to the respective feature points each of which is regarded as the target feature point. Then, the calculated hash values are stored in the memory 8.

Note that, how to calculate the invariant when the feature point a is regarded as the target feature point is not limited to the aforementioned manner. For example, it may be so arranged that: as illustrated in FIGS. 45(a) to 45(d), in case where the feature point a illustrated in FIG. 8 is regarded as the target feature point, a combination of three points out of peripheral feature points b, c, d, and e, that is, a combination of peripheral feature points b, c, and d, a combination of peripheral feature points b, c, and e, a combination of peripheral feature points b, d, and e, and a combination of peripheral feature points c, d, and e are extracted, and an invariant (one of characteristic quantities) Hij relative to geometric transformation is calculated with respect to each of the extracted combinations.

Further, it may be so arranged that: in case where the feature point b illustrated in FIG. 8 is regarded as the target feature point, as illustrated in FIGS. 46(a) to 46(d), a combination of three points (peripheral feature points a, e, and f, peripheral feature points a, c, and e, peripheral feature points a, f, and c, peripheral feature points e, f, and c) is extracted from four feature points a, c, e, and f, and an invariant Hij relative to geometric transformation is calculated with respect to each combination. Note that, in this case, a remainder of $(Hi1\times10^3+Hi2\times10^2+Hi3\times10^1+Hi4\times10^0)/D$ is calculated as a hash value, and the calculated hash value is stored in the memory 8.

Further, in the aforementioned example, a line connecting a peripheral feature point nearest to the target feature point and a peripheral feature point secondarily nearest to the target feature point is Aij and a line connecting the peripheral feature point nearest to the target feature point and a peripheral feature point thirdly nearest to the target feature point is Bij, but the definition is not limited to this. The lines used to calculate the invariant Hij may be set in any manner as in such a manner that the lines are set in accordance with a length of each of lines connecting the peripheral feature points.

Note that, in case of storing the input image data as a reference image, the features calculation section 32 transmits the hash value (features) calculated in the foregoing manner and corresponding to each characteristic of the input image data to the storage process section 37.

The storage process section 37 sequentially stores (i) hash values calculated by the features calculation section 32 and corresponding to the respective feature points and (ii) indices (document IDs) each indicative of a document (reference image) to the hash table 103 provided in the memory 8 (see FIG. 11(*a*)). In case where the hash values have already been stored, the document IDs are stored with them respectively corresponding to the hash values. Document IDs are serially assigned to respective documents without any duplication. Note that, in case where the number of documents stored in the hash table 103 is larger than a predetermined value (for example, 80% of the number of documents which can be stored), old document IDs may be searched and sequentially deleted. Further, the deleted document IDs may be reused as document IDs of new reference images. Further, in case where the calculated hash values are identical with each other (H1=H5 in FIG. 11(*b*)), these values may be collectively stored into the hash table 103. Further, in response to an instruction from the control section 7, the storage process section 37 divides the hash table 103 into a plurality of storage regions (divided regions), selects a divided region where a reference image is to be stored in accordance with a predetermined storage condition, and causes the reference image to be stored in the selected divided region. Methods for division and storage will be detailed later.

Further, in case of determining whether the input image data is identical with image data of an image having been already stored (similarity determination process), the features calculation section 32 transmits, to the voting process section 33, the hash value calculated in the foregoing manner and corresponding to each feature point.

Figure 12:
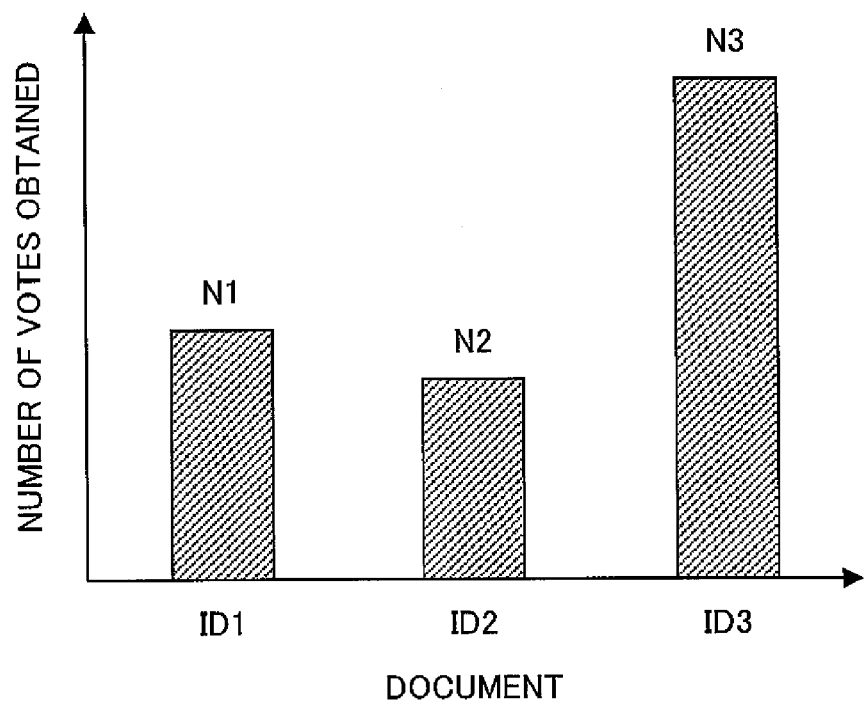
FIG. 12 is a graph showing an example of the number of votes for each reference image in a voting process section of the image processing apparatus in accordance with one embodiment of the present invention.

The voting process section 33 compares the hash value calculated from the input image data and corresponding to each feature point with the hash value stored in the hash table 103 so as to vote for a reference image having the same hash value. In other words, there is counted the number of times the same hash value as a hash value of the reference image is calculated from the input image data for each reference image, and the counted number is stored in the memory 8. FIG. 12 is a graph illustrating an example of the number of votes for reference images ID1, ID2, and ID3.

The similarity determination process section 34 reads out a vote result of the voting process section 33 (an index of each reference image and the number of votes for each reference image: similarity) from the memory 8, and extracts the maximum number of votes obtained and an index of a reference image with the maximum number of votes obtained. Further, the similarity determination process section 34 compares the maximum number of votes obtained with a predetermined threshold value TH1 so as to determine whether there is any similarity or not (whether the input image data is identical with image data of the reference image or not), and sends a determination signal indicative of the determination result to the control section 7. That is, in case where the maximum number of votes obtained is not less than the predetermined threshold value TH1, it is determined that "there is a similarity (the input image data is identical with image data of the reference image)", and in case where the maximum number of votes is less than the threshold value TH1, it is determined that "there is no similarity (the input image data is not identical with image data of the reference image)".

Alternatively, it may be so arranged that: the similarity determination process section 34 divides the number of votes obtained for each reference image by a total number of votes (total number of feature points extracted from the input image data) and normalizes the result so as to calculate the similarity, thereby comparing the similarity with the predetermined threshold value TH1 (80% of the number of total votes for example) to determine the similarity.

Further, it may be so arranged that: the similarity determination process section 34 divides the number of votes obtained for each reference image by the number of times of storing a hash value (maximum number of times a hash value is stored) corresponding to a reference image whose hash value is most frequently stored and normalizes the result so as to calculate the similarity, thereby comparing the similarity with the predetermined threshold value TH1 (80% of the number of total votes for example) to determine the similarity. That is, in case where the calculated similarity is not less than a threshold value TH1, it is determined that "there is a similarity", and in case where the calculated similarity is less than the threshold value TH1, it is determined that "there is no similarity". Note that, in this case, the total number of hash values extracted from the input image data may be larger than the maximum number of times of storing a hash value (particularly, a case where the document and/or the reference image partially has a handwritten part), so that the calculated value of the similarity may exceed 100%.

Further, the threshold value TH1 in determining the similarity may be constant for each reference image or may be set for each reference image in accordance with a priority or the like of the reference image. As to the priority of the reference image, for example, a paper currency, a valuable stock certificate, a top-secret document, a restricted document, and the like are regarded as having maximum priority, and a secret document is regarded as being less important than a paper current or the like. In this manner, the priority may be set by stages according to each reference image. In this case, a weighting coefficient according to priority of a reference image is stored in the memory 8 with the weighting coefficient corresponding to an index of the reference image, and the similarity determination process section 34 determines the similarity by using the threshold value TH1 corresponding to the reference image obtaining the maximum number of votes.

Further, it may be so arranged that: in determining the similarity, the threshold value TH1 is made constant and the number of votes for each reference image is multiplied by a weighting coefficient of each reference image so as to determine the similarity. In this case, the weighting coefficient according to the priority of each reference image is stored in the memory 8 with the weighting coefficient corresponding to an index of each reference image, and the similarity determination process section 34 calculates a corrected number of votes by multiplying the number of votes for each reference image by the weighting coefficient of the reference image, thereby determining the similarity in accordance with the corrected number of votes. For example, a maximum corrected number of votes may be compared with the threshold value TH1, or a value obtained by normalizing the maximum corrected number of votes by the number of total votes may be compared with the threshold value TH1, or a value obtained by normalizing the maximum corrected number of votes by the maximum number of times of storage may be compared with the threshold value TH1. Further, in this case, for example, the weighting coefficient is set to be more than 1 and to be larger as the priority of the reference image is higher.

Further, in the present embodiment, a single hash value is calculated for a single feature point (target feature point), but the present invention is not limited to this, and it may be so arranged that a plurality of hash values are calculated for a single feature point (target feature point). For example, it may be so arranged that: six points are extracted as peripheral feature points around the target feature point, and three points are extracted from five points for each of six combinations obtained by extracting five points from the six points, so as to calculate an invariant, thereby calculating a hash value. In this case, six hash values are calculated for a single feature point.

(1-3. Process of Digital Color Multi-Function Printer 1)

Figure 13:
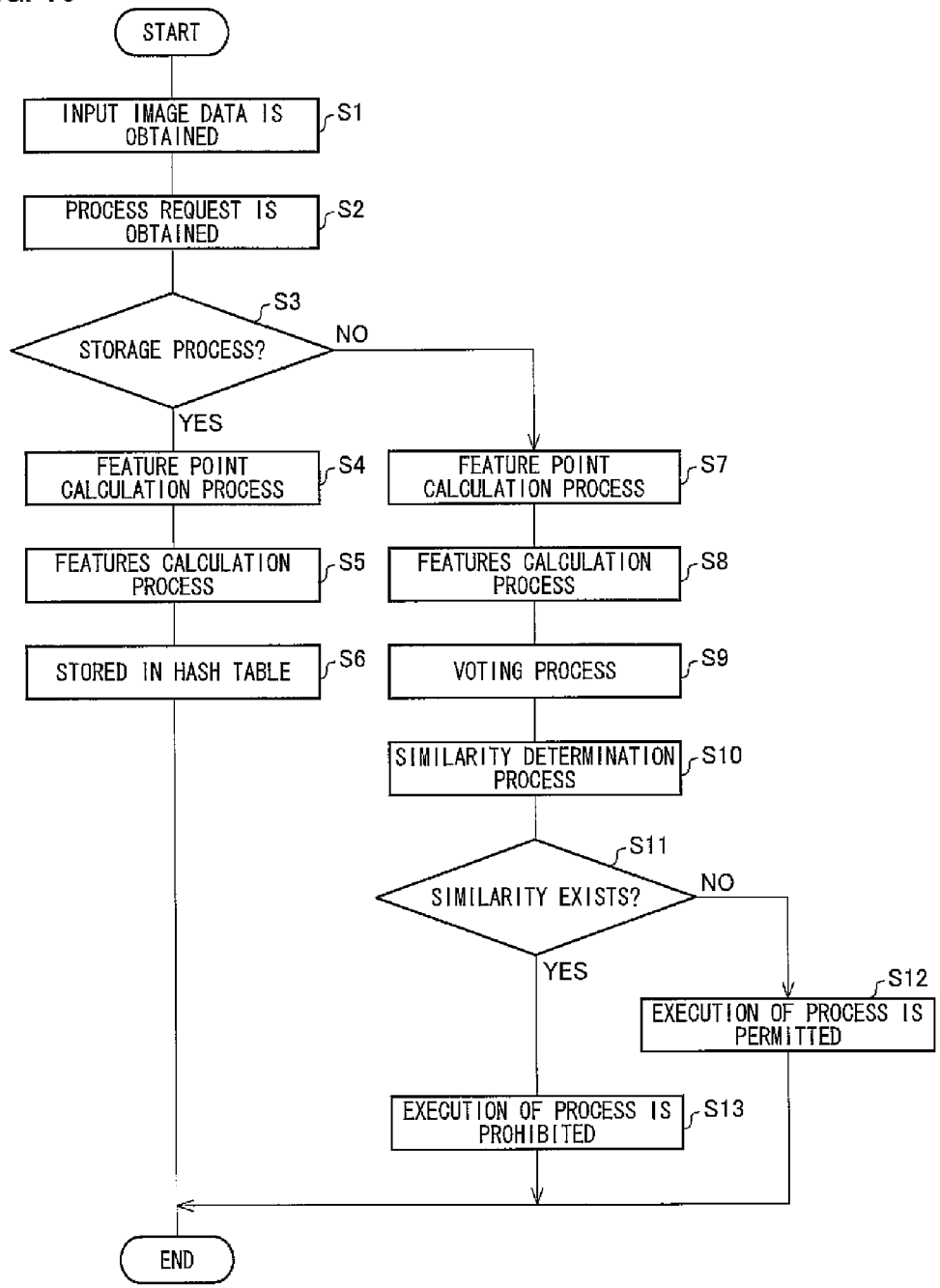
FIG. 13 is a flow chart illustrating a flow of a process in the image processing apparatus in accordance with one embodiment of the present invention.

The following explains a process of a digital color multi-function printer 1 with reference to a flowchart of FIG. 13.

Initially, the control section 7 obtains input image data and a process request (instruction input) entered by a user via the operation panel 6 or the communication device 5 (S1 and S2). The input image data may be obtained by the color image input apparatus 2 reading a document image, by the communication device 5 receiving input image data from an external device, or by reading input image data from various storage media via a card reader (not shown) included in the digital color multi-function printer 1.

Subsequently, the control section 7 judges whether a process requested by the process request is a storage process or not (S3). When judging in S3 that the requested process is the storage process, the control section 7 controls sections of the document matching process section 13 so that a feature point calculation process (S4) and a feature quality calculation process (S5) are carried out with respect to the input image data obtained in S1 and the calculated features and a document ID (index for a reference image) are stored in the hash table 103 in such a manner that the calculated features and the document ID are related to each other (S6), and then the control section 7 finishes the process. How to store in the hash table 103 will be detailed later.

On the other hand, when judging in S3 that the requested process is not the storage process, the control section 7 controls sections of the document matching process section 13 so that a feature point calculation process (S7), a features calculation process (S8), a voting process (S9), and a similarity determination process (S10) are carried out with respect to the input image data obtained in S1. The control section 7 judges whether a similarity exists or not as a result of the similarity determination process (S11). When judging in S11 that no similarity exists, the control section 7 permits the input image data to be subjected to an image process (such as copying, electronic distribution, facsimile transmission, filing, correction of image data, editing) (S12), and finishes the process.

On the other hand, when judging in S11 that a similarity exists, the control section 7 prohibits the input image data from being subjected to the image process (S13), and finishes the process. In the present embodiment, an explanation was made as to a case where execution of the process is permitted when no similarity exists and execution of the process is prohibited when a similarity exists. However, the present invention is not limited to this case. For example, the present invention may be arranged so that the result of similarity determination is sent to a predetermined notification destination. Alternatively, the present invention may be arranged so that: whether to store input image data or not, whether to overwrite a predetermined signal etc. on an output image corresponding to the input image data or not, whether to perform user authentication or not, and whether to display the result of the similarity determination or not etc. are determined according to the result of the similarity determination.

(1-4. Method for Editing the Hash Table 103)

(1-4-1a. Arrangement Example 1 of the Hash Table 103)

As illustrated in FIGS. 11(*a*) and 11(*b*) that were mentioned above, plural indices for reference images can be stored in the hash table 103 in such a manner that the indices are related to one hash value. Specifically, in the present embodiment, the number of images storable in the hash table 103 as a whole is set to 8192, the number of feature points per one image of 300 dpi is set to 2048, 7 methods of calculating a hash value are provided, the number of hash values are set to 65536, and the number of images that are storable for one hash value is set to 64. However, the number of images that are storable for one hash value is not limited to this, and may be suitably set according to resolution of a reference image, the number of a reference image, the number of a hash value of a reference image etc. used in an apparatus or a system to which the present invention is applied.

Figure 1:
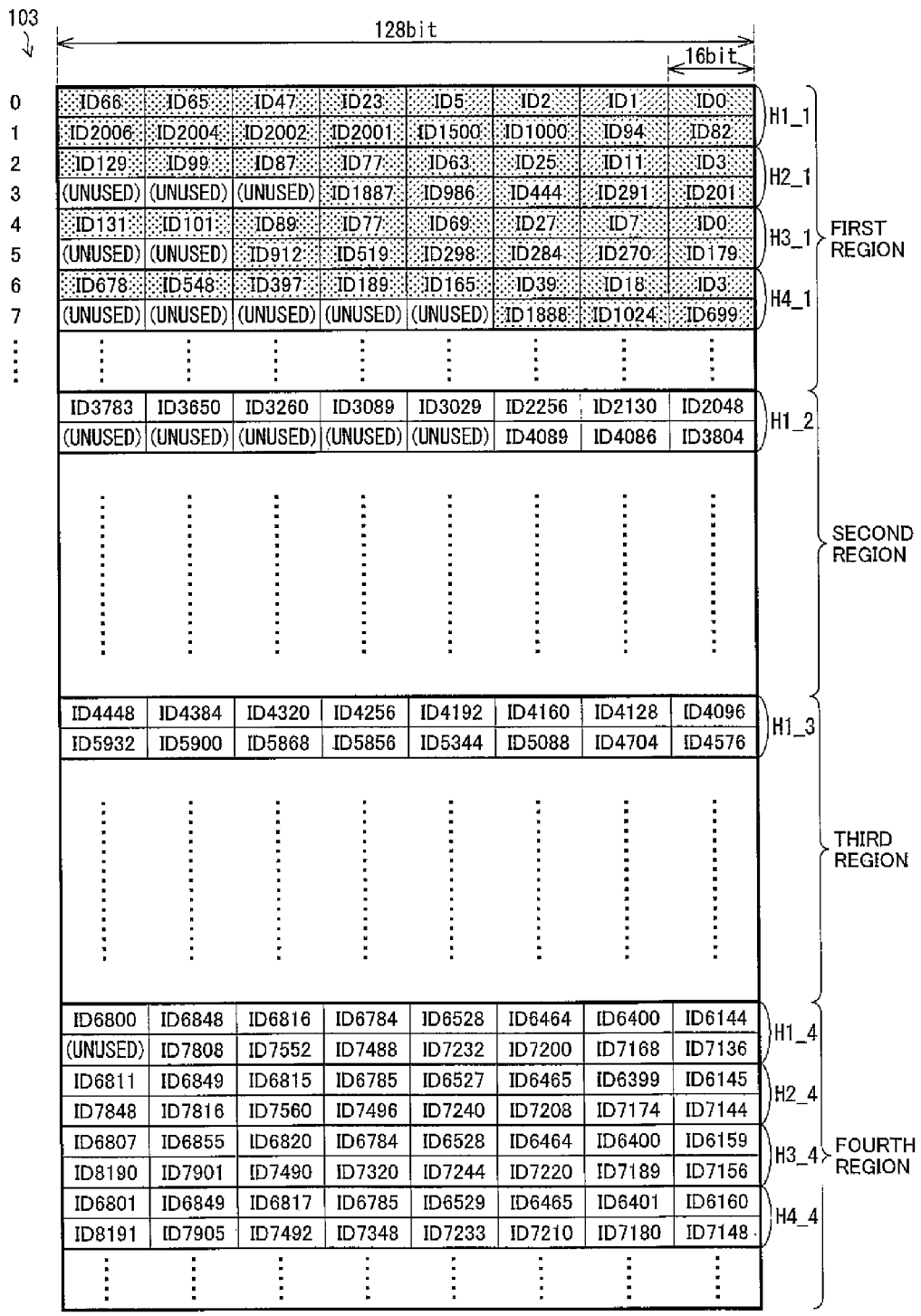
FIG. 1 is an explanatory drawing illustrating an example of a method for storing a reference image in a hash table of an image processing apparatus in accordance with one embodiment of the present invention.

FIG. 1 is an explanatory drawing illustrating an example of hash values (hash values H1, H2, H3, H4, . . . ) stored in the hash table 103 and indices for reference images stored in the hash table 103 in such a manner that the indices are related to the hash values.

In the present embodiment, as illustrated in FIG. 1, the hash table 103 is divided into plural regions (first regions to fourth regions in FIG. 1) and a storage region for an index corresponding to a hash value is divided and provided in each of the divided regions. For example, storage regions H1_1, H1_2, H1_3, and H1_4 each corresponding to a hash value H1 are provided in the first regions to the fourth regions, respectively. Similarly, each of storage regions where indices corresponding to hash values H2, H3, . . . are stored is divided and provided in the first regions to the fourth regions.

In the example of FIG. 1, with respect to each divided region, two addresses each with 128 bits are assigned as a storage region where indices corresponding to one hash value are stored. Accordingly, in the hash table 103 as a whole, 8 addresses are assigned as the storage region where indices corresponding to one hash value are stored. In FIG. 1, one index is represented with 16 bits. Consequently, 16 indices per one divided region, 64 indices per one hash value, can be stored.

In the present embodiment, the number of reference images that are storable in the hash table 103 is set to 8192 (ID0 to ID8191), and the number of reference images that are storable in each divided region is set to 2048. The first region is a storage region for indices ID0 to ID2047, the second region is a storage region for indices ID2048 to ID4095, the third region is a storage region for indices ID4096 to ID6143, and the fourth region is a storage region for indices ID6144 to ID8191.

Consequently, by specifying an index to be deleted, it is possible to uniquely determine a divided region where a start address of a region to be deleted exists and a divided region where an end address of the region to be deleted exists, in accordance with the number of addresses provided in the hash table 103 and the number of division of the hash table 103.

Further, it is possible to specify a region to be deleted in units of a divided region, such as deleting the indices ID0 to ID2047, i.e. the whole indices of the first region. In this case, it is possible to more promptly perform the deletion process, and to reduce the workload on the control section 7 for the deletion process.

(1-4-1b. Arrangement Example 2 of the Hash Table 103)

In the present embodiment, the number of reference images that are storable in the hash table is 8192. In the example of FIG. 1, out of the divided regions of the hash table 103, the first region is a storage region for indices ID0 to ID2047, the second region is a storage region for indices ID2048 to ID4095, the third region is a storage region for indices ID4096 to ID6143, and the fourth region is a storage region for indices ID6144 to ID8191.

Figure 33:
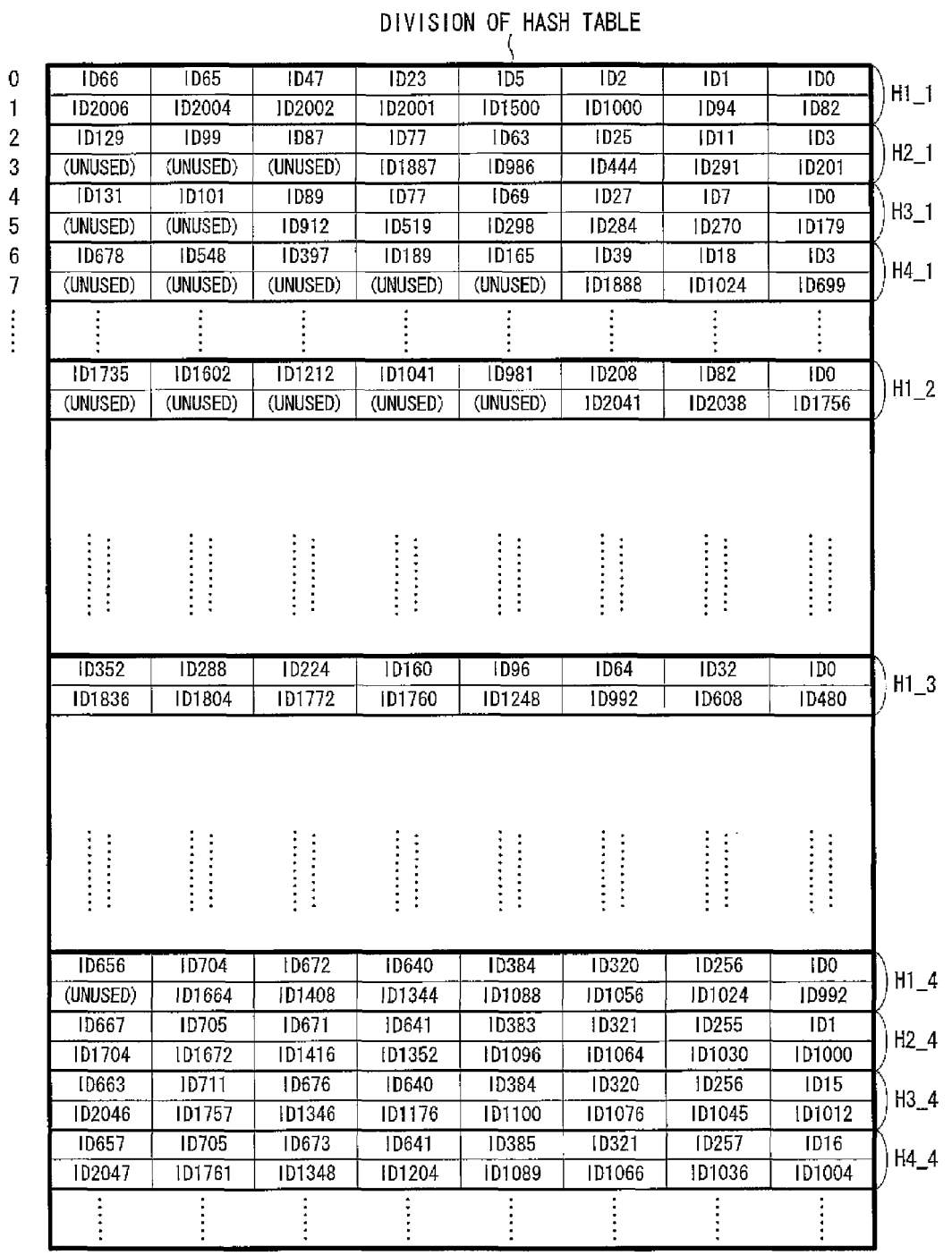
FIG. 33 is an explanatory drawing illustrating an example of a method for assigning identification information to a reference image stored in each divided region in the image processing apparatus in accordance with one embodiment of the present invention.

However, a relation between each divided region and IDs assigned to the divided region is not limited to this. For example, as illustrated in FIG. 33, the same ID may be assigned to a plurality of divided regions. That is, in the example of FIG. 33, each divided region serves as a storage region for ID0 to ID2047. This arrangement allows reducing the number of bits for indices to 11 bits (0-2047) in FIG. 33 whereas the number of bits for indices is 13 bits (0-8191) in FIG. 1. Consequently, in a case of storing 8 indices in one address as illustrated in FIG. 33, it is possible to reduce the number of bits for indices to be stored by 2 bits×8=16 bits per one address. This allows downsizing the hash table or storing more number of indices in one address. Consequently, it is possible to store more number of indices without enlarging the size of the hash table. Further, since the number of bits for indices can be reduced, it is possible to increase calculation efficiency in the voting process and the similarity determination process.

In the example of FIG. 33, since indices ID0 to ID2047 are assigned to each divided region, different documents have the same ID among a plurality of divided regions. Consequently, when the voting process is performed with respect to the whole hash table and only one set of a histogram illustrated in FIG. 12 is generated, the same vote is made for different documents having the same ID, which drops accuracy in matching determination.

For that reason, the present invention may be arranged so that the voting process is performed with respect to each divided region and one set of a histogram is generated for each voting process.

Figure 34:
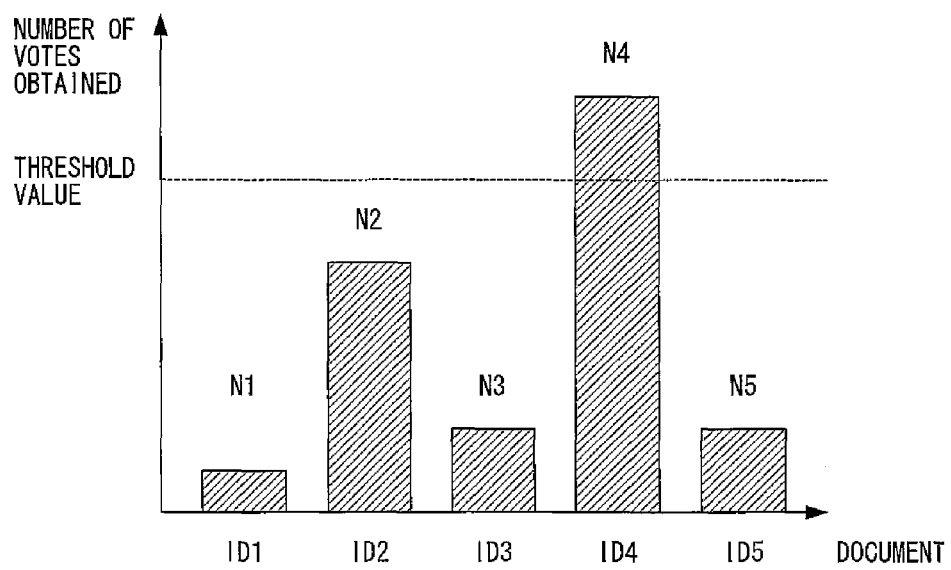
FIG. 34(a) is a table showing a result of voting with respect to each of different divided regions in the image processing apparatus in accordance with one embodiment of the present invention.
FIG. 34(b) is a histogram showing the result of the voting in FIG. 34(a).
Figure 35:
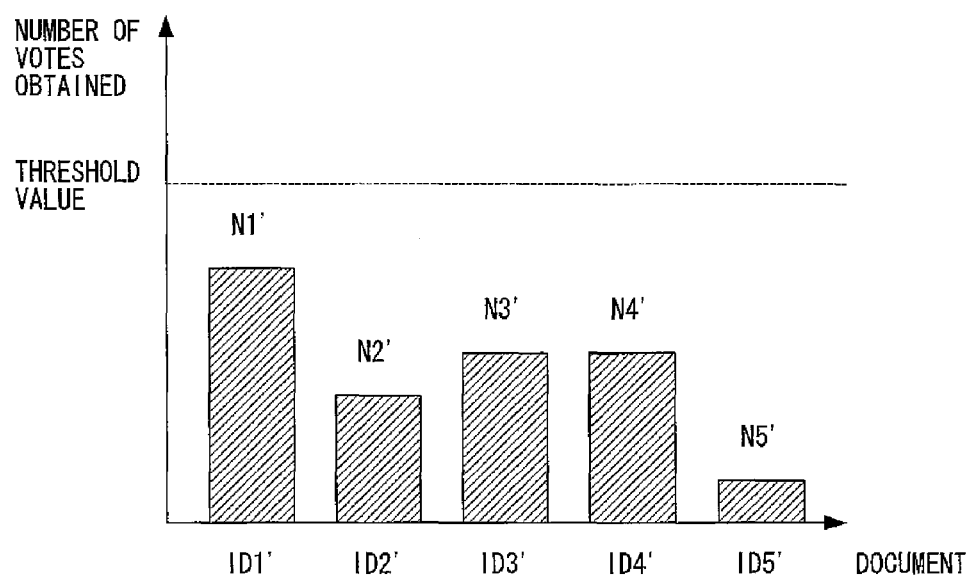
FIG. 35(a) is a table showing a result of voting with respect to each of different divided regions in the image processing apparatus in accordance with one embodiment of the present invention.
FIG. 35(b) is a histogram showing the result of the voting in FIG. 35(a).

FIGS. 34(*a*) and 35(*a*) are explanatory drawings illustrating the results of the voting processes for different divided regions, respectively, in the hash table. FIGS. 34(*b*) and 35(*b*) are histograms indicative of the results of the voting processes. For convenience of explanation, in FIGS. 35(*a*) and 35(*b*), indices ID1 to ID6 are described as ID1' to ID6', respectively.

In this way, by performing the voting process with respect to each divided region, it is possible to prevent ID1 and ID1' that are different documents from being voted for as the same ID. Further, in the similarity determination process, maximum number of votes obtained and an index for a reference image with the maximum number of votes obtained are extracted from the histogram indicative of the result of the voting process with respect to each divided region, and the extracted maximum number of votes obtained is compared with a predetermined threshold value, thereby properly performing the similarity determination. In FIGS. 34(*a*), 34(*b*), 35(*a*), and 35(*b*), ID4 in FIG. 34(*b*) has the number of votes obtained that is more than a threshold value, and therefore ID4 in the divided region corresponding to FIG. 34(*b*) is determined as having a similarity.

In the case of performing the voting process and the similarity determination process with respect to each divided region, the present invention may be arranged so that plural sets (e.g. identical with the number of divided regions) of the voting process sections and the similarity determination process sections are provided and the voting processes and the similarity determination processes for respective divided regions are performed in parallel. Alternatively, the present invention may be arranged so that only one set of the voting process section and the similarity determination section is provided and the voting process and the similarity determination process are serially performed with respect to each divided region.

An explanation was made above as to a case where the voting process and the similarity determination process are performed with respect to each divided region. However, the present invention is not limited to this case. For example, the present invention may be arranged so that the voting process and the similarity determination process are performed with respect to only a specific region designated by a user. Alternatively, the present invention may be arranged so that the control section extracts one or more divided regions each satisfying a condition designated by the user, and the voting process and the similarity determination process are performed with respect to each of the one or more divided regions.

(1-4-2. Method for Storage and Deletion in the Hash Table 103)

In the present embodiment, the user can select one of the following four methods for dividing the storage region of the hash table 103.

Specifically, when the user enters an instruction to specify a dividing method via the operation panel 6 or an external device communicably connected with the digital color multi-function printer 1 (e.g. the user selects a button indicative of "specify a dividing method" displayed on a display screen (such as a liquid crystal display) of the operation panel 6 or the external device (such as a computer)), the control section 7 causes the display screen to display a window that asks the user to select one of the following dividing methods: (i) setting the number of dividing the storage region; (ii) setting the number of images that are storable in one divided region; (iii) setting an administration period for a reference image; and (iv) setting preference (priority) of a reference image. The user selects desired one of the dividing methods via key operation, touch panel operation, mouse operation or the like.

The following explains the dividing methods (i) to (iv). In the present embodiment, the number of indices that are storable in the whole hash table 103 is set to 8192 (ID0 to ID8191).

(i) Case of Setting the Number of Dividing Storage Region

Figure 14:
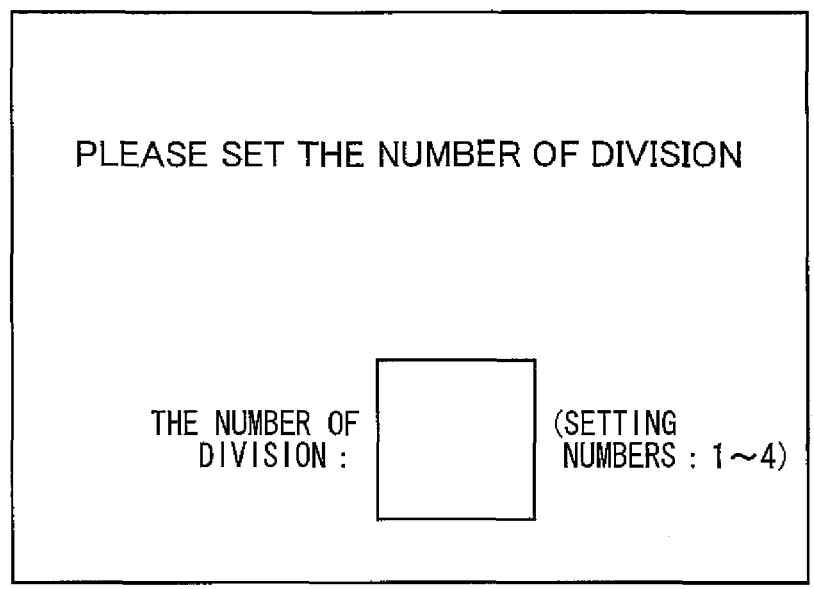
FIGS. 14(a) and 14(b) are explanatory drawings each illustrating an example of a window displayed by a display section of the image processing apparatus in accordance with one embodiment of the present invention.
Figure 14:
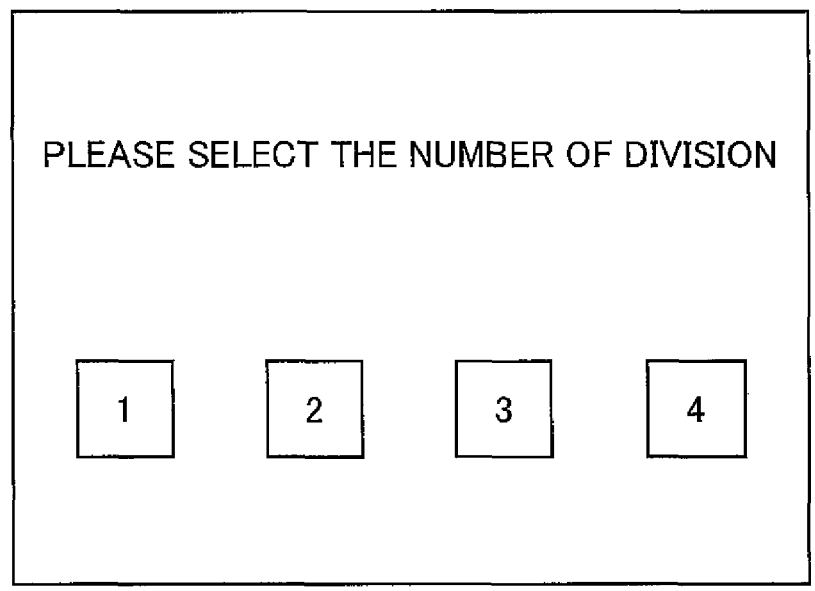

When the user selects the dividing method (i), the control section causes the display screen to display a window that urges the user to specify the number of division as illustrated in FIG. 14(*a*). The user enters a desired number of division in response to the window, thereby setting the number of dividing the storage region. The method for specifying the number of division is not limited to this. Alternatively, as illustrated in FIG. 14(*b*) for example, the present invention may be arranged so that the control section 7 causes the display screen to display the numbers of division that can be selected, and the user selects a desired number of division out of the displayed numbers.

Figure 15:
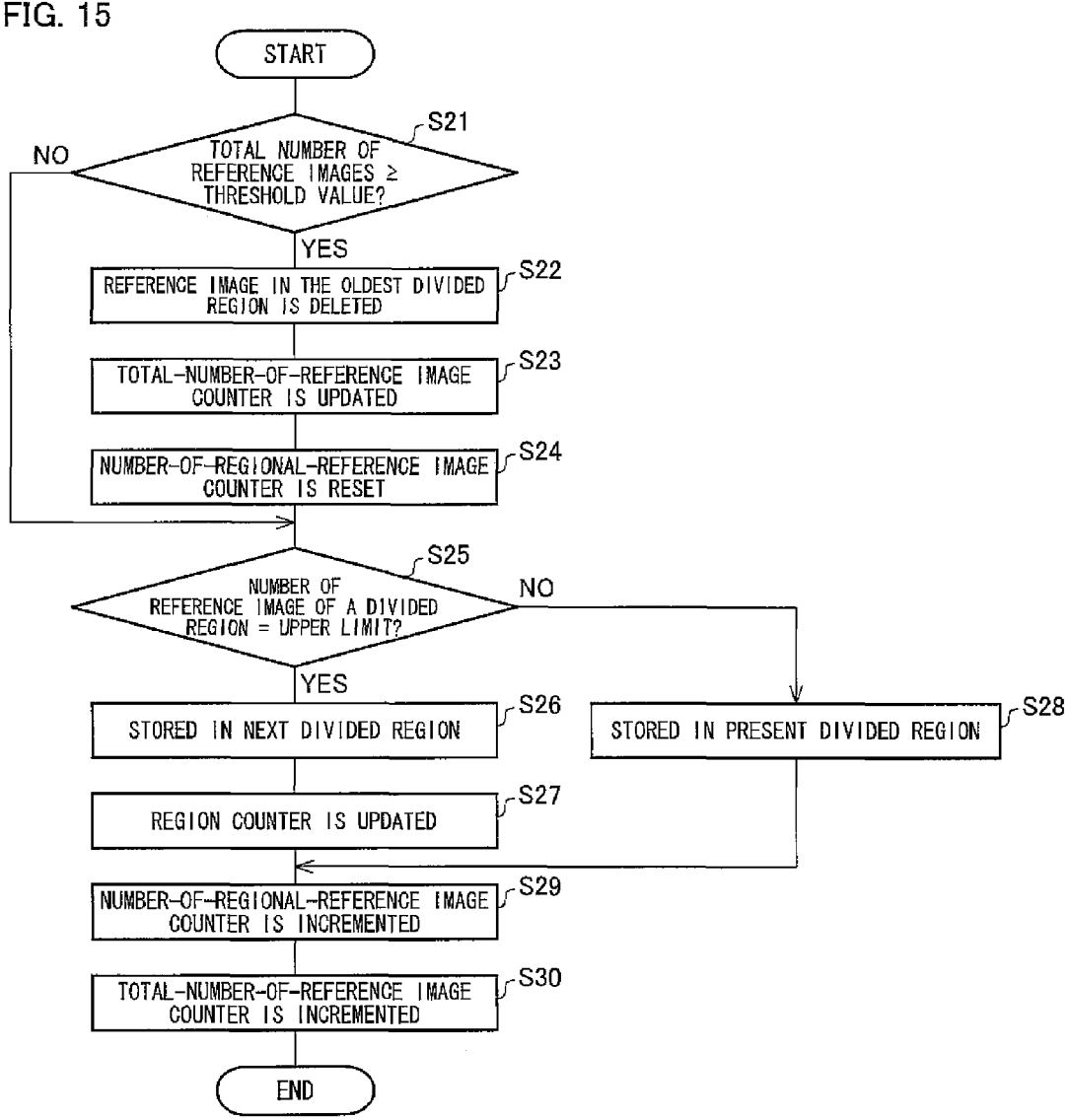
FIG. 15 is a flow chart illustrating an example of a storage process in the image processing apparatus in accordance with one embodiment of the present invention.

FIG. 15 is a flowchart illustrating a flow of a process for storing a new reference image in the hash table 103 in a case where the dividing method (i) is selected (process of S6 in FIG. 13). Here, an explanation is made as to a case where the number of indices for reference images that are storable in the whole hash table 103 is set to 8192, the number of dividing the storage region of the hash table 103 is 4, and the number of indices for reference images that are storable in each divided region is 2048. Further, an explanation is made as to a case where indices for reference images are stored serially in each divided region, i.e. the indices are initially stored in a first region, then the indices are stored in a second region when the number of storage in the first region reaches an upper limit, and then the indices are stored in a third region when the number of storage in the second region reaches an upper limit.

After obtaining features of a reference image through the processes S1 to S5 in FIG. 13, the control section 7 judges whether the count value of the total-number-of-reference image counter 104 reaches a predetermined threshold value TH2 or not (S21). A method for setting the threshold value TH2 is not particularly limited. In the present embodiment, the threshold value TH2 is set to 6144 that is 75% of the number (8192) of images that are storable in the whole hash table 103.

When judging that the count value of the total-number-of-reference image counter 104 reaches the threshold value TH2, the control section 7 deletes reference images in a divided region where the oldest reference images are stored (S22). Then, the control section 7 subtracts the number of deleted reference images from the count value of the total-number-of-reference image counter 104 so as to update the count value of the total-number-of-reference image counter 104 (S23). Further, the control section 7 resets a count value of the number-of-regional-reference image counter 105 for the deleted divided region (S24).

After resetting the number-of-regional-reference image counter 105 in S24, or when judging in S21 that the count value of the total-number-of-reference image counter 104 is less than the threshold value TH2, the control section 7 judges whether the count value of the number-of-regional-reference image counter 105 for a divided region set as a region for storage at present (divided region corresponding to the count value of the region counter 106) reaches an upper limit value corresponding to the number of images that are storable in the divided region (S25). In FIG. 15, an initial value of the number-of-regional-reference image counter 105 is set to 0 and the upper limit value of each divided region is set to 2047. Therefore, the count value of the number-of-regional-reference image counter 105 being 2047 indicates that 2048 indices for reference images are stored in the divided region.

Figure 16:
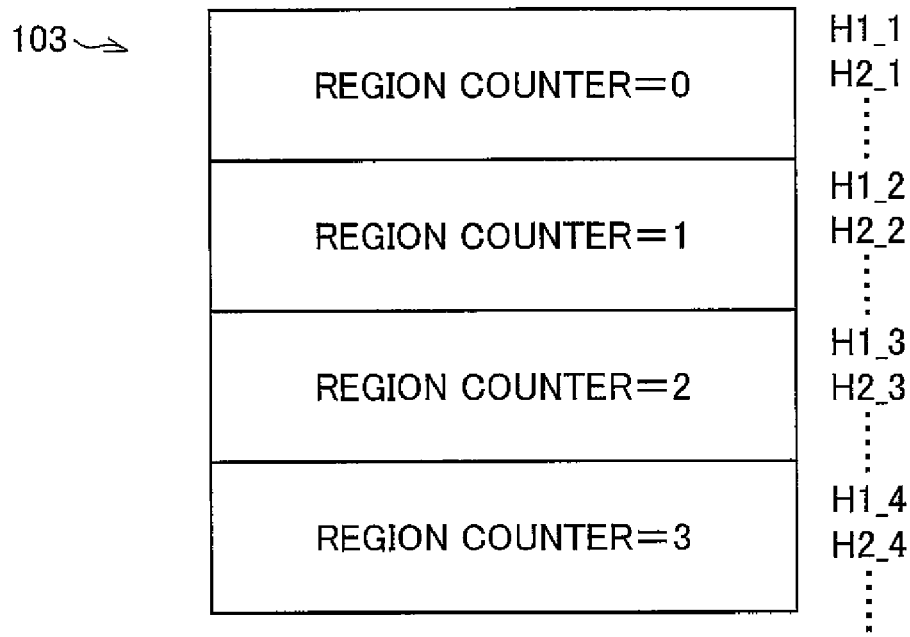
FIG. 16 is an explanatory drawing illustrating an example of a region counter included in the image processing apparatus in accordance with one embodiment of the present invention.

When judging in S25 that the count value of the number-of-regional-reference image counter 105 reaches the upper limit value, the control section 7 starts storage in the next divided region (S26), and updates the count value of the region counter 106 to a value corresponding to the divided region where the storage is started (S27). FIG. 16 is an explanatory drawing schematically illustrating the region counter 106. The region counter 106 is a counter for indicating divided regions where reference images are stored, and count values 0 to 3 correspond to first to fourth regions, respectively. The control section 7 increments the count value of the region counter 106 by 1 each time when the number of storage in one divided region reaches the upper limit value and storage in the next divided region starts.

On the other hand, when judging in S25 that the count value of the number-of-regional-reference image counter 105 does not reach the upper limit value, the control section 7 stores an index for a reference image in the divided region set as a region for storage at present (S28).

After the process of S27 or in S28, the control section 7 increments the count value of the number-of-regional-reference image counter 105 corresponding to the divided region where storage is performed and the count value of the total-number-of-reference image counter 104 (S29 and S30), and finishes the process.

In the example of FIG. 15, when judging in S21 that the count value of the total-number-of-reference image counter 104 reaches the threshold value TH2, the control section 7 automatically deletes reference images in the divided region where the oldest reference images are stored. However, the present invention is not limited to this. For example, as illustrated in FIG. 17(a), the present invention may be arranged so that the control section 7 causes a display section of the operation panel 6 or a display section of the external device to display a window for informing/alarming the user that the number of storable images is small and for asking the user whether to delete the oldest reference images or not, and the control section 7 judges whether to delete the reference images or not in accordance with an instruction entered by the user in response to the window.

(ii) Case of Setting the Number of Images that are Storable in One Divided Region When the user selects the dividing method (ii), the control section 7 causes the display section of the operation panel 6 or the display section of the external device to display a window for urging the user to enter an instruction on the number of images that are storable in one divided region as illustrated in FIG. 18(a). The user enters a desired value in response to the window, thereby setting the number of images that are storable in each divided region. The number of images that are storable in each divided region may be any value. However, in order to facilitate administration of addresses, it is preferable to set the number to be $2^n$. This is because by dividing the hash table so that the number of images that are storable in each divided region becomes $2^n$ (n is an integer of 2 or more) as illustrated in FIG. 32, it is possible to facilitate an access to each divided region.

Figure 32:
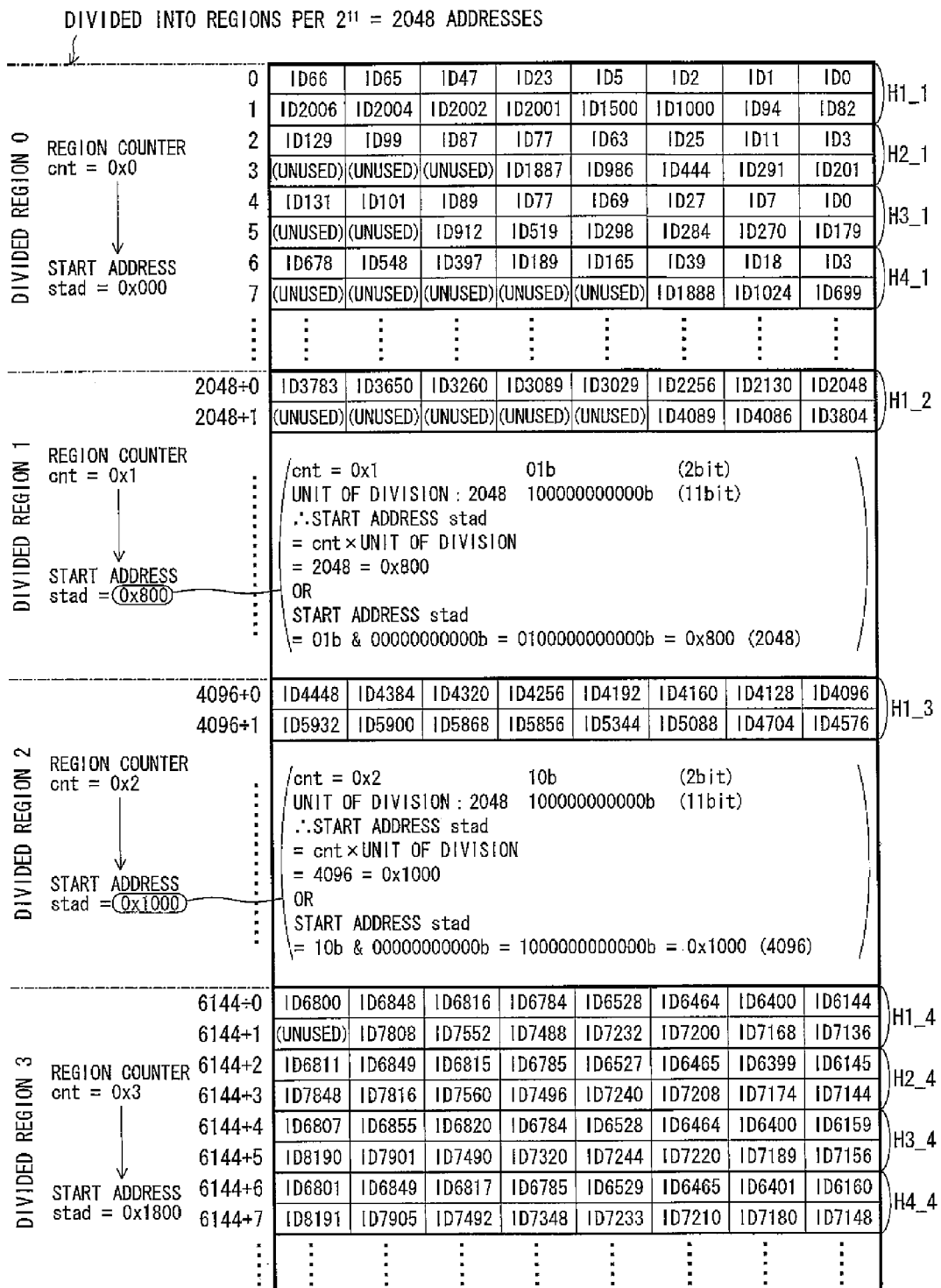
FIG. 32 is an explanatory drawing illustrating an example of an arrangement in which the number of reference images that are storable in each divided region in a hash table of the image processing apparatus in accordance with one embodiment of the present invention is $2^{11}$ addresses.

FIG. 32 is an explanatory drawing illustrating an example of dividing the hash table so that the number of images that are storable in each divided region (divided unit; the number of addresses stored in each divided region) becomes $2^{11}$ addresses.

As illustrated in FIG. 32, by setting the number of images that are storable in each divided region to $2^n$ and assigning a region counter value to each divided region, it is possible to uniquely determine a start address with respect to each divided region. Consequently, in a case of performing DMA (Direct Memory Access) with respect to an external memory (in a case of directly accessing the external memory) for example, it is possible to easily calculate the start address.

In general, a start address for a divided region can be calculated by (region counter value)×(number of images that are storable in each divided region). In this case, the number of images that are storable in each divided region is not necessarily $2^n$. In the divided region 1 illustrated in FIG. 32, a region counter value cnt is cnt=0×1, and the number of images that are storable in each divided region is $2^{11}$=2048. Consequently, a start address stad for the divided region 1 is stad=cnt×(the number of images that are storable)=2048=0× 800. Similarly, in the divided region 2 illustrated in FIG. 32, a region counter value cnt is cnt=0×2, and the number of images that are storable in each divided region is $2^{11}$=2048. Consequently, a start address stad for the divided region 2 is stad=cnt×(the number of images that are storable)=4096=0× 1000.

Here, by setting the size of each divided region (the number of images storable in each divided region) in the hash table to be $2^n$, it is possible to represent a start address only by a bit connection between a region counter value and the size of the hash table (the number of images that are storable in each divided region). Consequently, it is easy to calculate a start address.

For example, in the case of the divided region 1 in FIG. 32, the number of division is $2^2=4$, cnt=01b, and the number of images that are storable in each divided region is 2048=100000000000b, and therefore the start address of the divided region 1 in FIG. 32 is obtained by bit connection between cnt and lower digit 11 bits of the number of images that are storable 2048, i.e. 0100000000000b=0×800. Similarly, in the case of the divided region 2, cnt=10b and the number of images that are storable in each divided region is 2048=100000000000b, and therefore the start address of the divided region 2 is obtained by bit connection between cnt and lower digit 11 bits of the number of images that are storable 2048, i.e. 1000000000000b=0×1000.

Figure 18:
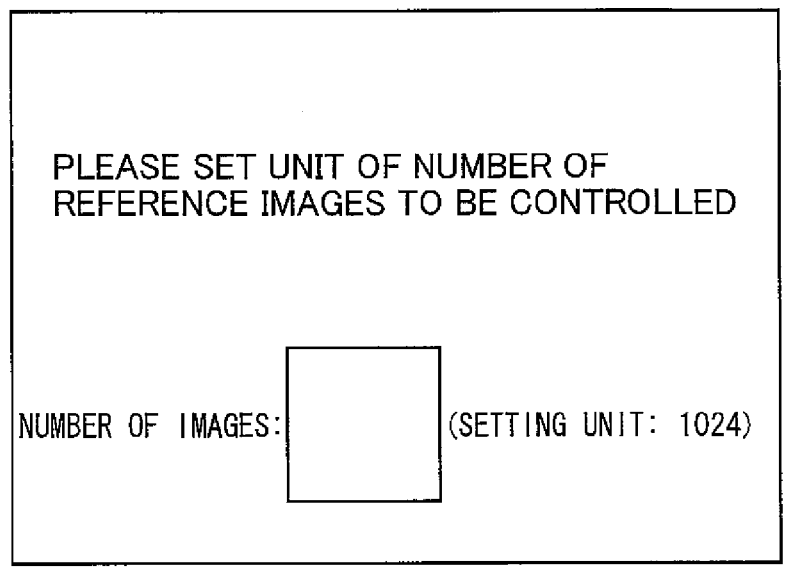
FIGS. 18(a) and 18(b) are explanatory drawings each illustrating an example of a window displayed by a display section of the image processing apparatus in accordance with one embodiment of the present invention.
Figure 18:
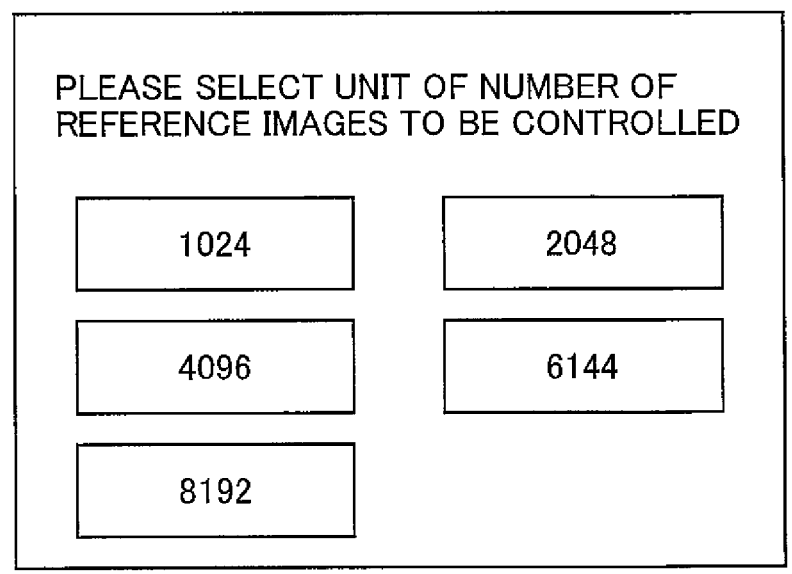

The method for specifying the number of images that are storable in each divided region is not limited to the method illustrated in FIG. 18(*a*). For example, as illustrated in FIG. 18(*b*), the present invention may be arranged so that the control section 7 causes selectable numbers to be displayed and the user selects a desired number out of the displayed numbers.

The process for storing images is the same as the process in FIG. 15. A reference value (2047 in FIG. 15) of the number-of-regional-reference image counter 105 that is used for judging in S21 whether to store an image in the current divided region or the next divided region may be set in accordance with the number of images to be stored in each divided region.

The present invention may be arranged so that, when judging in S21 that the count value of the total-number-of-reference image counter 104 reaches the threshold value TH2, the control section 7 causes the display section to display a message/warning that the number of images that are storable is small and a scope of indices for images stored in each divided region as illustrated in FIG. 17(*b*), and the control section 7 determines a divided region whose reference images are to be deleted, in response to an instruction entered by the user. Further, the present invention may be arranged so that, as illustrated in FIG. 17(*c*), the control section 7 causes the display section to display a window for urging a user to enter an instruction on the scope of indices for reference images to be deleted, and the control section 7 deletes the reference images in response to the instruction entered by the user.

(iii) Case of Setting an Administration Period for a Reference Image

Figure 19:
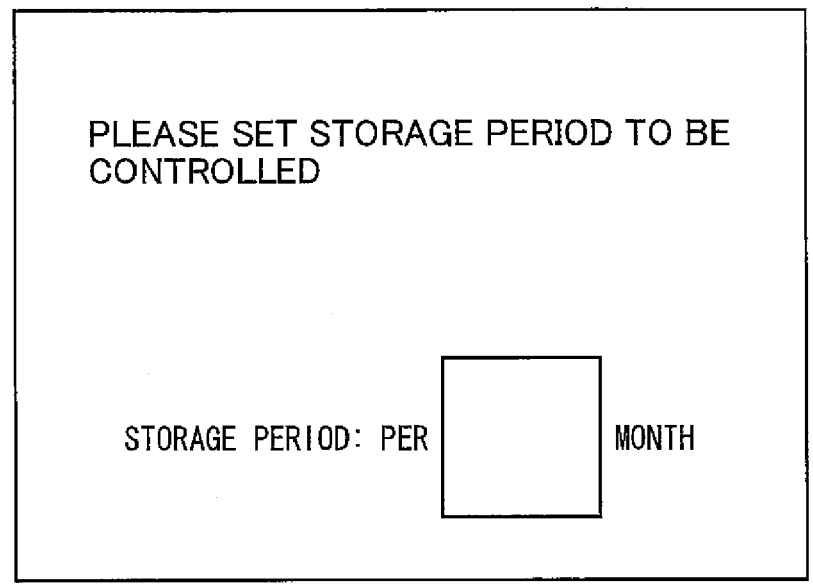
FIGS. 19(a) and 19(b) are explanatory drawings each illustrating an example of a window displayed by a display section of the image processing apparatus in accordance with one embodiment of the present invention.
Figure 19:
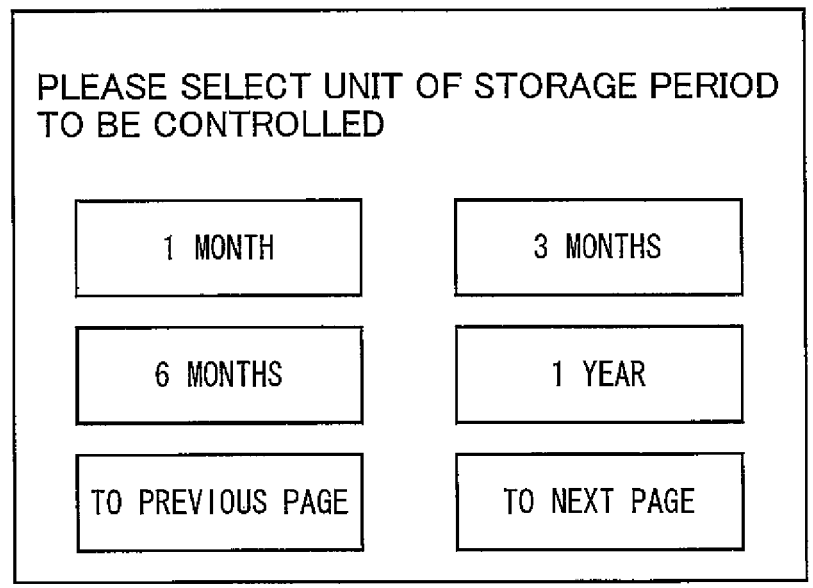

When the user selects the dividing method (iii), the control section 7 causes the display screen to display a window for urging the user to specify an administration period for each divided region as illustrated in FIG. 19(*a*). The user enters a desired value in response to the window, thereby setting the administration period for each divided region. The method for specifying the administration period for each divided region is not limited to the method illustrated in FIG. 19(*a*). For example, the present invention may be arranged so that, as illustrated in FIG. 19(*b*), the control section 7 causes the display screen to display selectable administration periods, and the user selects a desired administration period out of the displayed administration periods. In the present embodiment, an explanation is made as to a case where the number of dividing a storage region is 4. Alternatively, the present invention may be arranged so that the user can set the number of dividing a storage region to any number.

FIG. 20 is an explanatory drawing illustrating a relation between a divided region and a storage date of a reference image stored in the divided region. In the example illustrated in FIG. 20, indices for reference images stored from Jan. 1, 2006 to Mar. 31, 2006 are stored in the first region, indices for reference images stored from Apr. 1, 2006 to Jun. 30, 2006 are stored in the second region, indices for reference images stored from Jul. 1, 2006 to Sep. 30, 2006 are stored in the third region, and indices for reference images stored from Oct. 1, 2006 to Dec. 31, 2006 are stored in the fourth region.

Figure 21:
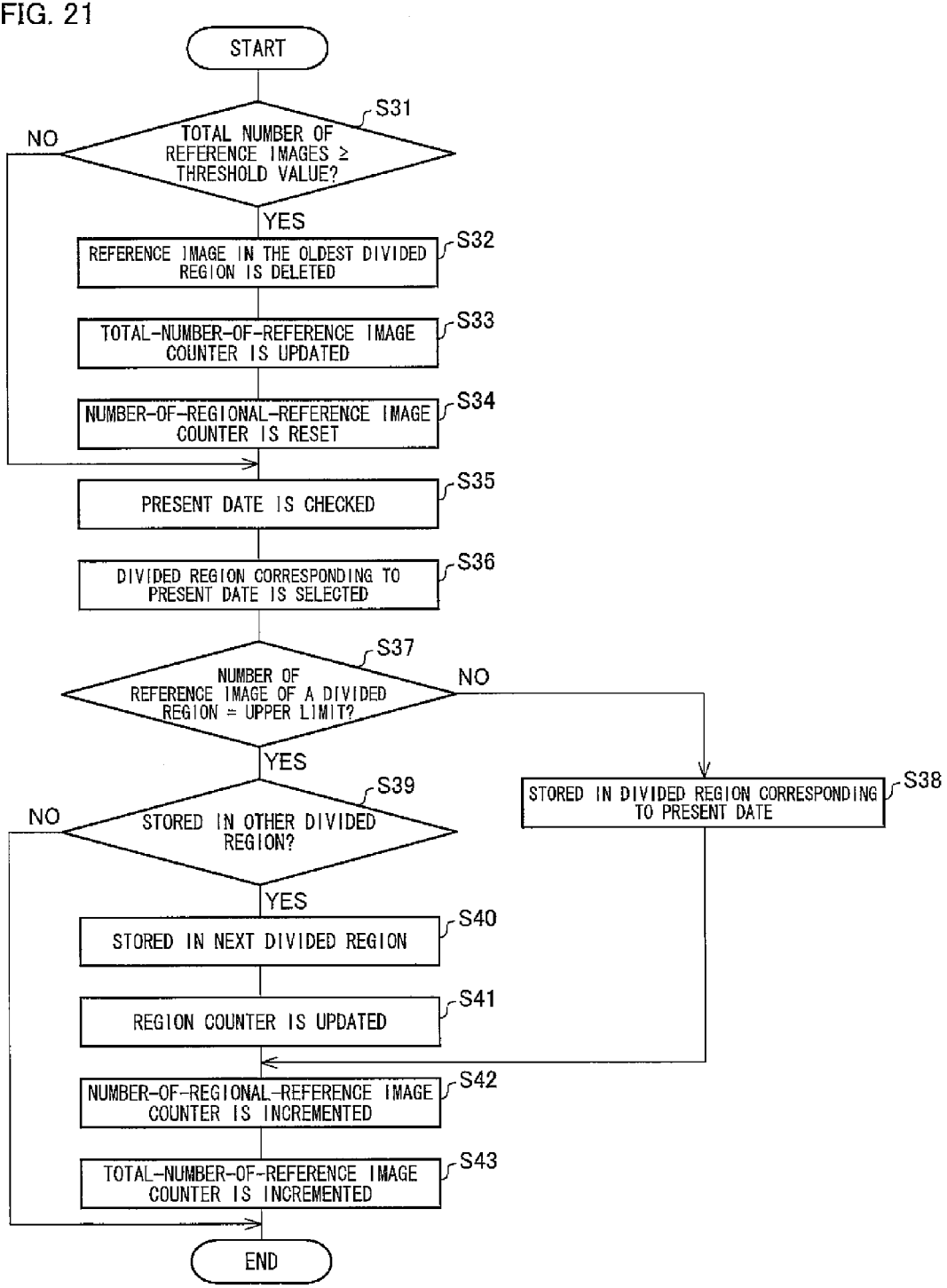
FIG. 21 is a flow chart illustrating another example of a storage process in the image processing apparatus in accordance with one embodiment of the present invention.

FIG. 21 is a flowchart illustrating a flow of a process for storing a new reference image in the hash table 103 (process of S6 in FIG. 13) in the case where the dividing method (iii) is selected. Here, an explanation is made as to a case where the number of indices for reference images that are storable in the whole hash table 103 is 8192, the number of dividing the storage region of the hash table 103 is 4, and the number of indices for reference images that are storable in each divided region is 2048.

After obtaining features of a reference image through the processes of S1 to S5 in FIG. 13, the control section 7 judges whether the count value of the total-number-of-reference image counter 104 reaches the predetermined threshold value TH2 or not (S31). A method for setting the threshold value TH2 is not particularly limited. In the present embodiment, the threshold value TH2 is set to 6144 which is 75% of the number (8192) of images that are storable in the whole hash table 103.

When judging in S31 that the count value of the total-number-of-reference image counter 104 reaches the threshold value TH2, the control section 7 deletes reference images in a divided region where reference images with the oldest storage period are stored (S32). Then, the control section 7 subtracts the number of deleted reference images from the count value of the total-number-of-reference image counter 104 so as to update the count value of the total-number-of-reference image counter 104 (S33). Further, the control section resets the count value of the number-of-regional-reference image counter 105 corresponding to the deleted divided region (S34).

After resetting the number-of-regional-reference image counter 105 in S34 or when judging in S31 that the count value of the total-number-of-reference image counter 104 is less than the threshold value TH2, the control section 7 checks the present date (S35). A method for checking the present date is not particularly limited and may be one of conventional and publicly known methods.

Subsequently, the control section 7 selects a divided region corresponding to the date checked in S35 (S36). Then, the control section 7 judges whether the count value of the number-of-regional-reference image counter 105 corresponding to the selected divided region reaches the upper limit value of the number of images that are storable in the divided region (S37).

When judging in S37 that the count value of the number-of-regional-reference image counter 105 does not reach the upper limit value, the control section 7 stores an index for a reference image in the divided region selected in S36 (S38).

On the other hand, when judging in S37 that the count value of the number-of-regional-reference image counter 105 reaches the upper limit value, the control section 7 judges whether to store the index in other divided region or not (S39). For example, the present invention may be arranged so that the user sets beforehand a condition for judging whether to store an index for a stored image in other divided region or not when the number of storage in the divided region corresponding to the date reaches the upper limit value, and the control section 7 judges whether to store the index in other divided region or not in accordance with the condition. Alternatively, the present invention may be arranged so that the control section 7 causes the display screen to display information for urging the user to enter an instruction on whether to store the index in other divided region or not, and the control section 7 judges whether to store the index in other divided region or not in accordance with the instruction entered by the user.

When judging in S39 that the index for a reference image is not to be stored in other divided region, the control section 7 does not store the index and finishes the process.

When judging in S39 that the index for a reference image is to be stored in other divided region, the control section 7 stores the index in the other divided region (S40), and updates the count value of the region counter 106 to a value corresponding to the divided region where the index is stored (S41).

The divided region where the image is stored in S40 may be, for example, a divided region corresponding to a division period next to the division period to which the date checked in S35 belongs. Alternatively, the present invention may be arranged so that information stored in the divided region corresponding to the oldest division period is deleted and a reference image is overwritten on the divided region. For example, by causing a value of a region counter corresponding to each divided region and a period assigned to each divided region to be stored in the memory 8 in such a manner that the value and the period are related to each other, it is possible to easily specify a divided region from which reference images are deleted or on which reference images are overwritten. Alternatively, the present invention may be arranged so that a value of a region counter corresponding to each divided region, a period assigned to each divided region, and the number of divided regions (the number of dividing the hash table 103) are stored in the memory 8 in such a manner that the value, the period, and the number are related to each other, and a divided region corresponding to the oldest division period is specified based on these information and a value of the region counter 106 at present (value of a region counter for the divided region selected in S36).

After the process in S38 or S41, the control section 7 increments a count value of the number-of-regional-reference image counter 105 corresponding to the divided region where storage is performed and a count value for the total-number-of-reference image counter 104 (S42 and S43), and finishes the process.

In the example illustrated in FIG. 20, an explanation was made as to a case where a period assigned to each divided region is specified per three months, but the present invention is not limited to this case. For example, a period assigned to each divided region may be set to be any period. Alternatively, the period may be set with use of any indicator indicative of a temporal axis (period), such as year, month, day, day of the week, specific day etc.

Further, in the example of FIG. 21, an explanation was made as to a case where, when the control section 7 judges in S31 that the count value of the total-number-of-reference image counter 104 reaches the threshold value TH2, the control section 7 automatically deletes reference images in the divided region where the oldest reference images are stored. However, the present invention is not limited to this case. For example, the present invention may be arranged so that, as illustrated in FIG. 17(d), the control section 7 causes a display section to display (i) a message/warning that the number of images that are storable is small and (ii) a storage period assigned to each divided region, receives an instruction entered by a user indicative of a storage period to which reference images to be deleted belong, and deletes reference images in the divided region the instruction is directed to. Alternatively, the present invention may be arranged so that, as illustrated in FIG. 17(e), the control section 7 causes a display section to display a window for urging a user to enter a storage period to be deleted, and deletes reference images stored during the storage period to which the instruction entered by the user is directed.

Further, the present invention may be arranged so that a window substantially similar to that in FIG. 17(d) or 17(e) is displayed in the process in S40, a reference image to which the instruction entered by the user is directed is deleted, and a new reference image is stored in the region from which the reference image has been deleted.

(iv) Case of Setting Preference (Priority)

Figure 22:
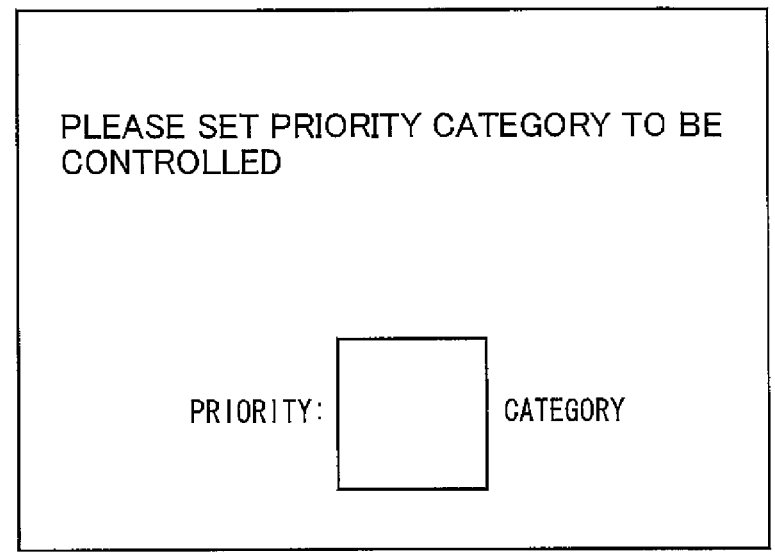
FIGS. 22(a) and 22(b) are explanatory drawings each illustrating an example of a window displayed by a display section of the image processing apparatus in accordance with one embodiment of the present invention.
Figure 22:
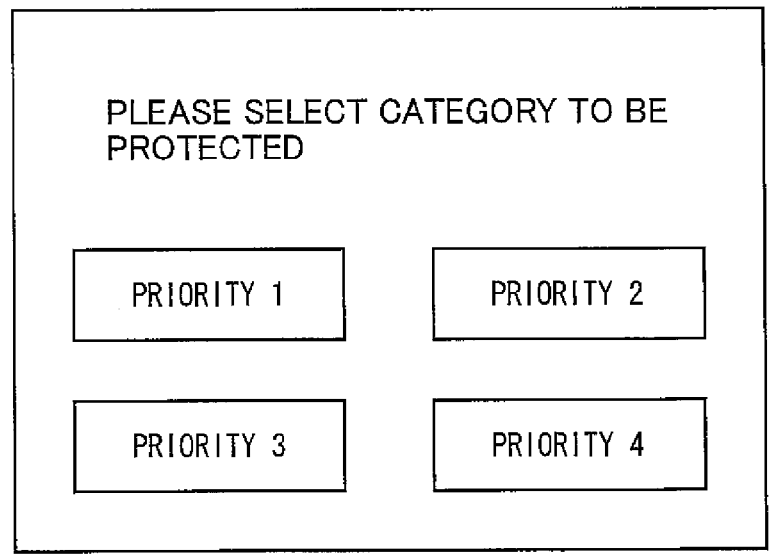

When the user selects the dividing method (iv), the control section 7 causes a display section to display a window for urging the user to specify the number of preference categories (the number of preference levels) as illustrated in FIG. 22(a). The user enters a desired value in response to the window, thereby setting the number of preference categories. A reference image with a high preference may be protected so as not to be deleted. In this case, as illustrated in FIG. 22(b) for example, the control section 7 causes the display section to display a window for urging the user to specify a preference of a reference image to be protected, and protects the reference image with the preference to which the instruction entered by the user is directed.

Figure 23:
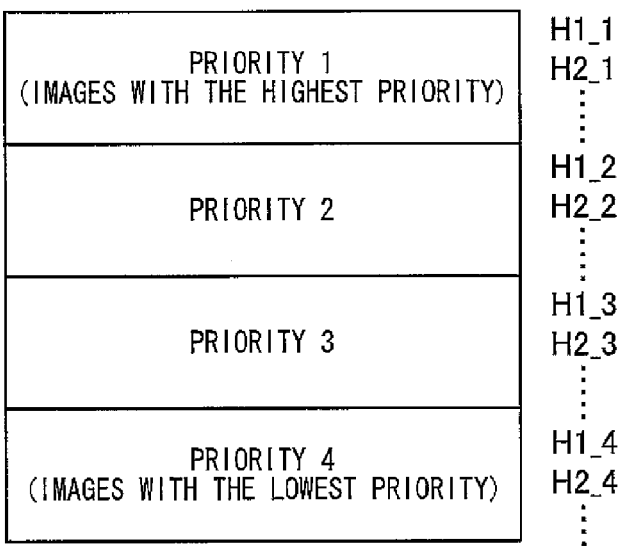
FIG. 23 is an explanatory drawing illustrating an example of a condition for a reference image stored in each divided region in a hash table of the image processing apparatus in accordance with one embodiment of the present invention.

When the number of preference categories is selected, the control section 7 divides a storage region of the hash table 103 into divided regions in the number corresponding to the selected number of preference categories, and assigns each divided region to a storage region where a reference image corresponding to one of preferences is stored. That is, divided regions in which images are stored differ according to preferences. FIG. 23 is an explanatory drawing for illustrating a relation between a divided region in the hash table 103 and a preference assigned to the divided region in a case where the number of preference categories is set to 4. In the example in FIG. 23, the storage region of the hash table 103 is divided into first to fourth regions, and the first region is regarded as a storage region for a reference image with a preference 1, the second region is regarded as a storage region for a reference image with a preference 2, the third region is regarded as a storage region for a reference image with a preference 3, and the fourth region is regarded as a storage region for a reference image with a preference 4. In the example in FIG. 23, the preference 1 is the highest preference, and the preference drops as the preference is closer to the preference 4. In the example in FIG. 23, the number of reference images that are storable in each divided region is 2048.

Figure 24:
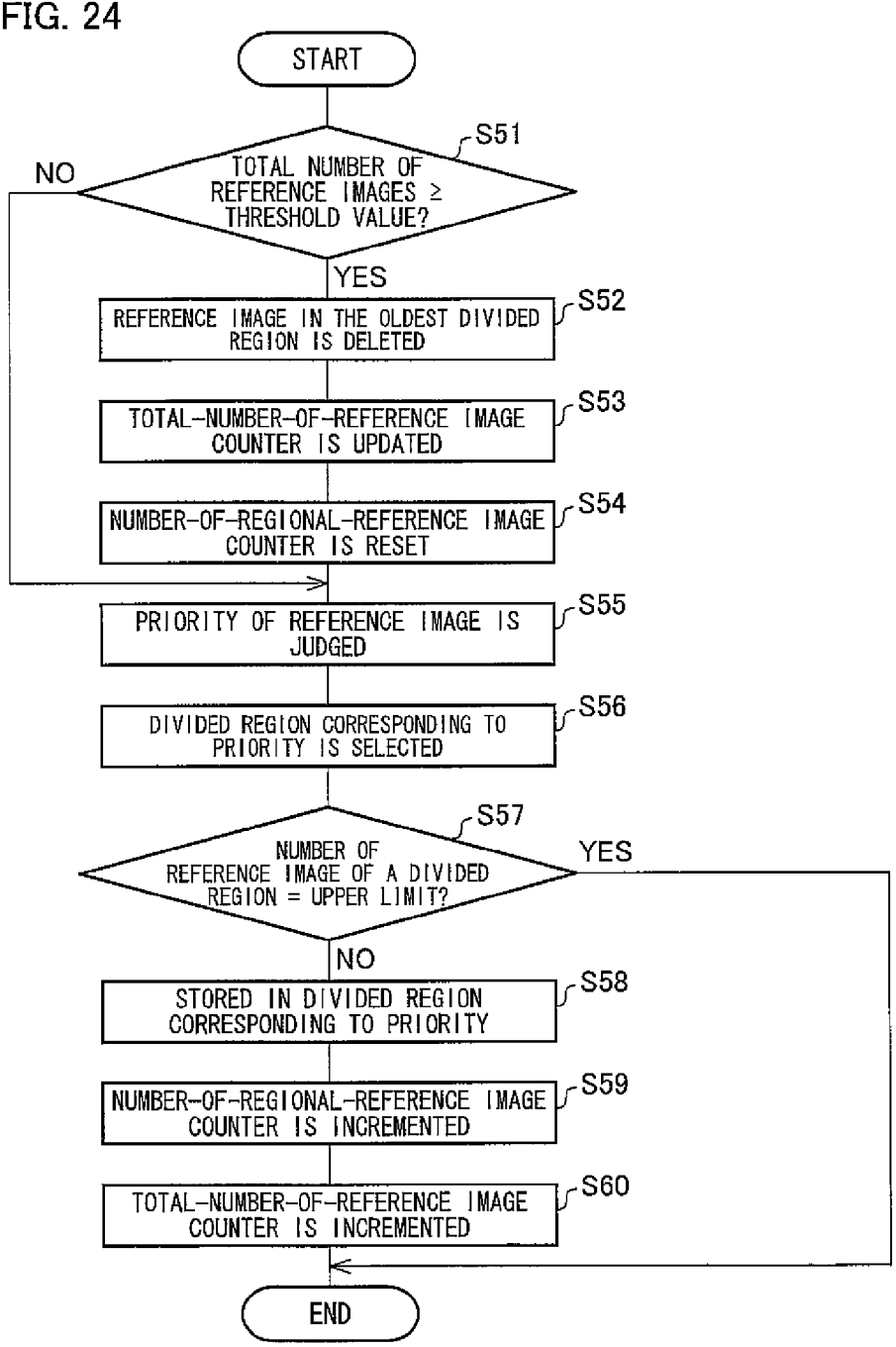
FIG. 24 is a flow chart illustrating still another example of a storage process in the image processing apparatus in accordance with one embodiment of the present invention.

FIG. 24 is a flow chart illustrating a flow of a process for storing a new reference image in the hash table 103 (process of S6 in FIG. 13) in a case where the dividing method (iv) is selected and the number of preference categories is set to 4.

After obtaining features of a reference image in the processes of S1 to S5 in FIG. 13, the control section 7 judges whether the count value of the total-number-of-reference image counter 104 reaches the predetermined threshold value TH2 or not (S51). A method for setting the threshold value TH2 is not particularly limited. In the present embodiment, the threshold value TH2 is set to 6144 that is 75% of the number (8192) of images that are storable in the whole hash table 103.

When judging in S51 that the count value of the total-number-of-reference image counter 104 reaches the threshold value TH2, the control section 7 deletes reference images in a divided region where reference images with the lowest preference are stored (S52). Then, the control section 7 subtracts the number of the deleted reference images from the count value of the total-number-of-reference image counter 104, and updates the count value of the total-number-of-reference image counter 104 (S53). Further, the control section 7 resets the count value of the number-of-regional-reference image counter 105 for the deleted divided region (S54).

Subsequently, the control section 7 judges the preference of a reference image (S55), and selects a divided region corresponding to the judged preference (S56). The preference of the reference image may be judged by the control section 7 in accordance with an instruction entered by the user via the operation panel 6 or an external device, or the preference may be judged by the control section 7 in accordance with a predetermined condition.

Subsequently, the control section 7 judges whether the count value of the number-of-regional-reference image counter 105 corresponding to the divided region selected in S56 reaches an upper limit value for the number of images that are storable in the divided region selected in S56 or not (S57). When the count value reaches the upper limit value, the control section 7 does not store an image, and finishes the process. On the other hand, when the count value does not reach the upper limit value, the control section 7 stores an image in a divided region in accordance with the preference of the image (S58), increments the count value of the number-of-regional-reference image counter 105 corresponding to the divided region and the count value of the total-number-of-reference image counter 104 (S59 and S60), and finishes the process.

Figure 25:
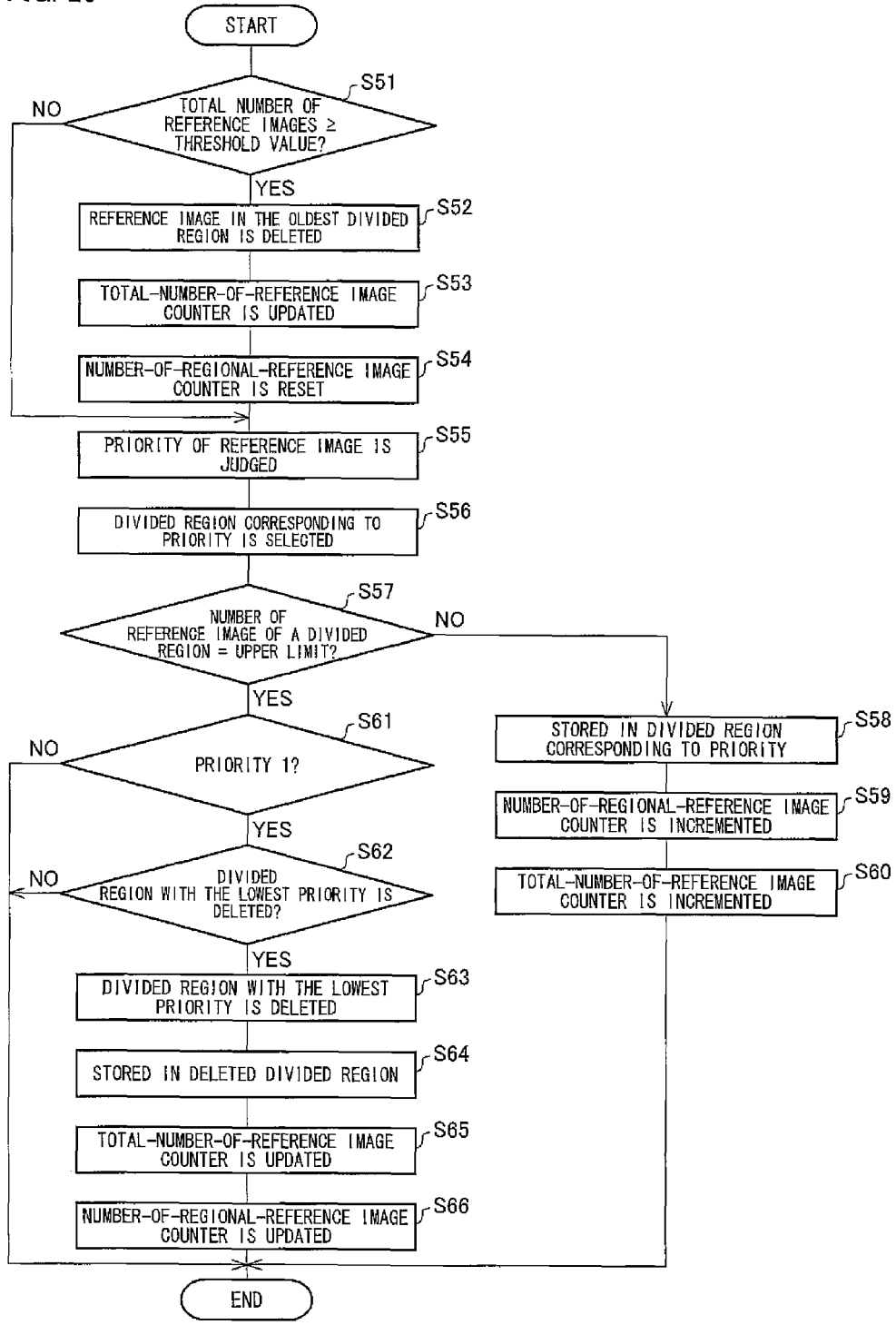
FIG. 25 is a flow chart illustrating still another example of a storage process in the image processing apparatus in accordance with one embodiment of the present invention.

In the example of FIG. 24, an explanation was made as to a case where, when the number of reference images in the divided region corresponding to the preference of a reference image has already reached the upper limit value, the reference image cannot be stored. However, the present invention is not limited to this case. For example, the present invention may be arranged so that when the number of stored images in the divided region corresponding to the preference 1 has already reached the upper limit value, the fourth region regarded as the storage region with the preference 4 that is the lowest preference is changed to the storage region with the preference 1. FIG. 25 is a flow chart illustrating a flow of a process in this case. The processes of S51 to S60 are the same as those in FIG. 24 and therefore explanations thereof are omitted here.

When judging in S57 that the count value of the number-of-regional-reference image counter 105 corresponding to the divided region selected in S56 reaches the upper limit value, the control section 7 judges whether the preference of a reference image to be stored is 1 or not (S61). When the preference is not 1, the control section 7 finishes the process.

On the other hand, when judging in S61 that the preference is 1, the control section 7 deletes reference images in a divided region where reference images with the lowest preference are stored, and judges whether to use the divided region as a region where the reference image with the preference 1 is stored (S62). The judgment may be performed in accordance with an instruction entered by a user via the operation panel 6 or an external device, or the control section 7 may judge in accordance with a predetermined condition. When judging in S62 that the divided region is not to be used as the region where the reference image with the preference 1 is stored, the control section 7 does not store the image, and finishes the process.

On the other hand, when judging in S62 that the divided region is to be used as the region where the reference image with the preference 1 is stored, the control section 7 deletes the reference images stored in the divided region (S63), and stores a new reference image in the divided region (S64).

Further, in accordance with the results of the deletion process and the storage process, the control section 7 updates the count value of the number-of-regional-counter 105 corresponding to the divided region and the count value of the total-number-of-reference image counter 104 (S65 and S66), and finishes the process.

An explanation was made above as to a case where, when the number of reference images in the divided region corresponding to the preference 1 reaches the upper limit value, the divided region with the lowest preference is changed to the divided region with the preference 1. Alternatively, the present invention may be arranged so that when the number of reference images in a divided region with a preference 2 or 3 reaches the upper limit value, the divided region with the lowest preference is changed to the divided region with the preference 2 or 3. Alternatively, the present invention may be arranged so that the divided region with the lowest preference is further divided into a plurality of regions and the regions thus divided are regarded as storage regions with preferences 1 to 3.

Further, instead of the arrangement in which the reference images in the divided region with the lowest preference are deleted, the present invention may be arranged so that a divided region is deleted in accordance with an instruction entered by the user indicative of a divided region to be deleted.

In the examples in FIGS. 24 and 25, an explanation was made as to a case where, when judging in S51 that the count value of the total-number-of-reference image counter 104 reaches the threshold value TH2, the control section 7 automatically deletes the reference images in the divided region where the reference images with the lowest preference are stored. However, the present invention is not limited to this case. For example, the present invention may be arranged so that a divided region where reference images with a high preference are stored is protected beforehand so that the reference images are not deleted, and the control section 7 causes the display section to display a window for asking the user whether to delete reference images in a non-protected divided region or not as illustrated in FIG. 17(*f*), and the control section 7 judges whether to delete the reference images in the non-protected divided region or not in accordance with an instruction entered by the user. Alternatively, the present invention may be arranged so that, as illustrated in FIG. 17(*g*), the control section 7 causes a display section to display a priority corresponding to a divided region that may be deleted, and the control section 7 deletes reference images in a divided region to which the instruction entered by the user is directed.

A method for dividing a storage region of the hash table 103 is not limited to the dividing methods (i) to (iv), and may be other method. Alternatively, two or more of the dividing methods (i) to (iv) may be used in combination.

FIG. 26 is an explanatory drawing for illustrating an example of setting a dividing region by use of a storage period (storage time) and a preference through the combination of the dividing methods (iii) and (iv). In the example in FIG. 26, the storage region of the hash table 103 is divided into first to fourth regions, and an image is stored in one of the first to fourth regions in accordance with the storage period. In addition, each of the first to fourth regions is further divided into first to fourth sub-regions, and the first to fourth sub-regions are regarded as storage regions with preferences 1-4, respectively.

With the arrangement in FIG. 26, when a storage region where images belonging to the present storage period are stored is full of reference images, a storage region where images with a low preference belonging to other storage period are stored is changed to a storage region where images belonging to the present storage period are stored, or a storage region where images with a low preference belonging to the present storage period are stored is changed to a storage region where images with a high preference belonging to the present storage period are stored.

Further, the present invention may be arranged so that, as described in the following (v), an index of a document specified by a user is deleted from the hash table.

(v) Case of Specifying and Deleting an Index for a Document

Figure 36:
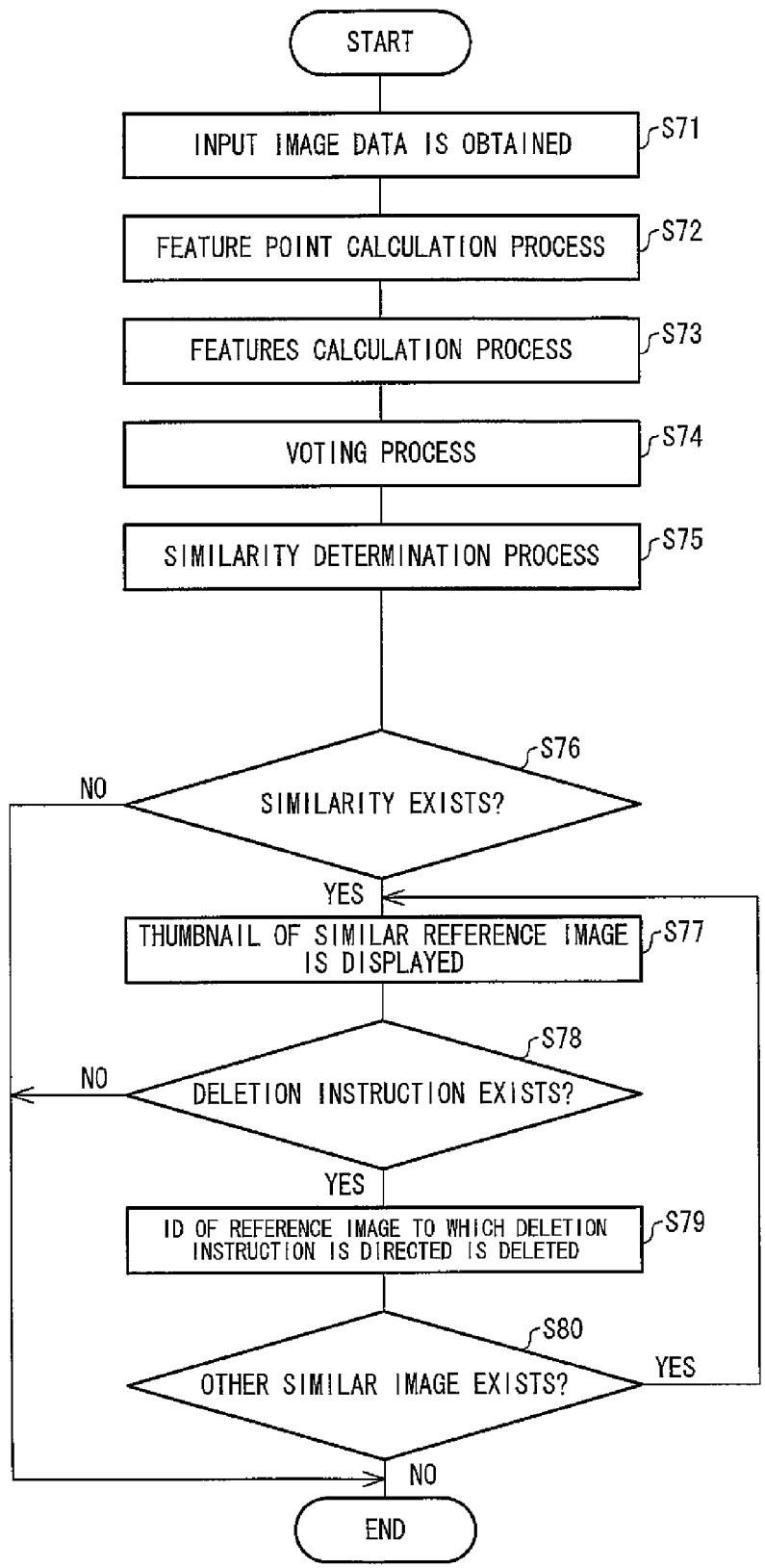
FIG. 36 is a flow chart illustrating an example of a deletion process for deleting a reference image in the image processing apparatus in accordance with one embodiment of the present invention.

FIG. 36 is a flow chart illustrating an example of a process for deleting, from a hash table, an index of a document specified by a user.

In the example illustrated in FIG. 36, the user enters image data of a document which the user wants to delete from the hash table, and the control section 7 obtains the image data of the document as input image data (S71). Here, the control section 7 may obtain the input image data by the color image input apparatus 2 reading a document image, or by the communication device 5 obtaining input image data transmitted from an external device, or by reading input image data from various storage media via a card reader (not shown) etc. included in the digital color multi-function printer 1.

Subsequently, the control section 7 controls each section of the document matching process section 13 so that the input data obtained in S71 is subjected to a feature point calculation process (S72), a features calculation process (S73), a voting process (S74), and a similarity determination process (S75). Then, as a result of the similarity determination process, the control section 7 judges whether a similarity exists or not, i.e. whether a similar reference image exists or not (S76). When judging in S76 that a similarity does not exist, the control section 7 judges that a document corresponding to the input image data is not stored (a reference image to be deleted does not exist), and finishes the process.

On the other hand, when Judging in S76 that a similarity exists, the control section 7 causes the display section of the operation panel 6 or a display device of a computer etc. externally connected via a network etc. to display a thumbnail image of the reference image determined as having a similarity (S77).

When there is a document which the user wants to delete in reference images represented by thumbnail images, the user selects, via key operation, touch panel operation, mouse operation etc, a reference image which the user wants to delete from the reference images represented by the thumbnail images. The control section 7 judges whether the user enters a deletion instruction (selection instruction for a reference image to be deleted) or not (S78).

When judging in S78 that the user does not enter a deletion instruction, the control section 7 judges that a reference image to be deleted does not exist, and finishes the process. The judgment whether the deletion instruction exists or not may be performed in such a manner that the control section 7 judges that the deletion instruction does not exist when no instruction is entered after a predetermined time has passed, or when the user enters an instruction that no reference image to be deleted exists.

When judging in S78 that the user enters a deletion instruction, the control section 7 deletes an ID of the selected reference image from the hash table (S79).

Thereafter, the control section 7 judges whether other reference image to be deleted exists or not, i.e. whether a reference image whose similarity is not less than a predetermined value exists or not other than the deleted reference image (S80), and the control section 7 finishes the process when there is no other reference image to be deleted. On the other hand, when there is other reference image to be deleted, the control section 7 performs again the process of S77 and the subsequent processes with respect to a reference image whose similarity is not less than the predetermined value out of reference images that are not deleted.

The present invention may be arranged so that the user simultaneously selects a plurality of reference images that the user wants to delete out of a plurality of thumbnail images, and the control section 7 deletes the plurality of selected reference images together. In this case, the process of S80 may be omitted.

Figure 37:
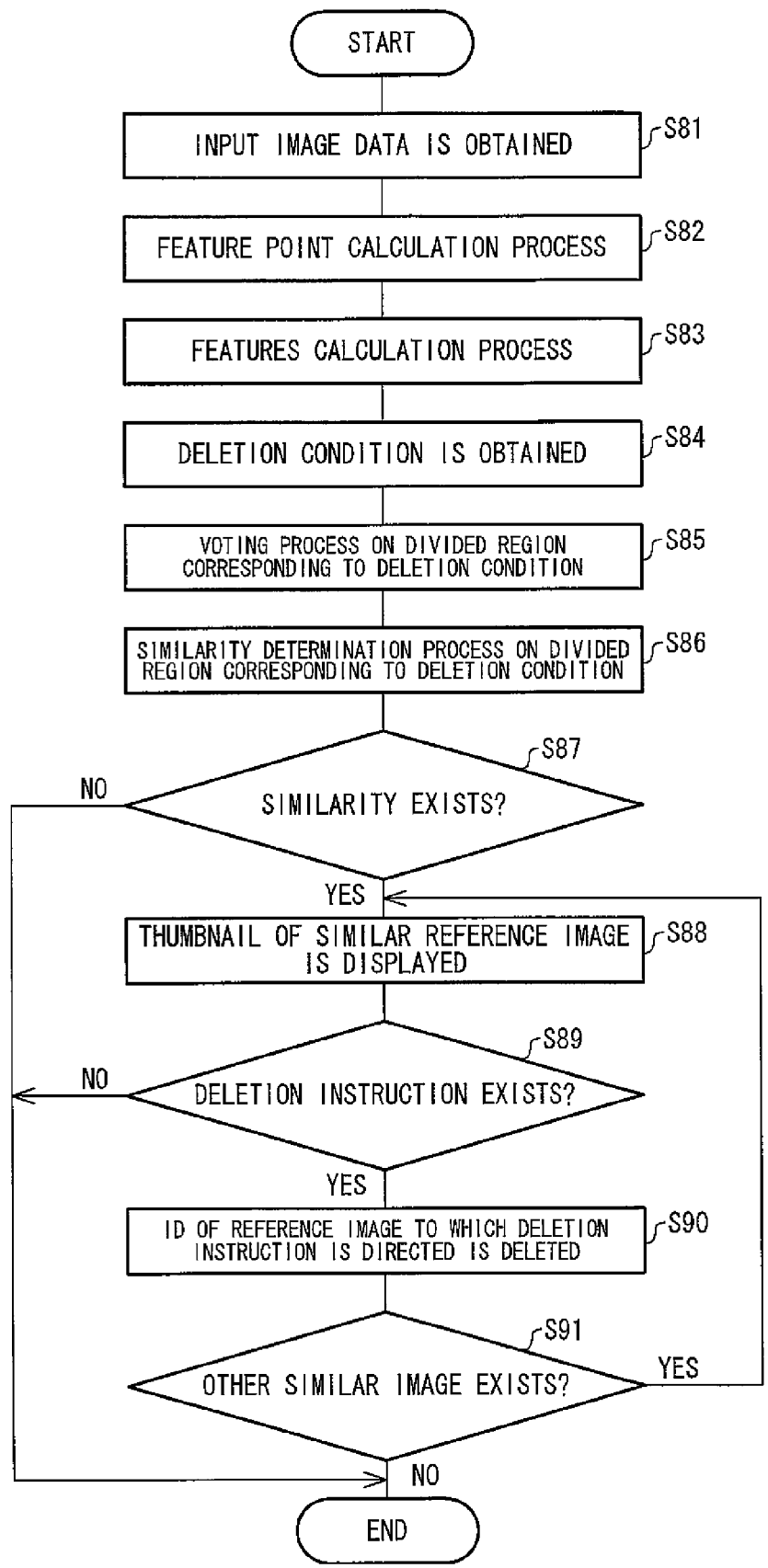
FIG. 37 is a flow chart illustrating another example of a deletion process for deleting a reference image in the image processing apparatus in accordance with one embodiment of the present invention.

Further, the present invention may be arranged so that the user specifies a divided region where the deletion process is to be performed (specifies a condition for a region where a reference image to be deleted exists) and a document the user wants to delete. FIG. 37 is a flow chart illustrating an example of a process in this case.

In the example of FIG. 37, initially, the user enters image data of a document which the user wants to delete from the hash table, and the control section 7 obtains the image data of the document as input image data (S81). Here, the control section 7 may obtain the input image data by the color image input apparatus 2 reading a document image, or by the communication device 5 receiving input image data from an external device, or by reading input image data from various storage media via a card reader (not shown) etc. included in the digital color multi-function printer 1.

Next, the control section 7 controls each section of the document matching process section 13 so that the input data obtained in S81 is subjected to a feature point calculation process (S82) and a features calculation process (S83).

Further, the control section 7 obtains a deletion condition entered by the user (condition for a divided region where a reference image to be deleted is stored) (S84). For example, the control section 7 causes the operation panel 6 or a display device of a computer etc. externally connected via a network etc. to display information for specifying a divided region, such as the number of a divided region, an administration period for a reference image, a preference (priority) for a reference image, and other information related to a reference image. Examples of the other information related to a reference image include a user name and a user ID in a case where the hash table is divided with respect to each user. The user refers to these information that is displayed and selects the deletion condition via key operation, touch panel operation, mouse operation etc.

The processes of S82 and S83 and the process of S84 may be performed in parallel, or the process of S84 may be performed before the processes of S82 and S83.

Next, the control section 7 controls each section of the document matching process section 13 so that the reference image stored in the divided region corresponding to the condition obtained in S84 is subjected to a voting process (S85) and a similarity determination process (S86) with use of the features obtained in S83. Subsequent processes of S87 to S91 are the same as those of S76 to S80 and therefore explanations thereof are omitted here.

As described above, the user specifies the deletion condition (divided region where the deletion process is to be performed), so that it is possible to limit a region where the voting process and the similarity determination process are to be performed. This allows greatly reducing a time for these processes.

As described above, the present invention may be arranged so that, in the process in FIG. 36 or 37, when a plurality of reference images whose similarity to the input image data is not less than a predetermined value are extracted, thumbnail images for the plurality of reference images are displayed by the operation panel 6 or the display section of the external device, and the user selects any number of reference images which the user wants to delete out of the plurality of reference images thus displayed, and deletes the selected reference images together.

Figure 38:
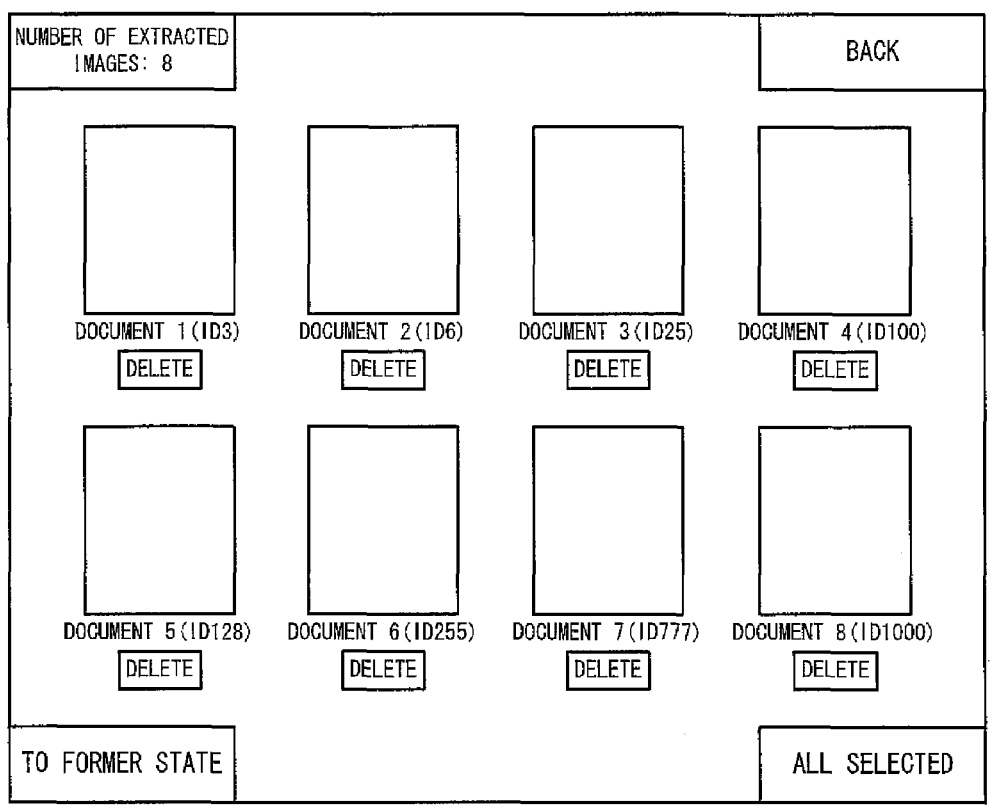
FIG. 38 is an explanatory drawing illustrating an example of displaying a thumbnail image of a reference image whose similarity to input image data is not less than a predetermined value in the image processing apparatus in accordance with one embodiment of the present invention.

FIG. 38 is an explanatory drawing illustrating an example of displaying thumbnail images of extracted 8 reference images whose similarity to the input image data is not less than a predetermined value.

The present invention may be arranged so that, when a large number of reference images whose similarity to the input image data is not less than a predetermined value are extracted, thumbnail images of the extracted reference images are displayed over plural pages. In this case, a page-switch button etc. for switching pages to be displayed may be displayed. Alternatively, a button etc. for scrolling thumbnail images of displayed reference images may be displayed. FIG. 39 is an explanatory drawing for illustrating an example of displaying one page in a case where 38 reference images are extracted and thumbnail images for the reference images are displayed over five pages.

Figure 40:
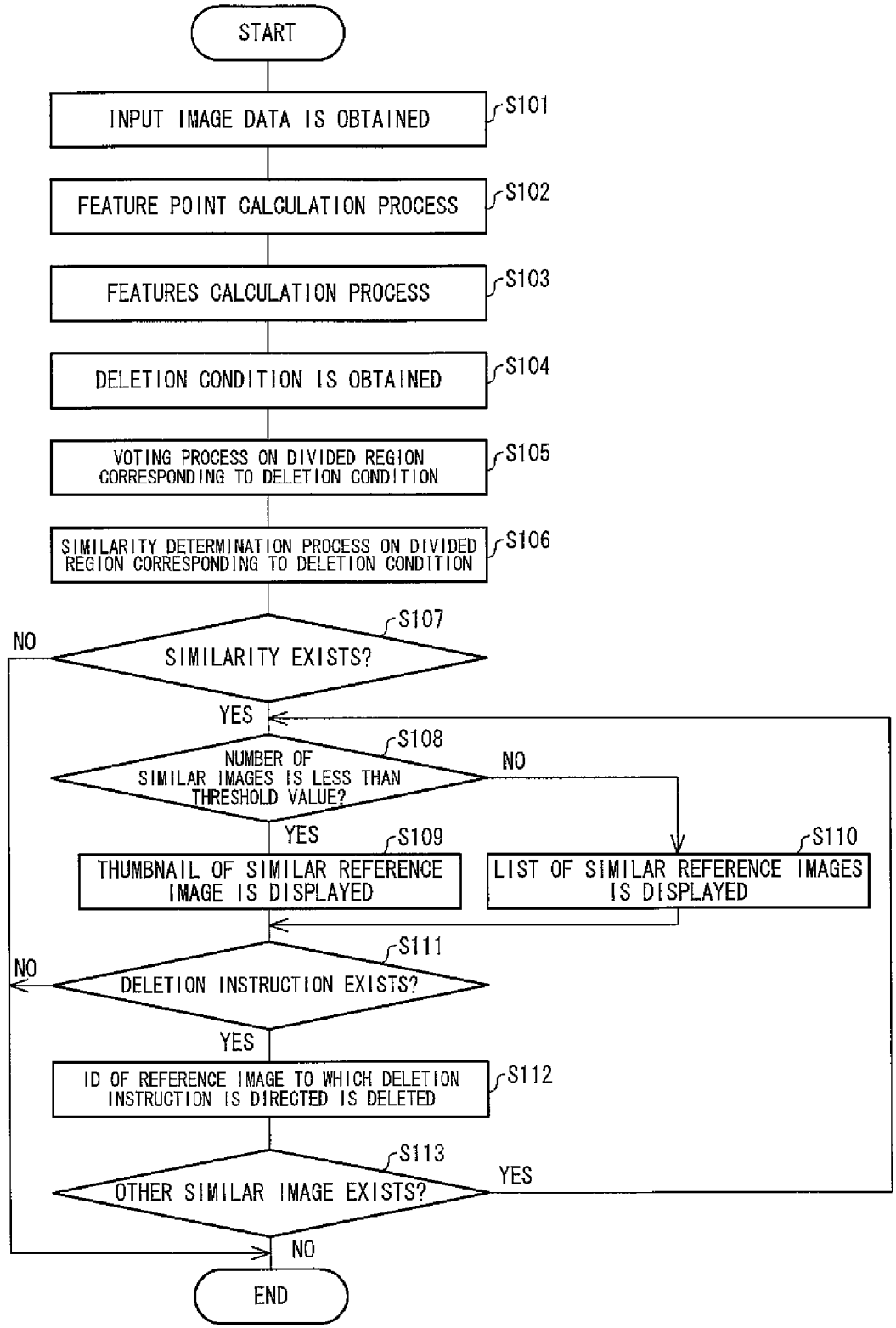
FIG. 40 is a flow chart illustrating still another example of a deletion process for deleting a reference image in the image processing apparatus in accordance with one embodiment of the present invention.

Alternatively, the present invention may be arranged so that when a large number of reference images whose similarity to input image data is not less than a predetermined value are extracted, a list of the reference images are displayed instead of the thumbnail images of the reference images. FIG. 40 is a flow chart illustrating an example of a process for displaying the list of the reference images.

Processes of S101 to S107 in FIG. 40 are the same as those of S81 to S87 in FIG. 37. When it is determined in S107 that a similarity exists, the control section 7 judges whether the number of reference images determined as having a similarity (the number of reference images whose similarity is not less than a predetermined value) is less than a predetermined threshold value or not (S108). The threshold value may be suitably set according to a condition such as the size of the display section of the operation panel 6 or the size of the display section of the external device.

When judging in S108 that the number of reference images determined as having a similarity is less than the threshold value, the control section 7 causes the display section of the operation panel 6 or the display section of the external device to display a thumbnail image of a reference image determined as having a similarity (S109).

On the other hand, when judging in S108 that the number of reference images determined as having a similarity is not less than the threshold value, the control section 7 causes the display section of the operation panel 6 or the display section of the external device to display a list of reference images determined as having a similarity (S110). FIG. 41 is an explanatory drawing illustrating an example of displaying the list in a case where the threshold value is set to 10 and the number of extracted reference images is 15. FIG. 42 is an explanatory drawing illustrating another example of displaying the list in a case where the threshold value is set to 50 and the number of extracted reference images is 70. As illustrated in FIG. 42, when the number of the extracted reference images is large, the list of the extracted reference images may be displayed over plural pages. In this case, a page-switching button for switching displayed pages may be displayed. Alternatively, a button etc. for scrolling the list of displayed reference images may be displayed.

In the examples in FIGS. 41 and 42, the lists for displaying the date and time when the document was stored and a user ID of a person having stored the document etc. are displayed. Further, whether to delete each stored document or not is selected via key operation, touch panel operation, mouse operation etc. In addition to these information, or instead of these information, an ID for each reference image may be displayed.

After the process of S109 or S110, the control section 7 judges whether there is a deletion instruction (selection instruction for a reference image to be deleted) by the user or not (S111). When a document which the user wants to delete exists in the reference images represented by thumbnails or by a list, the user selects the document image which the user wants to delete from the displayed reference images via key operation, touch panel operation, mouse operation etc.

When there is no deletion instruction by the user in S111, the control section 7 judges that there is no reference image to be deleted, and finishes the process. The judgment whether there is the deletion instruction or not may be performed in such a manner that the control section 7 judges that there is no deletion instruction when no instruction is entered after a predetermined time has passed, or in such a manner that the control section 7 judges in accordance with an instruction by the user that there is no reference image to be deleted.

When there is the deletion instruction in S111, the control section 7 causes the ID of the selected reference image to be deleted from the hash table (S112). Thereafter, the control section 7 judges whether there is other reference image to be deleted, i.e. whether there is a reference image whose similarity is not less than the predetermined value other than the reference image deleted in S112 (S113), and finishes the process when there is no other reference image to be deleted. On the other hand, when there is other reference image to be deleted, the control section 7 performs the process of S108 and the subsequent processes with respect to a reference image whose similarity is not less than the predetermined value out of reference images that are not deleted.

As described above, when the number of reference images whose similarity is not less than the predetermined value is not less than the threshold value, the list of the extracted reference images is displayed. This allows increasing visibility of the display of the extracted reference images in a case where a large number of reference images are extracted, thereby allowing the user to recognize the extracted reference images suitably. Further, when the number of reference images whose similarity is not less than the predetermined value is less than the threshold value, the thumbnails of the extracted reference images are displayed. This allows the user to recognize the extracted reference images more suitably. Alternatively, the present invention may be arranged so that only one of the thumbnail display and the list display is performed regardless of the number of the extracted reference images. Alternatively, the present invention may be arranged so that the user specifies which of the thumbnail display and the list display is performed.

Further, the present invention may be arranged so that when the thumbnail images or the list of the extracted reference images are displayed, a value indicative of a similarity of input image data to each reference image (a value such as the number of votes obtained for each reference image, a value obtained by normalizing the number of votes obtained for each reference image, a difference (or ratio) between the number of feature quantities extracted from the input image data and the number of feature quantities identical with feature quantities of a reference image out of the feature quantities extracted from the input image data) is displayed.

Further, when the thumbnails or the list of the extracted reference images are displayed, the extracted reference images are displayed in the order from a reference image with a high similarity to input image data, or in the order corresponding to a date when the image was stored, or in the order corresponding to a priority, or with respect to each user.

Figure 43:
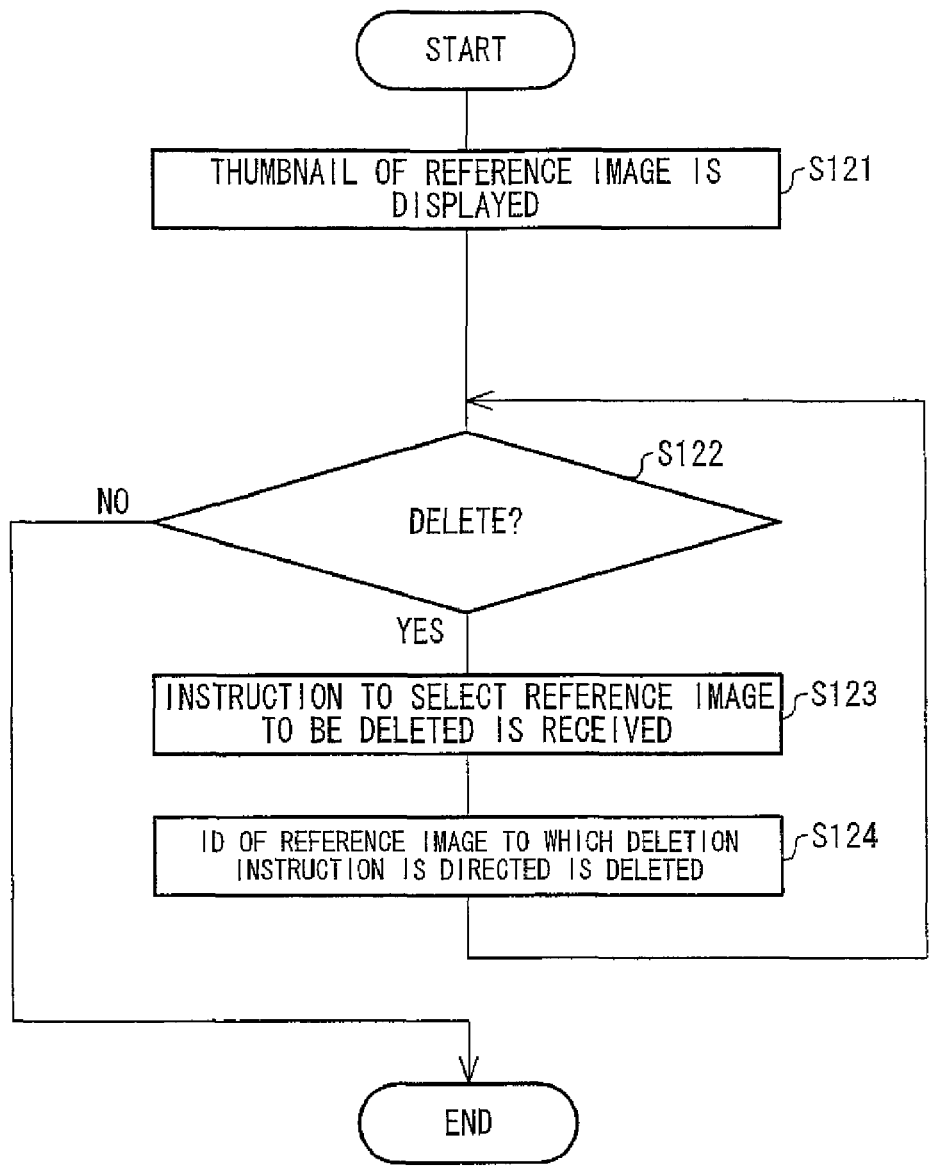
FIG. 43 is a flow chart illustrating still another example of a deletion process for deleting a reference image in the image processing apparatus in accordance with one embodiment of the present invention.

In the examples in FIGS. 36, 37, and 40, an explanation was made as to a case where image data indicative of a reference image to be deleted is obtained by the color image input apparatus 2 reading a document image, by the communication device 5 receiving the image data from an external device, or obtaining the image data from various storage media via a card reader (not shown) included in the digital color multi-function printer 1. However, the present invention is not limited to this case. For example, the present invention may be arranged so that thumbnail images of reference images stored in the hash table may be serially displayed. FIG. 43 is a flow chart illustrating an example of a process for serially displaying thumbnail images of reference images stored in the hash table.

In the example in FIG. 43, initially, the control section 7 causes the operation panel 6 or a display section of an external device to display a thumbnail image of a reference image stored in the hash table (S121).

Next, the control section 7 judges whether to delete the reference image or not (S122). The control section 7 judges based on whether the user enters an instruction to continue the deletion process or not.

When judging in S122 that the deletion process of the reference image is not to be performed, the control section 7 finishes the process.

On the other hand, when judging in S122 that the deletion process of the reference image is to be performed, the control section 7 receives a selection instruction by the user to select a reference image to be deleted (S123), and the control section 7 causes the ID of the selected reference image to be deleted from the hash table (S124). Thereafter, the control section 7 repeats the process of S122 and the subsequent processes.

In FIG. 43, an explanation was made as to a case where the thumbnail image of the reference image stored in the hash table is displayed in S121. However, the present invention is not limited to this case. For example, the list of the reference images may be displayed in S121. Further, the present invention may be arranged so that input image data indicative of a document which the user wants to delete is obtained by the color image input apparatus 2, the communication device 5, a card reader (not shown) or the like, and similarity determination for determining a similarity between the obtained input image data and the reference image is performed, and the thumbnail image or the list of the reference image determined as having a similarity (reference image whose similarity is not less than a predetermined value) is displayed.

Figure 44:
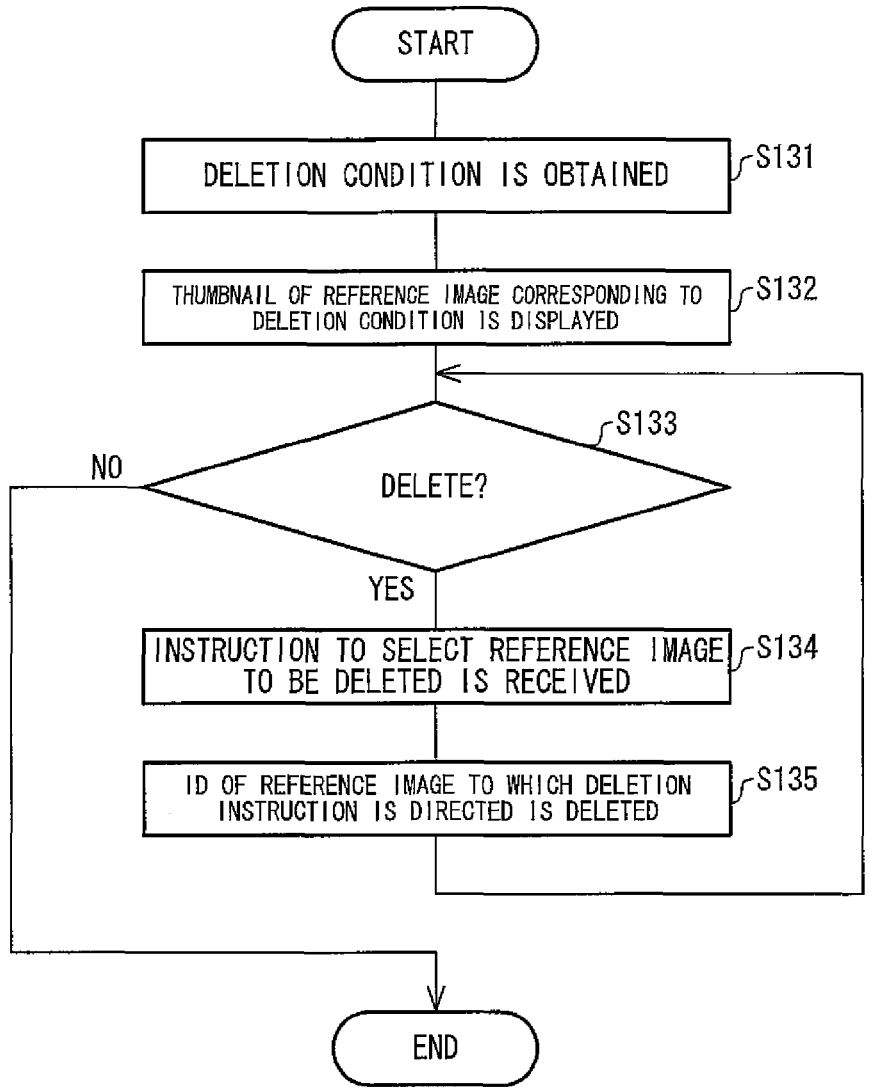
FIG. 44 is a flow chart illustrating still another example of a deletion process for deleting a reference image in the image processing apparatus in accordance with one embodiment of the present invention.
Figure 45:
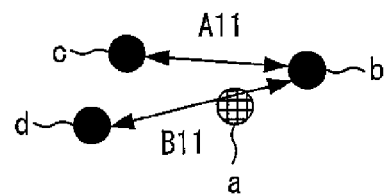
FIGS. 45(a) to 45(d) are explanatory drawings each illustrating an example of a combination of a target feature point and a peripheral feature point that are extracted at a time when the features calculation section in the image processing apparatus in accordance with one embodiment of the present invention calculates features.
Figure 45:
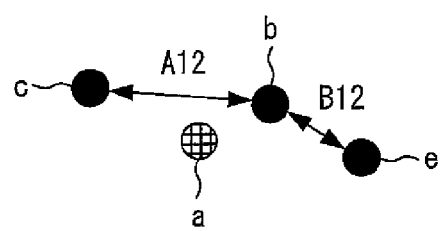
Figure 45:
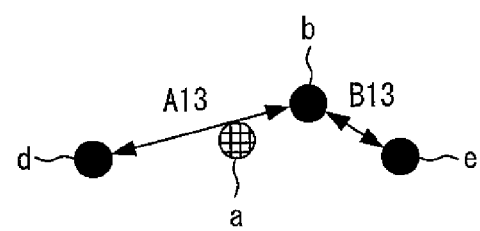
Figure 45:
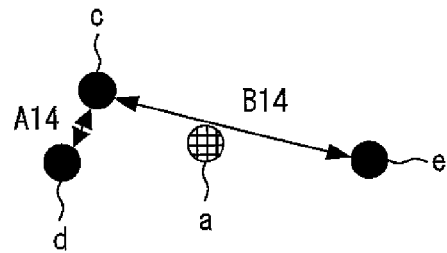
Figure 46:
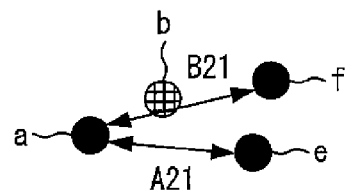
FIGS. 46(a) to 46(d) are explanatory drawings each illustrating an example of a combination of a target feature point and a peripheral feature point that are extracted at a time when the features calculation section in the image processing apparatus in accordance with one embodiment of the present invention calculates features.
Figure 46:
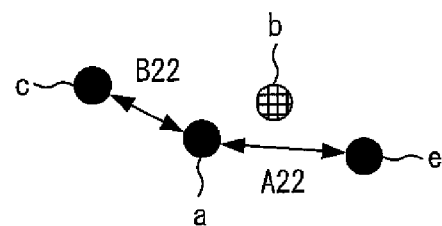
Figure 46:
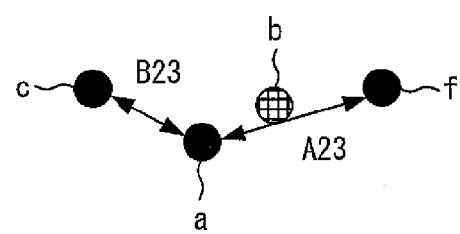
Figure 46:
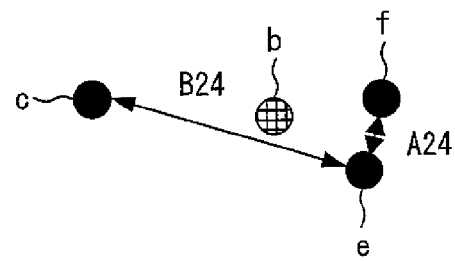

Further, the present invention may be arranged so that the user specifies a divided region where the deletion process is to be performed (specifies a condition for a region where a reference image to be deleted exists). FIG. 44 is a flow chart illustrating a flow of a process in this case.

In the example in FIG. 44, the control section 7 obtains a deletion condition (condition for a divided region where a reference image to be deleted is stored) entered by the user (S131). For example, the control section 7 causes the operation panel 6 or a display device of a computer etc. connected externally via a network to display information for specifying a divided region, such as the number of the divided region, the administration period for a reference image, a preference (priority) of the reference image, and other information related to the reference image. The user refers to these information thus displayed, and selects a deletion condition via key operation, touch panel operation, mouse operation etc.

Then, the control section 7 causes the operation panel 6 or the display section of the external device to display a thumbnail image of a reference image stored in a divided region corresponding to the deletion condition entered by the user (S132). Alternatively, a list of reference images may be displayed instead of the thumbnail image. Alternatively, the present invention may be arranged so that, when the number of the corresponding reference images is less than a threshold value, the thumbnails of the reference images are displayed, and when the number of the corresponding reference images is not less than the threshold value, the list of the reference images is displayed. Further, the thumbnail images or the list may be displayed over plural pages.

Thereafter, processes that are the same as those of S122 to S124 are performed (S133 to S135).

As described above, the digital color multi-function printer 1 of the present embodiment includes the hash table 103 in which features and a reference image including the features are stored in such a manner that the features and the reference image are related to each other, and a similarity between input image data and a reference image is determined based on features extracted from the input image data and the features stored in the hash table 103. The storage section of the hash table 103 is divided into a plurality of divided regions in accordance with a predetermined storage condition, and a relation between the reference image and the features is dispersed and stored in each divided region in accordance with the predetermined storage condition.

Thus, a condition for the divided region where deletion and updating are to be performed or the condition for a reference image to be deleted and updated is determined. Accordingly, it is possible to easily specify the region where deletion and updating are to be performed, and to perform the deletion and the updating on the specified region. This allows effective deletion and updating regardless of a storage capacity in the whole hash table. Consequently, it is possible to shorten a time for deletion and updating of the reference image, and to reduce a workload on the control section that is caused by the deletion and the updating.

In the present embodiment, an explanation was made as to a case where only one hash table 103 is provided and the storage section of the hash table 103 is divided into a plurality of divided regions. Alternatively, the present invention may be arranged so that a plurality of hash tables are provided and each hash table is used as each divided region in the above explanation. Alternatively, the present invention may be arranged so that a plurality of hash tables are provided, each hash table is divided into a plurality of regions, and each region is used as each divided region in the above explanation.

In the present embodiment, an explanation was made as to a case where the present invention is applied to the digital color multi-function printer 1. However, the present invention is not limited to this case. For example, the present invention may be applied to a monochrome multi-function printer. Alternatively, the present invention may be applied to a single-function apparatus such as a facsimile communication apparatus, a copier, and an image reading apparatus.

Figure 27:
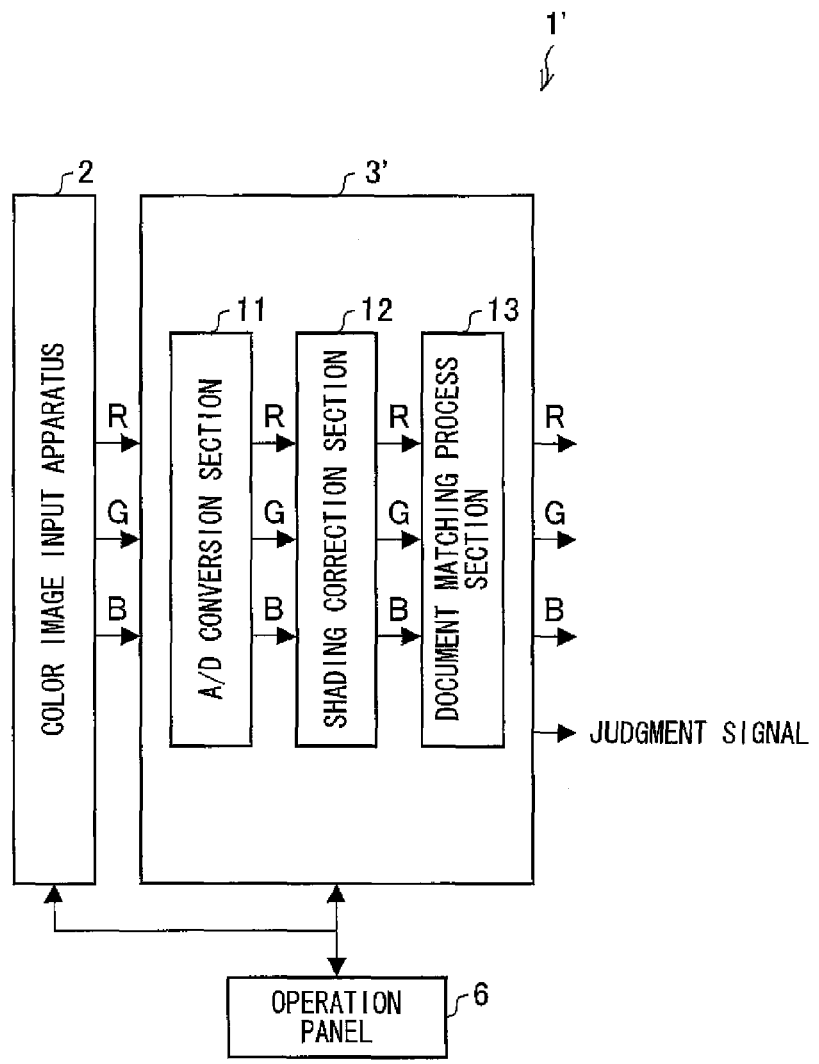
FIG. 27 is a block diagram illustrating a modification example of the image processing apparatus in accordance with one embodiment of the present invention.

FIG. 27 is a block diagram illustrating an example of an arrangement in which the present invention is applied to a flat bed scanner (image reading apparatus, image processing apparatus) 1'.

As illustrated in FIG. 27, the flat bed scanner 1' includes a color image input apparatus 2 and a color image processing apparatus 3'. The color image processing apparatus 3' includes an A/D conversion section 11, a shading correction section 12, a document matching process section 13, a control section 7 (not shown in FIG. 27), and a memory 8 (not shown in FIG. 27). The color image input apparatus 2 is connected with the color image processing apparatus 3', and the color image input apparatus 2 and the color image processing apparatus 3' constitute the image reading apparatus 1' as a whole. Functions of the A/D conversion section 11, the shading correction section 12, the document matching process section 13, the control section 7, and the memory 8 included in the image reading apparatus 1' are substantially the same as those of the members in the digital color multi-function printer 1 as described above and therefore explanations thereof are omitted here.

A part of the function of the document matching process section 13 may be carried out in an external device (such as a server) communicably connected with the digital color multi-function printer 1.

Figure 28:
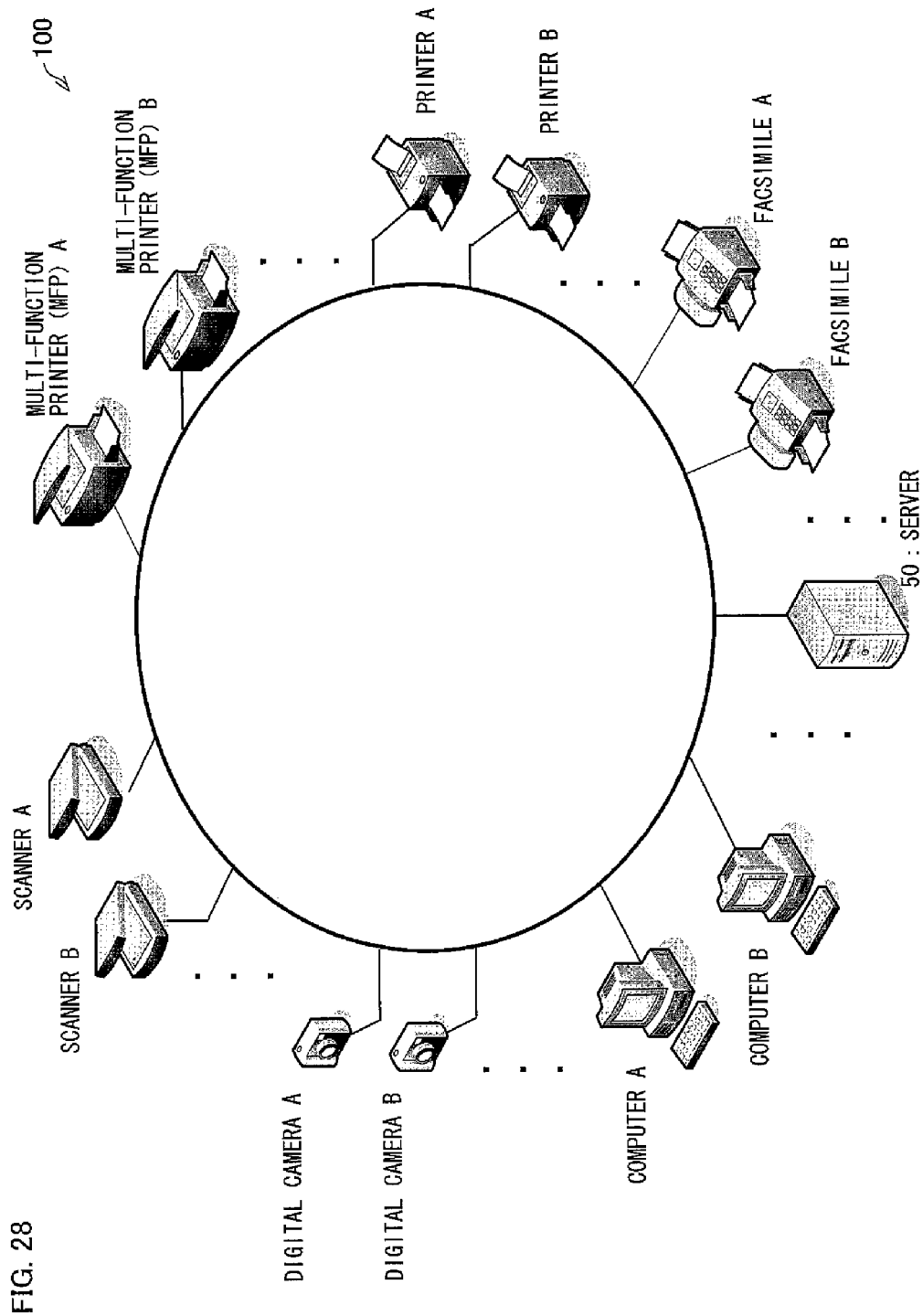
FIG. 28 is an explanatory drawing illustrating an arrangement of an image processing system in accordance with one embodiment of the present invention.

FIG. 28 is an explanatory drawing illustrating an arrangement of an image processing system 100 that realizes the function of the document matching process section 13 with use of a server 50 and at least one of multi-function printers (MFPs) A, B, . . . ; printers A, B, facsimiles A, B, . . . ; computers A, B, . . . ; digital cameras A, B, . . . ; and scanners A, B.

The scanner includes a scanner platen, an optical scanning section, CCD (charge coupled device) etc. The scanner scans a document image on the scanner platen with use of the optical scanning section, thereby reading the document image and generating image data. The digital camera includes an image-capture lens, a CCD (image input device) etc. The digital camera captures a document image, a person image, a landscape image etc. and generates image data. The scanner and the digital camera may have a function for performing a predetermined image process (such as various correction processes) in order to reproduce an image suitably. The printer prints on a sheet (recording paper) an image according to image data generated by the computer, the scanner, and the digital camera. The facsimile performs a process such as a binary process, a resolution change process, and rotation on image data supplied from the image input apparatus to obtain image data encoded into a predetermined format and sends the image data to the other end, or the facsimile receives image data from the other end, decodes the image data, performs a rotation process, a resolution change process, and a halftone process on the image data in accordance with performance of an image output apparatus, and outputs the image data as an image per page. The multi-function printer includes at least two functions out of a scanner function, a facsimile transmission function, and a printing function (copy function, printer function). The computer edits image data read by the scanner and the digital camera, or generates a document with use of application software.

Figure 29:
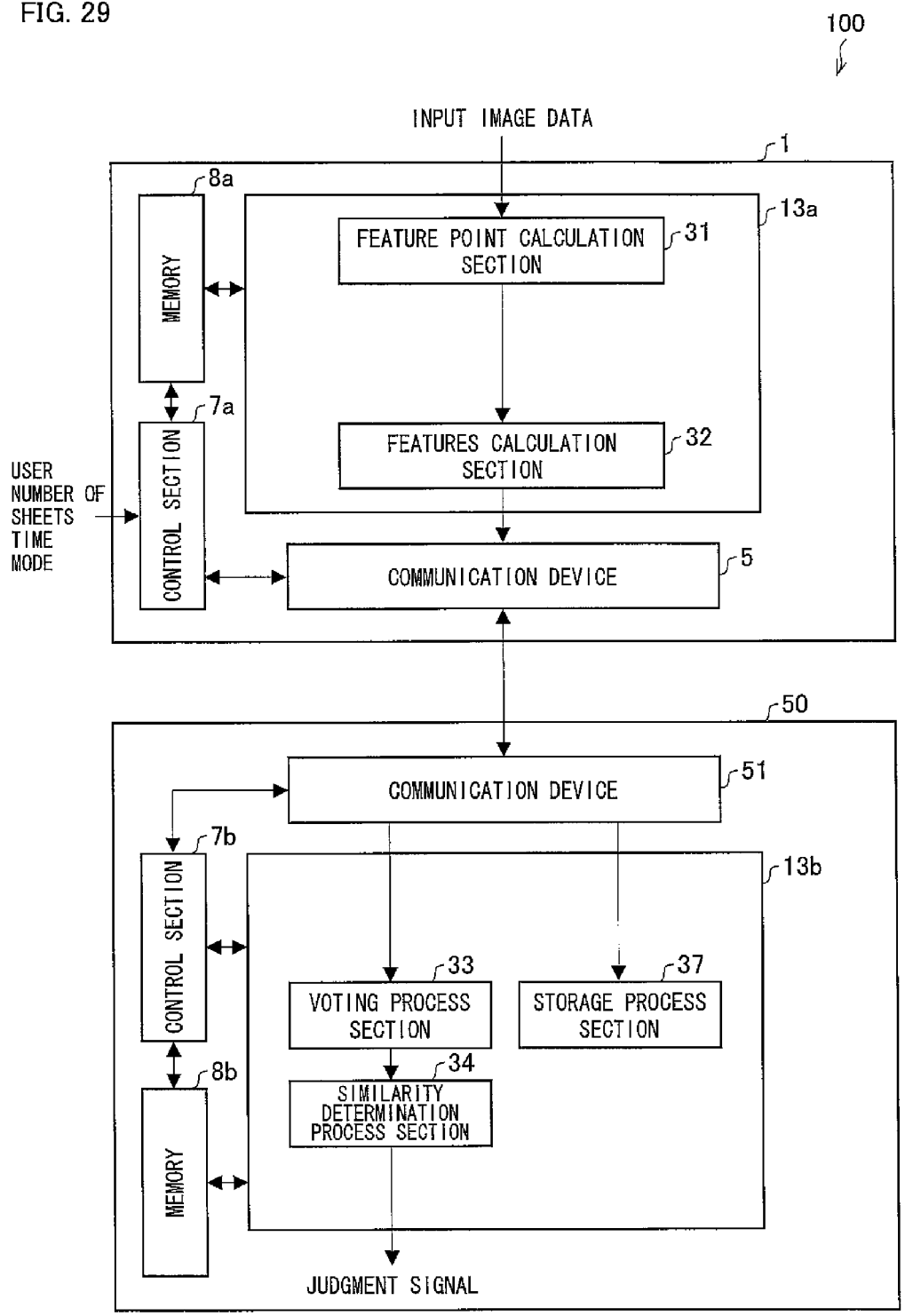
FIG. 29 is a block diagram illustrating an example of an arrangement of an image processing system in accordance with one embodiment of the present invention.

FIG. 29 is a block diagram illustrating an example of an arrangement in which a part of the functions of the control section 7 and the document matching process section 13 is included in the server 50.

As illustrated in FIG. 29, the color image processing apparatus 3 of the digital color multi-function printer 1 includes: a document matching process section 13a including a feature point calculation section 31 and a features calculation section 32; a control section 7a for controlling the operation of the document matching process section 13a; a memory 8a in which information necessary for the process of the document matching process section 13a is stored; and a communication device 5 for communicating with an external device. The server 50 includes: a communication device 51 for communicating with an external device; a document matching process section 13b including a voting process section 33, a similarity determination process section 34, and a storage process section 37; a control section 7b for controlling the document matching process section 13b; and a memory 8b in which information necessary for the process of the document matching process section 13b, such as the hash table 103, the total-number-of-reference image counter 104, the number-of-regional-reference image counter 105, and the region counter 106, is stored. In a case where transmission/reception of data is required between functional blocks of the digital color multi-function printer 1 and functional blocks of the server 50, the control sections 7a and 7b control the communication devices 5 and 51, respectively, so that transmission/reception of data is performed suitably. Other functions are the same as those already explained above.

Figure 30:
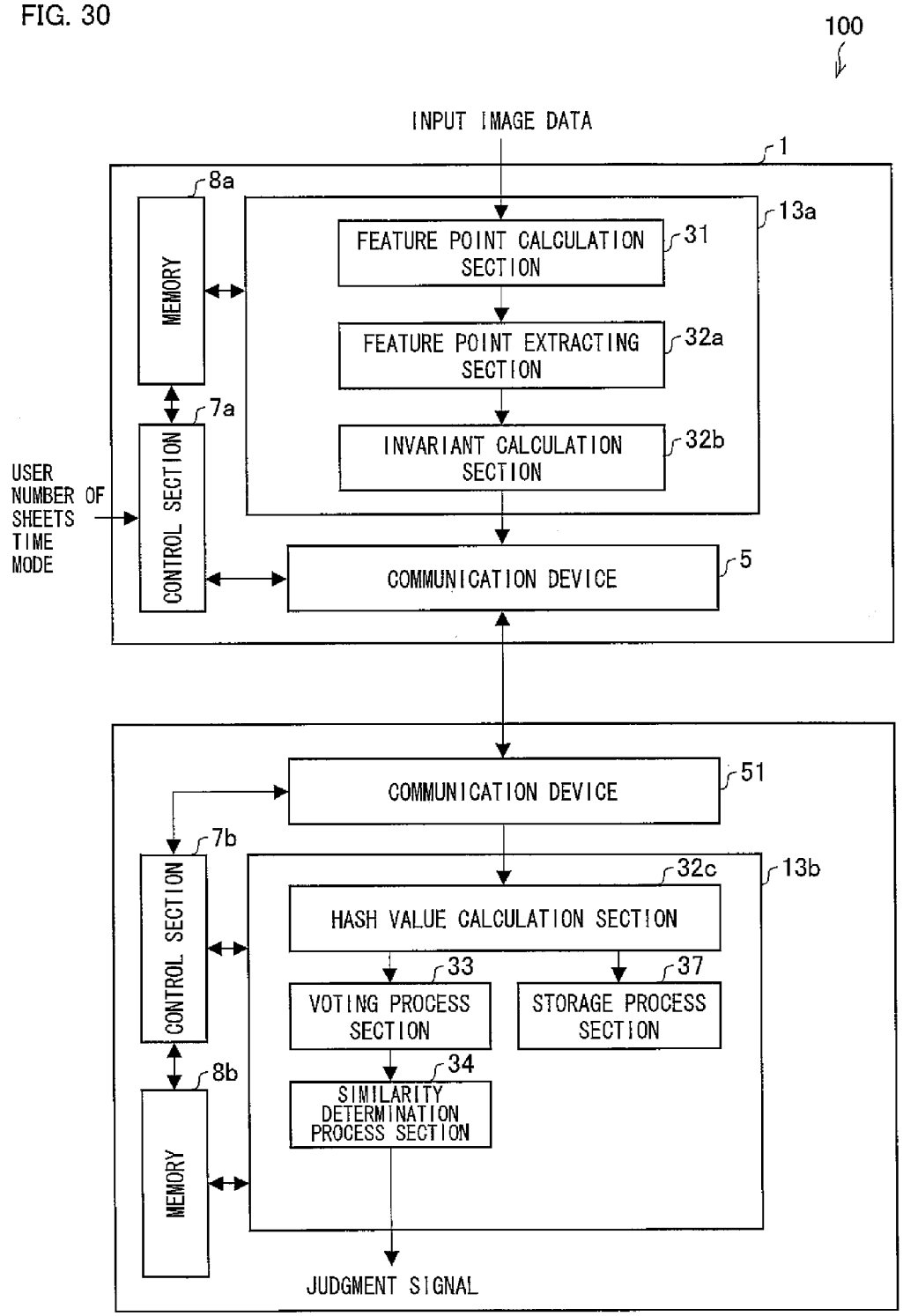
FIG. 30 is a block diagram illustrating another example of an arrangement of an image processing system in accordance with one embodiment of the present invention.

In the example of FIG. 29, all members of the features calculation section 32 (feature point extracting section 32a, invariant calculation section 32b, and hash value calculation section 32c) are included in the digital color multi-function printer 1. Alternatively, the present invention may be arranged so that, as illustrated in FIG. 30, the feature point extracting section 32a and the invariant calculation section 32b are provided in the digital color multi-function printer 1 whereas the hash value calculation section 32c is provided in the server 50.

Alternatively, the present invention may be arranged so that members of the features calculation section 32 are provided in the server 50, data indicative of a feature point calculated by the feature point calculation section 31 is transmitted from the digital color multi-function printer 1 to the server 50, and the features calculation section 32 provided in the server 50 calculates a hash value based on the hash table 103 stored in the memory 8b and the received data indicative of the feature point. Alternatively, the present invention may be arranged so that members of the feature point calculation section 31 and the features calculation section 32 are provided in the server 50, input image data is transmitted from the digital color multi-function printer 1 to the server 50, and the feature point calculation section 31 and the features calculation section 32 provided in the server 50 calculate a hash value based on the input image data received from the server 50 and the hash table 103 stored in the memory 8b.

Further, the present invention may be arranged so that, for example, storage of the result of similarity determination between the input image data and the reference image and notification to the user in a case where it is determined that a similarity to the reference image exists are performed not by the digital color multi-function printer 1 but by the server connected via a network. Further, the present invention may be arranged so that, for example, the hash table 103 is provided in a server communicably connected with the digital color multi-function printer 1.

Further, the present invention may be arranged so that the digital color multi-function printer 1 performs similarity determination between the input image data and the reference image, the input image data determined as having a similarity and log information regarding the input image data (operation recording information such as a document ID, a user ID of a user having entered a process request, date when the process request was entered, the contents of the process request (e.g. process mode, the number of sheets to be processed, transmission destination, the contents of editing etc.)) are transmitted to the server communicably connected with the digital color multi-function printer 1, and these information is stored in the server. If necessary, these information may be transmitted from the server to a predetermined transmission destination (such as an administrator of the digital color multi-function printer 1).

Further, the present invention may be arranged so that input image data determined as having no similarity to the reference image is stored as a reference image. In this case, input image data determined as having no similarity is serially stored as a reference image, and therefore the number of reference images stored in the hash table 103 becomes very large. Consequently, in this case, deletion of old reference images is required in order to prevent the hash table 103 from being overflowed. In this case, frequent deletion and updating are required in the hash table 103, and therefore the present invention is preferably applicable to this case.

For example, by dividing the hash table into twelve regions per month, it is possible to use each divided region for storing the result of job logs during one month. In this case, by setting that reference images in the oldest month are deleted together at a time when reference images during a predetermined period (e.g. 11 months) are stored, it is possible to avoid shortage of the storage region in the hash table. Further, by arranging the present invention so that a divided region where reference images of the oldest month are stored is changed to a region where job logs of the present month are stored at a time when the number of stored documents in one month is larger than the number of documents stored in one divided region, it is possible to surely store reference images of the present month even when the number of reference images per month varies greatly.

Further, the present invention may be arranged so that a process for deleting a reference image stored in the hash table is performed during a time when a system workload is relatively small (e.g. midnight). This allows dispersion of the system workload.

Each section (each block) constituting the document matching process section and the control section included in the digital color multi-function printer 1 and/or the server 50 may be realized by software by using a processor such as a CPU. Namely, the digital color multi-function printer 1 and/or the server 50 include: a CPU (central processing unit) for executing a program for realizing each function; a ROM (read only memory) that stores the program; a RAM (random access memory) that develops the program; a storage device (storage medium) such as a memory in which the program and various data are stored; and the like. The object of the present invention can be realized in such a manner that the digital color multi-function printer 1 and/or the server 50 are provided with a computer-readable storage medium for storing program codes (such as executable program, intermediate code program, and source program) of programs of the digital color multi-function printer 1 and/or the server 50 which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a Floppy Disc® and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM.

Further, the digital color multi-function printer 1 and/or the server 50 may be arranged so as to be connectable to a communication network so that the program code is supplied to the digital color multi-function printer 1 and/or the server 50 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11, HDR, mobile phone network, satellite connections, and terrestrial digital network. Note that the present invention can be also realized by the program codes in the form of a computer data signal embedded in a carrier wave, which is the program that is electrically transmitted.

Furthermore, each block of the digital color multi-function printer 1 and/or the server 50 may be realized by hardware logic. Each block of the digital color multi-function printer 1 and/or the server 50 may be a combination of hardware carrying out some of the processes and the computing means controlling the hardware and executing program code for the other processes.

The computer system of the present invention may be composed of: an image input apparatus such as a flat bed scanner, a film scanner, and a digital camera; a computer loaded with a predetermined program to execute processes such as the similarity calculation process and the similarity determination process; an image display apparatus, such as a CRT display and a liquid crystal display, for displaying a result of the process by the computer; and an image forming apparatus, such as a printer, for outputting a result of the process by the computer on a paper etc. Furthermore, a network card or a modem may be provided as communication means to be connected with a server etc. via a network.

As described above, the image processing apparatus of the present invention is an image processing apparatus, including a storage control section for causing identification information for identifying a reference image to be stored in a storage section in such a manner that the identification information is related to features of the reference image, the storage control section dividing a storage region of the storage section into a plurality of divided regions, the storage control section causing each of the plurality of divided regions to be related to a storage condition under which the identification information for the reference image is to be stored in said each of the plurality of divided regions, and when causing the identification information to be stored in the storage section, the storage control section selecting a storage region where the identification information is to be stored, out of the plurality of divided regions in accordance with the storage condition.

With the arrangement, the storage control section divides the storage region of the storage section into a plurality of divided regions, and causes each of the plurality of divided regions to be related to a storage condition under which the identification information for the reference image is to be stored in said each of the plurality of divided regions. When causing the identification information to be stored in the storage section, the storage control section selects a storage region where the identification information is to be stored, out of the plurality of divided regions in accordance with the storage condition. Consequently, identification information of a reference image corresponding to a storage condition related to each divided region is stored in the divided region. As a result, when a part of reference images stored in the storage section is updated (deleted or overwritten), it is possible to easily and promptly specify a divided region where the updating process is to be performed, in accordance with a storage condition of a reference image to be updated. Further, it is unnecessary to perform a mask process etc. on information that is not to be updated, and it is possible to update together reference images stored in the divided region where the updating process is to be performed. Therefore, it is possible to shorten a time for updating reference images, and to reduce a workload in updating the reference images.

Further, the image processing apparatus of the present invention may be arranged so that the storage control section selects the divided region where the identification information is to be stored, in such a manner that a period during which when the identification information is stored is different with respect to each divided region.

With the arrangement, the storage control section causes a period during which the identification is stored to be different with respect to each divided region. Consequently, when a part of reference images stored in the storage section is to be updated, it is possible to easily and promptly specify a divided region where the updating process is to be performed, in accordance with a storage period of the part of the reference images to be updated. Therefore, it is possible to shorten a time for updating reference images, and to reduce a workload in updating the reference images.

The image processing apparatus of the present invention may be arranged so that, until the number of the identification information stored in one divided region reaches an upper limit of the number of the identification information, the storage control section causes the identification information to be serially stored in said one divided region, and when the number of the identification information stored in said one divided region reaches the upper limit, the storage control section causes the identification information to be stored in a next divided region.

With the arrangement, divided regions where identification information is to be stored are different from each other in accordance with a period during which the identification information is stored. Consequently, it is possible to easily and promptly specify a divided region where the updating process is to be performed in accordance with the period during which the identification information is stored, such as updating a divided region where the oldest identification information is stored. Therefore, it is possible to shorten a time for updating reference images, and to reduce a workload in updating the reference images.

The image processing apparatus of the present invention may be arranged so that the storage control section causes in advance each of the divided regions to be related to a period during which the identification information is to be stored, and when the identification information is stored, the storage control section selects a divided region where the identification information is to be stored, in accordance with the period during which the identification information is stored.

With the arrangement, the storage control section causes in advance each of the divided regions to be related to a period during which the identification information is to be stored. Consequently, it is possible to easily and promptly specify a divided region where the updating process is to be performed, in accordance with the period during which the identification information is stored. Therefore, it is possible to shorten a time for updating reference images, and to reduce a workload in updating the reference images. Further, it is possible to update identification information per a predetermined period. For example, the storage section is divided into first to fourth divided regions, and periods during which the identification information is to be stored in the first to fourth divided regions are set to January to March, April to June, July to September, and October to December, respectively. This allows a divided region where old identification information is stored to be easily and promptly updated per three months or per six months.

The image processing apparatus of the present invention may be arranged so that the storage control section causes in advance each of the divided regions to be related to a priority of a reference image whose identification information is to be stored in said each of the divided regions, and when identification information is stored, the storage control section selects a divided region where the identification information is to be stored, in accordance with a priority of a reference image corresponding to the identification information.

With the arrangement, the storage control section causes the divided region where the identification information is stored to be different with respect to each priority of a reference image. Consequently, when a part of reference images stored in the storage section is updated, it is possible to easily and promptly specify a divided region where the updating process is to be performed, in accordance with a priority of a reference image to be updated. Therefore, it is possible to shorten a time for updating reference images, and to reduce a workload in updating the reference images. Further, there is a case where it is necessary to delete a part of identification information having been already stored or to overwrite new identification information on a storage region where identification information has been already stored, in order to ensure a storage capacity to store new identification information in the storage section. In such a case, it is possible to delete or overwrite identification information of a reference image with a low priority, without updating identification information of a reference image with a high priority.

The image processing apparatus of the present invention may be arranged so that the storage control section causes each of the divided regions to be related to a deletion condition under which the identification information stored in said each of the divided regions is to be deleted, and when a divided region satisfying the deletion condition exists, the storage control section deletes the identification information stored in said each of the divided regions, or causes new identification information to be overwritten and stored in said each of the divided regions.

With the arrangement, by setting the deletion condition in advance, it is possible to easily and promptly specify a divided region where identification information is deleted or overwritten.

The image processing apparatus of the present invention may be arranged so as to further include: an instruction input section for receiving an instruction input by a user; and a notification output section for outputting information to notify the user, when a divided region satisfying the deletion condition exists, the storage control section causing the notification output section to output information that the divided region exists, the information being output before the storage control section performs deletion or overwriting on the divided region, and the storage control section performing the deletion or the overwriting in response to an instruction by the user to perform the deletion or the overwriting. The instruction input section may receive an instruction input via input means provided in the image processing apparatus, or may receive an instruction input from an external device communicably connected with the image processing apparatus. Further, the notification output section may output the information to notification means (such as display means, audio output means, vibration means, and a display lamp) provided in the image processing apparatus, or may output the information to the external device communicably connected with the image processing apparatus.

With the arrangement, when a divided region satisfying the deletion condition exists, information that the divided region exists is notified to the user, and the deletion or the overwriting in the divided region is performed in response to an instruction by the user to perform the deletion or the overwriting.

The image processing apparatus of the present invention may be arranged so as to further include an instruction input section for receiving an instruction input directed to a divided region where identification information is to be deleted, the storage control section deleting the identification information stored in the divided region to which the instruction input is directed. The instruction input section may receive an instruction input via input means provided in the image processing apparatus, or may receive an instruction input from an external device communicably connected with the image processing apparatus.

With the arrangement, it is possible to easily and promptly specify a divided region where identification information is updated, in response to an instruction input by the user. Further, it is possible to update together reference images stored in the divided region to be updated, without requiring a mask process etc. on information not to be updated. Consequently, it is possible to shorten a time for updating a reference image, and to reduce a workload in updating the reference image.

The image processing apparatus of the present invention may be arranged so as to further include a count section for counting the number of identification information stored in the storage section, when count by the count section reaches a predetermined threshold value, the storage control section selecting a divided region corresponding to a predetermined deletion condition, and the storage control section deleting identification information stored in the selected divided region or causing new identification information to be overwritten and stored in the selected divided region.

With the arrangement, when the number of identification information stored in the storage section reaches the predetermined threshold value, the divided region corresponding to the predetermined deletion condition is selected, and the identification information stored in the selected divided region is deleted or new identification information is overwritten and stored in the selected divided region. This allows the storage section to have a storage capacity sufficient for storing identification information of a new reference image, and allows suitably updating identification information of a reference image.

The image processing apparatus of the present invention may be arranged so that the identification information is stored in each of the divided regions in such a manner that a period during which the identification information is stored is different with respect to each divided region, and the storage control section selects, as a divided region corresponding to the deletion condition, a divided region where identification information was stored at an oldest period.

With the arrangement, when the number of identification information stored in the storage section reaches the predetermined threshold value, identification information stored in the divided region where the oldest identification information is stored is deleted, or new identification information is overwritten and stored in the divided region. This allows the storage section to have a storage capacity sufficient for storing identification information of a new reference image, and allows suitably updating identification information of a reference image.

The image processing apparatus of the present invention may be arranged so that the identification information is stored in each of the divided regions in such a manner that a priority of a reference image is different with respect to each divided region, and the storage control section selects, as a divided region corresponding to the deletion condition, a divided region with a lowest priority.

With the arrangement, when the number of identification information stored in the storage section reaches the predetermined threshold value, identification information stored in the divided region where identification information of a reference image with a low priority is stored is deleted, or new identification information is overwritten and stored in the divided region. This allows the storage section to have a storage capacity sufficient for storing identification information of a new reference image, and allows suitably updating identification information of a reference image.

The image processing apparatus of the present invention may be arranged so as to further include: an instruction input section for receiving an instruction input by a user; and a notification output section for outputting information to notify the user, when count by the count section reaches a predetermined threshold value, the storage control section causing the notification output section to output information that the number of identification information stored in the storage section reaches the threshold value, the information being output before the storage control section performs the deletion or the overwriting, and the storage control section performing the deletion or the overwriting on a divided region to which an instruction by the user to perform deletion or overwriting is directed.

With the arrangement, when the number of identification information stored in the storage section reaches the predetermined threshold value, information that the number reaches the predetermined threshold value is notified to the user, and the deletion or the overwriting is performed on the divided region to which the instruction by the user to perform the deletion or the overwriting is directed. Consequently, it is possible to prevent wrongly updating identification information against the user's will.

The image processing apparatus of the present invention may be arranged so as to further include: an input data obtaining section for obtaining input image data; a features extracting section for extracting features of the input image data; and a similarity determination section for comparing the features of the input image data with features of a reference image stored in the storage section, so as to determine a similarity between an input image and the reference image. The input data obtaining section may obtain input image data by a scanner reading a document, may obtain input image data generated by entering necessary information in a format of electronic data with use of software, may obtain input image data directly generated as electronic data, or may obtain input image data transmitted from a device communicably connected with the image processing apparatus. The similarity determination may be determination whether the input image and the reference image are similar or not, or may be determination (calculation) of a similarity indicative of how similar the input image and the reference image are.

With the arrangement, the features of the input image data and the features of the reference image stored in the storage section are compared with each other so as to determine a similarity between the input image and the reference image.

The image processing apparatus of the present invention may be arranged so as to further include an instruction input section for receiving an instruction input by a user, the storage control section deleting, from the storage section, features and identification information of a reference image specified by the instruction.

With the arrangement, it is possible to suitably delete the features and the identification information of the reference image which the user wants to delete.

The image processing apparatus of the present invention may be arranged so as to further include: an input data obtaining section for obtaining input image data; a features extracting section for extracting features of the input image data; a similarity determination section for comparing the features of the input image data with features of a reference image stored in the storage section, so as to determine a similarity between an input image and the reference image; and a display section for displaying information, the storage control section causing the display section to display a thumbnail image of a reference image or a list of a reference image that is determined by the similarity determination section as being similar to the input image.

With the arrangement, the storage control section causes the display section to display a thumbnail image of a reference image or a list of a reference image that is similar to the input image. This allows the user to easily select a reference image to be deleted.

The image processing apparatus of the present invention may be arranged so that when the number of a reference image determined as being similar to the input image is less than a first predetermined value, the storage control section causes the display section to display a thumbnail image of the reference image, and when the number of a reference image determined as being similar to the input image is not less than the first predetermined value, the storage control section causes the display section to display a list of the reference image. The first predetermined value may be suitably set in accordance with circumstances such as the size of the display section.

With the arrangement, when the number of a reference image determined as being similar to the input image is less than the first predetermined value, the storage control section causes the display section to display a thumbnail image of the reference image, allowing the user to visibly recognize the reference image. When the number of a reference image determined as being similar to the input image is not less than the first predetermined value, the storage control section causes the display section to display a list of the reference image, allowing the reference image to be displayed without dropping the user's visibility when the number of the reference image is large.

The image processing apparatus of the present invention may be arranged so that when the number of a reference image determined as being similar to the input image data is not less than a second predetermined value, the storage control section causes the display section to display a thumbnail image of the reference image or a list of the reference image in such a manner that the thumbnail image or the list is displayed over a plurality of pages.

With the arrangement, it is possible to prevent the size of the thumbnail image of the reference image or the font of the list of the reference image from being too small, thereby preventing drop in visibility, compared with a case where the thumbnail image or the list is displayed on one page.

The image processing apparatus of the present invention may be arranged so as to further include: an input data obtaining section for obtaining input image data; a features extracting section for extracting features of the input image data; a similarity determination section for comparing the features of the input image data with features of a reference image stored in the storage section, so as to determine a similarity between an input image and the reference image; and a display section for displaying information, the storage control section causing the display section to display an index indicative of the similarity between the reference image and the input image.

With the arrangement, the similarity between the reference image and the input image is displayed. This allows the user to easily select a reference image to be deleted.

The image processing apparatus of the present invention may be arranged so as to further include: an input data obtaining section for obtaining input image data; a features extracting section for extracting features of the input image data; and a similarity determination section for comparing the features of the input image data with features of a reference image stored in the storage section, so as to determine a similarity between an input image and the reference image; and an instruction input section for receiving an instruction input by a user, the instruction input section receiving a selection instruction to select a divided region where a reference image whose similarity to an input image is to be determined is stored, or an instruction regarding a storage condition for the reference image whose similarity to an input image is to be determined, the storage control section determining a similarity between the input image and a reference image whose features and identification information are stored in a divided region corresponding to the selection instruction received by the instruction input section, or in a divided region corresponding to the storage condition received by the instruction input section.

With the arrangement, the region where the similarity determination is performed is limited to the divided region corresponding to the selection instruction received by the instruction input section, or to the divided region corresponding to the storage condition received by the instruction input section. Consequently, it is possible to shorten a time for the similarity determination compared with a case where the similarity determination is performed with respect to whole divided regions in the storage section.

The image processing apparatus of the present invention may be arranged so that the storage control section causes identification information to be related to features of a reference image, said identification information is different from identification information related to features of other reference image stored in a divided region where the features of said reference image are stored, and said identification information is the same as identification information related to at least one feature of a reference image stored in a divided region that is different from the divided region where the features of said reference image are stored.

With the arrangement, the same identification information is used in different divided regions, and therefore the number of kinds of identification information can be reduced compared with a case where different identification information is related to individual feature quantities of all reference images in all divided regions. Consequently, it is possible to increase efficiencies in the process for storing a reference image, the process for determining a similarity between an input image and a reference image, and the process for deleting a reference image. Further, it is possible to reduce the number of bits for identification information stored in the storage section, thereby reducing a storage capacity of the storage section. Alternatively, it is possible to cause feature quantities of more number of reference images to be stored without increasing the storage capacity of the storage section.

The image processing apparatus of the present invention may be arranged so as to further include: an input data obtaining section for obtaining input image data; a features extracting section for extracting features of the input image data; and a similarity determination section for comparing the features of the input image data with features of a reference image stored in the storage section, so as to determine a similarity between an input image and the reference image, the similarity determination section determining a similarity between the input image and the reference image with respect to each divided region.

With the arrangement, the similarity determination is performed with respect to each divided region. Consequently, it is possible to suitably perform the similarity determination on different reference images that are stored in different divided regions and that are related to the same identification information.

The image forming apparatus of the present invention includes any one of the image processing apparatuses as described above and an image output section for forming an image corresponding to input image data on a recording material.

With the image forming apparatus, it is possible to shorten a time for updating a reference image and to reduce a workload in updating the reference image.

In order to solve the foregoing problems, the image processing system of the present invention is an image processing system, including an image processing apparatus; and a server communicably connected with the image processing apparatus, one or both of the image processing apparatus and the server including a storage section and a storage control section, or the image processing apparatus including one of the storage section and the storage control section and the server including the other of the storage section and the storage control section, identification information for identifying a reference image and features of the reference image being stored in the storage section, the storage control section being for causing the identification information and the features to be stored in the storage section in such a manner that the identification information and the features are related to each other, the storage control section dividing a storage region of the storage section into a plurality of divided regions, and causing each of the plurality of divided regions to be related to a storage condition under which identification information of a reference image is stored in said each of the plurality of divided regions, and when the identification information is stored in the storage section, the storage control section selecting a storage region where the identification information is to be stored out of the plurality of divided regions in accordance with the storage condition.

With the arrangement, the storage control section divides the storage region of the storage section into a plurality of divided regions, and causes each of the divided regions to be related to a storage condition under which the identification information for the reference image is to be stored in said each of the plurality of divided regions. When causing the identification information to be stored in the storage section, the storage control section selects a storage region where the identification information is to be stored, out of the plurality of divided regions in accordance with the storage condition. Consequently, identification information of a reference image corresponding to a storage condition related to each divided region is stored in the divided region. As a result, when a part of reference images stored in the storage section is updated (deleted or overwritten), it is possible to easily and promptly specify a divided region where the updating process is to be performed, in accordance with a storage condition of a reference image to be updated. Further, it is unnecessary to perform a mask process etc. on information that is not to be updated, and it is possible to update together reference images stored in the divided region where the updating process is to be performed. Therefore, it is possible to shorten a time for updating reference images, and to reduce a workload in updating the reference images.

In order to solve the foregoing problems, the image processing method of the present invention is an image processing method for causing identification information for identifying a reference image and features of the reference image to be stored in a storage section in such a manner that the identification information and the features are related to each other, the method including the steps of: dividing a storage region of the storage section into a plurality of divided regions; causing each of the plurality of divided regions to be related to a storage condition under which identification information of a reference image is stored in said each of the plurality of divided regions; and selecting a storage region where the identification information is to be stored out of the plurality of divided regions in accordance with the storage condition, when the identification information is stored in the storage region.

With the method, the storage region of the storage section is divided into a plurality of divided regions, and each of the plurality of divided regions is caused to be related to a storage condition under which the identification information for the reference image is to be stored in said each of the plurality of divided regions. When the identification information is caused to be stored in the storage section, a storage region where the identification information is to be stored is selected, out of the plurality of divided regions in accordance with the storage condition. Consequently, identification information of a reference image corresponding to a storage condition related to each divided region is stored in the divided region. As a result, when a part of reference images stored in the storage section is updated (deleted or overwritten), it is possible to easily and promptly specify a divided region where the updating process is to be performed, in accordance with a storage condition of a reference image to be updated. Further, it is unnecessary to perform a mask process etc. on information that is not to be updated, and it is possible to update together reference images stored in the divided region where the updating process is to be performed. Therefore, it is possible to shorten a time for updating reference images, and to reduce a workload in updating the reference images.

The image processing apparatus may be realized by a computer. In this case, the present invention also includes: an image processing program for causing a computer to operate as each of the above sections so as to realize the image processing apparatus by use of the computer; and a computer-readable storage medium in which the program is stored.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus, comprising:
    an input data obtaining section for obtaining input image data;
    a features extracting section for extracting features of the input image data;
    a storage control section for causing identification information for identifying a reference image to be stored in a storage section in such a manner that the identification information is related to features of the reference image;
    a similarity determination section for comparing the features of the input image data with features of a least one reference image stored in the storage section, so as to determine a similarity between an input image and the at least one reference image;

an instruction input section for receiving an instruction input by a user; and a display section for displaying information, the storage control section dividing a storage region of the storage section into a plurality of divided regions, the storage control section causing each of the plurality of divided regions to be related to a storage condition under which the identification information for the at least one reference image is to be stored in said each of the plurality of divided regions, and when causing the identification information to be stored in the storage section, the storage control section selecting a storage region where the identification information is to be stored, out of the plurality of divided regions in accordance with the storage condition, and the storage control section causing, in a case where a plurality of reference images have common features, a plural pieces of identification information for identifying the respective plurality of reference images to be stored in the storage section in such a manner that the plural pieces of identification information are related to each one of the common features of the plurality of reference images, the instruction input section receiving a selection instruction to select a divided region where the at least one reference image whose similarity to an input image is to be determined is stored, or an instruction regarding a storage condition for the at least one reference image whose similarity to an input image is to be determined, the storage control section causing the similarity determination section to determine a similarity between the input image and the at least one reference image whose features and identification information are stored in a divided region corresponding to the selection instruction received by the instruction input section, or in a divided region corresponding to the storage condition received by the instruction input section, the storage control section causing the display section to display a thumbnail image of each of the at least one reference image or a list of the at least one reference image that is determined by the similarity determination section as being similar to the input image, and the storage control section deleting, from a corresponding one of the plurality of divided regions, identification information of the at least one reference image selected by the user via the instruction input out of the thumbnail image of each of the at least one reference image or the list of the at least one reference image displayed by the display section.

2. The image processing apparatus as set forth in claim 1, wherein the storage control section selects a divided region where the identification information is to be stored, in such a manner that a period during which the identification information is stored is different with respect to each divided region.

3. The image processing apparatus as set forth in claim 2, wherein the storage control section causes in advance each of the plurality of divided regions to be related to a period during which the identification information is to be stored, and when the identification information is stored, the storage control section selects a divided region where the identification information is to be stored, in accordance with the period during which the identification information is stored.

4. The image processing apparatus as set forth in claim 1, wherein the storage control section causes each of the plurality of divided regions to be related to a deletion condition under which the identification information stored in said each of the plurality of divided regions is to be deleted, and when a divided region satisfying the deletion condition exists, the storage control section deletes the identification information stored in said each of the plurality of divided regions, or causes new identification information to be overwritten and stored in said each of the plurality of divided regions.

5. The image processing apparatus as set forth in claim 4, further comprising:

an instruction input section for receiving an instruction input by a user; and a notification output section for outputting information to notify the user, when a divided region satisfying the deletion condition exists, the storage control section causing the notification output section to output information that the divided region exists, the information being output before the storage control section performs deletion or overwriting on the divided region, and the storage control section performing the deletion or the overwriting in response to an instruction by the user to perform the deletion or the overwriting.

6. The image processing apparatus as set forth in claim 1, further comprising:

a count section for counting a number of identification information stored in the storage section, when count by the count section reaches a predetermined threshold value, the storage control section selecting a divided region corresponding to a predetermined deletion condition, and the storage control section deleting identification information stored in the selected divided region or causing new identification information to be overwritten and stored in the selected divided region.

7. The image processing apparatus as set forth in claim 6, wherein the identification information is stored in each of the plurality of divided regions in such a manner that a period during which the identification information is stored is different with respect to each divided region, and the storage control section selects, as a divided region corresponding to the deletion condition, a divided region where identification information was stored at an oldest period.

8. The image processing apparatus as set forth in claim 6, further comprising:

an instruction input section for receiving an instruction input by a user; and a notification output section for outputting information to notify the user, when count by the count section reaches a predetermined threshold value, the storage control section causing the notification output section to output information that the number of identification information stored in the storage section reaches the threshold value, the information being output before the storage control section performs a deletion or an overwriting, and the storage control section performing the deletion or the overwriting on a divided region to which an instruction by the user to perform deletion or overwriting is directed.

9. The image processing apparatus as set forth in claim 1, wherein when a number of a reference image determined as being similar to the input image is less than a first predetermined value, the storage control section causes the display section to display a thumbnail image of the reference image, and when the number of a reference image determined as being similar to the input image is not less than the first predetermined value, the storage control section causes the display section to display a list of the reference image.

10. The image processing apparatus as set forth in claim 1, wherein when a number of a reference image determined as being similar to the input image data is not less than a second predetermined value, the storage control section causes the display section to display a thumbnail image of the reference image or a list of the reference image in such a manner that the thumbnail image of the reference image or the list of the reference image is displayed over a plurality of pages.

11. The image processing apparatus as set forth in claim 1, wherein the storage control section causes the display section to display an index indicative of the similarity between the at least one reference image and the input image.

12. The image processing apparatus as set forth in claim 1, wherein
the storage control section carries out a storing process for causing storage target identification information for identifying a reference image to be stored in the storage section,
said storage target identification information is different from identification information of other reference image stored in a divided region where said storage target identification information is stored, and
said storage target identification information is same as identification information corresponding to at least one of reference images stored in a divided region that is different from the divided region where said storage target identification information is stored.

13. An image forming apparatus, comprising:
an image processing apparatus as set forth in claim 1; and
an image output section for forming an image corresponding to input image data on a recording material.

14. An image processing system, comprising:
an image processing apparatus; and
a server communicably connected with the image processing apparatus,
one or both of the image processing apparatus and the server including, an input data obtaining section for obtaining input image data, a features extracting section for extracting features of the input image data, a storage section and a storage control section, or the image processing apparatus including one of the storage section and the storage control section and the server including the other of the storage section and the storage control section,
identification information for identifying a reference image and features of the reference image being stored in the storage section,
the storage control section being for causing the identification information and the features to be stored in the storage section in such a manner that the identification information and the features are related to each other,
a similarity determination section for comparing the features of the input image data with features of a least one reference image stored in the storage section, so as to determine a similarity between an input image and the at least one reference image;
an instruction input section for receiving an instruction input by a user; and
a display section for displaying information,
the storage control section dividing a storage region of the storage section into a plurality of divided regions, and causing each of the plurality of divided regions to be related to a storage condition under which identification information for at least one reference image is stored in said each of the plurality of divided regions, and when the identification information is stored in the storage section, the storage control section selecting a storage region where the identification information is to be stored out of the plurality of divided regions in accordance with the storage condition, and the storage control section causing, in a case where a plurality of reference images have common features, a plural pieces of identification information for identifying the respective plurality of reference images to be stored in the storage section in such a manner that the plural pieces of identification information are related to each one of the common features of the plurality of reference images,
the instruction input section receiving a selection instruction to select a divided region where the at least one reference image whose similarity to an input image is to be determined is stored, or an instruction regarding a storage condition for the at least one reference image whose similarity to an input image is to be determined,
the storage control section causing the similarity determination section to determine a similarity between the input image and the at least one reference image whose features and identification information are stored in a divided region corresponding to the selection instruction received by the instruction input section, or in a divided region corresponding to the storage condition received by the instruction input section,
the storage control section causing the display section to display a thumbnail image of each of the at least one reference image or a list of the at least one reference image that is determined by the similarity determination section as being similar to the input image, and
the storage control section deleting, from a corresponding one of the plurality of divided regions, identification information of the at least one reference image selected by the user via the instruction input out of the thumbnail image of each of the at least one reference image or the list of the at least one reference image displayed by the display section.

15. An image processing method for causing identification information for identifying a reference image and features of the reference image to be stored in a storage section in such a manner that the identification information and the features are related to each other,
the method comprising the steps of:
dividing a storage region of the storage section into a plurality of divided regions;
causing each of the plurality of divided regions to be related to a storage condition under which identification information for at least one reference image is stored in said each of the plurality of divided regions;
selecting a storage region where the identification information is to be stored out of the plurality of divided regions in accordance with the storage condition, when the identification information is stored in the storage region;
causing, in a case where a plurality of reference images have common features, a plural pieces of identification information for identifying the respective plurality of reference images to be stored in the storage section in such a manner that the plural pieces of identification information are related to each one of the common features of the plurality of reference images;
selecting a divided region where the at least one reference image whose similarity to an input image is to be determined is stored, or an instruction regarding a storage condition for the at least one reference image whose similarity to an input image is to be determined;

determining a similarity between the input image and the at least one reference image whose features and identification information are stored in a divided region corresponding to a selection instruction by a user, or in a divided region corresponding to the storage condition input by the user, displaying a thumbnail image of each of the at least one reference image or a list of the at least one reference image that is determined as being similar to the input image, and deleting, from a corresponding one of the plurality of divided regions, identification information of the at least one reference image selected by the user via the instruction input out of the thumbnail image of each of the at least one reference image or the list of the at least one reference image displayed by the display section.

16. A non-transitory computer-readable storage medium, in which a program for causing an image processing apparatus as set forth in claim 1 to operate is stored, the program causing a computer to operate as the storage control section.

* * * * *